United States Patent
Phuyal et al.

(10) Patent No.: US 11,690,086 B2
(45) Date of Patent: Jun. 27, 2023

(54) PRECONFIGURED UPLINK RESOURCE TECHNIQUES IN WIRELESS COMMUNICATIONS

(71) Applicant: QUALCOMM Incorporated, San Diego, CA (US)

(72) Inventors: Umesh Phuyal, San Diego, CA (US); Mungal Singh Dhanda, Slough (GB); Ayan Sengupta, San Diego, CA (US); Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 16/926,164

(22) Filed: Jul. 10, 2020

(65) Prior Publication Data

US 2021/0014864 A1    Jan. 14, 2021

Related U.S. Application Data

(60) Provisional application No. 62/873,836, filed on Jul. 12, 2019.

(51) Int. Cl.
*H04W 72/53* (2023.01)
*H04W 76/27* (2018.01)
*H04W 76/36* (2018.01)
*H04W 72/21* (2023.01)
*H04W 72/23* (2023.01)

(52) U.S. Cl.
CPC ........... *H04W 72/53* (2023.01); *H04W 72/21* (2023.01); *H04W 72/23* (2023.01); *H04W 76/27* (2018.02); *H04W 76/36* (2018.02)

(58) Field of Classification Search
None
See application file for complete search history.

(56) References Cited

FOREIGN PATENT DOCUMENTS

WO    WO-2020065620 A1 *    4/2020    ............ H04W 12/08

OTHER PUBLICATIONS

Ericsson: "PUR Configuration", 3GPP Draft, 3GPP TSG-RAN WG2 #106, R2-1906939-PUR Configuration, 3rd Generation Partnership Project (3GPP), Mobile Competence Centre, 650, Route Des Lucioles, F-06921, Sophia-Antipolis Cedex, France, vol. RAN WG2, No. Reno, Nevada, US, May 13, 2019-May 17, 2019, May 13, 2019 (May 13, 2019), XP051730391, pp. 1-13, Retrieved from the Internet: URL:http://www.3gpp.org/ftp/Meetings%5F3GPP%5FSYNC/RAN2/Docs/R2%2D1906939%2Ezip [retrieved on May 13, 2019] paragraph [02.3].

(Continued)

*Primary Examiner* — Alex Skripnikov
(74) *Attorney, Agent, or Firm* — Holland & Hart LLP

(57) ABSTRACT

Methods, systems, and devices for wireless communications are described. that support preconfigured uplink resources (PUR) in wireless communications. A base station may communicate that support for PUR is available, and may allocate PUR resources to a user equipment (UE) based on requests from the UE. The UE may receive an indication that the base station supports PUR, such as via a system information block (SIB), determine to request PUR, and transmit a PUR request message to the base station. A PUR response from the base station may indicate configuration, or reconfiguration of PUR allocation for the UE that may be used for uplink transmissions, or release of the PUR allocation.

34 Claims, 29 Drawing Sheets

(56) References Cited

OTHER PUBLICATIONS

International Search Report and Written Opinion—PCT/US2020/041732—Isa/Epo—dated Sep. 16, 2020.
Qualcomm Incorporated: "(Re)configuration and Release of PUR," 3GPP Draft, 3GPP TSG-RAN WG2 Meeting #106, R2-1906445, Pur (Re)Config, 3rd Generation Partnership Project (3GPP), Mobile Competence Centre, 650, Route Des Lucioles, F-06921, Sophia-Antipolis Cedex, France, vol. RAN WG2, No. Reno, Nevada USA; May 13, 2019-May 17, 2019, May 13, 2019 (May 13, 2019), XP051729910, 7 pages, Retrieved from the Internet: URL: http://www.3gpp.org/ftp/Meetings%5F3GPP%5FSYNC/RAN2/Docs/R2%2D1906445%2Ezip [retrieved on May 13, 2019] paragraph [03 .1].
Sierra Wireless: "D-PUR Configuration Details," 3GPP Draft, R2-1907244, 3GPP TSG-RAN WG2 Meeting#106, 3rd Generation Partnership Project (3GPP), Mobile Competence Centre, 650, Route Des Lucioles, F-06921, Sophia-Antipolis Cedex, France, vol. RAN WG2, No. Reno, Nevada, USA; May 13, 2019-May 17, 2019, May 13, 2019 (May 13, 2019), XP051730686, pp. 1-5, Retrieved from the Internet: URL: http://www.3gpp.org/ftp/Meetings%5F3GPP%5FSYNC/RAN2/Docs/R2%2D1907244%2Ezip [retrieved on May 13, 2019] paragraph [0003].
Sierra Wireless: "Pre-configured UL Resources Design Considerations", 3GPP Draft, 3GPP TSG RAN WG2 Meeting #104, R2-1817940, 3rd Generation Partnership Project (3GPP), Mobile Competence Centre; 650, Route Des Lucioles; F-06921 Sophia-Antipolis Cedex; France, vol. RAN WG2, No. Spokane, USA; Nov. 12, 2018-Nov. 16, 2018, Nov. 12, 2018 (Nov. 12, 2018), XP051557451, 9 Pages, Retrieved from the Internet: URL: http://www.3gpp.org/ftp/Meetings%5F3GPP%5FSYNC/RAN2/Docs/R2%2D1817940%2Ezip [retrieved on Nov. 12, 2018], paragraph [0003].
ZTE Corporation: "Main Issues for Transmission Over Preconfigured Dedicated Resource in Idle", 3GPP Draft, 3GPP TSG-RAN2 meeting#104, R2-1816993, Main Issues for Transmission Over Preconfigured Dedicated Resource in Idle, 3rd Generation Partnership Project (3GPP), Mobile Competence Centre, 650, Route Des Lucioles, F-06921, Sophia-Antipolis Cedex, France, vol. RAN WG2, No. Spokane, United States, Nov. 12, 2018-Nov. 16, 2018, Nov. 2, 2018 (Nov. 2, 2018), XP051480924, 11 pages, Retrieved from the Internet: URL: http://www.3gpp.org/ftp/tsg%5Fran/WG2%5FRL2/TSGR2%5F104/Docs/R2%2D1816993%2Ezip [retrieved on Nov. 2, 2018] paragraph [02.8]; figure 1(a).

\* cited by examiner

PRECONFIGURED UPLINK RESOURCE TECHNIQUES IN WIRELESS COMMUNICATIONS

CROSS REFERENCE

The present application for patent claims the benefit of U.S. Provisional Patent Application No. 62/873,836 by PHUYAL et al., entitled "PRECONFIGURED UPLINK RESOURCE TECHNIQUES IN WIRELESS COMMUNICATIONS," filed Jul. 12, 2019, assigned to the assignee hereof, and expressly incorporated by reference herein.

BACKGROUND

The following relates generally to wireless communications, and more specifically to preconfigured uplink resource techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may have a relatively small amount of data to be transmitted periodically. For example, a UE may be associated with a sensor that is to provide readings to a network node on a periodic basis. In some cases, in order to obtain uplink resources for an uplink transmission, a UE may transmit a request for uplink data resources (e.g., a buffer status report (BSR) may be provided to a base station that indicates that the UE has data to transmit), receive an uplink grant responsive to the request, and then transmit uplink data in accordance with the uplink grant. In cases where the UE has relatively small amounts of data to transmit, such procedures consume a substantial amount of overhead relative to the amount of data transmitted. Efficient techniques to allocate uplink resources to UEs for "grant-free" uplink transmissions (i.e., without needing to perform multi-step communication just to obtain an uplink grant every time) may allow for more efficient network operation through allocation of such uplink resources and reduced overhead associated with such uplink transmissions.

SUMMARY

The described techniques relate to improved methods, systems, devices, and apparatuses that support preconfigured uplink resources (PUR) in wireless communications. Various described techniques provide for communicating that support for PUR is available at a base station and allocating PUR resources to user equipment (UE) based on requests from UEs. A UE may receive an indication that the base station supports PUR, such as via a system information block (SIB), determine to request PUR, and transmit a PUR request message to the base station. A PUR response from the base station may indicate a PUR allocation for the UE that may be used for uplink transmissions.

In some cases, the base station may provide a PUR allocation that is different than a requested PUR configuration provided by the UE in the PUR request. The UE may determine that the different PUR configuration is not sufficient for the UE, and may transmit a PUR configuration failure to the base station. In some cases, the transmission from the base station to the UE that indicates the PUR configuration may provide an indication of uplink resources that may be used by the UE to transmit the PUR configuration failure indication. In some cases, an early data transmission (EDT) random access procedure may be used to transmit a PUR request from the UE, and may be used by the base station to transmit a PUR configuration to the UE. In such cases, the PUR request message may be transmitted with a random access message as part on the EDT random access procedure. Additionally or alternatively, a PUR request from the UE for a PUR configuration or PUR reconfiguration may provide an indication of a number of instances of PUR grants that are requested. Such PUR request may indicate PUR release request by indicating the number of instances or PUR grants as zero. Additionally or alternatively, a base station may determine that a requested PUR configuration or reconfiguration is not available for a UE, and may transmit a PUR reject indication to the UE. The reject indication, in case of PUR reconfiguration request, may also indicate how the UE is to handle an existing PUR configuration (e.g., whether to release the existing PUR configuration or maintain the existing PUR configuration).

A method of wireless communication at a UE is described. The method may include determining that a base station supports preconfigured uplink resources for grant-free uplink transmissions from the UE, transmitting a preconfigured uplink resource request message to the base station based on the determining that the base station supports preconfigured uplink resources, receiving, responsive to the preconfigured uplink resource request message, a preconfigured uplink resource configuration from the base station that identifies preconfigured uplink resources allocated to the UE, receiving an uplink resource for a response message to be transmitted from the UE, and transmitting, using the uplink resource for the response message, a preconfigured uplink resource configuration response message to the base station.

An apparatus for wireless communication at a UE is described. The apparatus may include a processor, memory coupled with the processor, and instructions stored in the memory. The instructions may be executable by the processor to cause the apparatus to determine that a base station supports preconfigured uplink resources for grant-free uplink transmissions from the UE, transmit a preconfigured uplink resource request message to the base station based on the determining that the base station supports preconfigured uplink resources, receive, responsive to the preconfigured uplink resource request message, a preconfigured uplink resource configuration from the base station that identifies preconfigured uplink resources allocated to the UE, receive an uplink resource for a response message to be transmitted from the UE, and transmit, using the uplink resource for the response message, a preconfigured uplink resource configuration response message to the base station.

Another apparatus for wireless communication at a UE is described. The apparatus may include means for determining that a base station supports preconfigured uplink resources for grant-free uplink transmissions from the UE, transmitting a preconfigured uplink resource request message to the base station based on the determining that the base station supports preconfigured uplink resources, receiving, responsive to the preconfigured uplink resource request message, a preconfigured uplink resource configuration from the base station that identifies preconfigured uplink resources allocated to the UE, receiving an uplink resource for a response message to be transmitted from the UE, and transmitting, using the uplink resource for the response message, a preconfigured uplink resource configuration response message to the base station.

A non-transitory computer-readable medium storing code for wireless communication at a UE is described. The code may include instructions executable by a processor to determine that a base station supports preconfigured uplink resources for grant-free uplink transmissions from the UE, transmit a preconfigured uplink resource request message to the base station based on the determining that the base station supports preconfigured uplink resources, receive, responsive to the preconfigured uplink resource request message, a preconfigured uplink resource configuration from the base station that identifies preconfigured uplink resources allocated to the UE, receive an uplink resource for a response message to be transmitted from the UE, and transmit, using the uplink resource for the response message, a preconfigured uplink resource configuration response message to the base station.

In some examples of the method, apparatuses, and non-transitory computer-readable medium described herein, the preconfigured uplink resource configuration may be provided as a delta configuration that indicates differences over a prior preconfigured uplink resource configuration of the UE. In some examples of the method, apparatuses, and non-transitory computer-readable medium described herein, the preconfigured uplink resource configuration may be provided as a delta configuration that indicates differences over a current configuration being used by the UE. In some examples of the method, apparatuses, and non-transitory computer-readable medium described herein, the preconfigured uplink resource configuration may be provided as a delta configuration that indicates differences over a default preconfigured uplink resource configuration.

In some examples of the method, apparatuses, and non-transitory computer-readable medium described herein, the uplink resource for the response message may be provided in an explicit indication with the preconfigured uplink resource configuration from the base station. In some examples of the method, apparatuses, and non-transitory computer-readable medium described herein, the uplink resource for the response message may be included in a first instance of the preconfigured uplink resource allocated to the UE.

Some examples of the method, apparatuses, and non-transitory computer-readable medium described herein may further include operations, features, means, or instructions for determining, based on the preconfigured uplink resource (PUR) configuration from the base station, a set of control channel resources to monitor for an uplink grant, and monitoring the set of control channel resources for the uplink grant, where the uplink grant indicates the uplink resource for the transmission of the PUR configuration response message to the base station. In some examples of the method, apparatuses, and non-transitory computer-readable medium described herein, the preconfigured uplink resource (PUR) configuration response message to the base station indicates that the PUR configuration has succeeded or failed. In some examples of the method, apparatuses, and non-transitory computer-readable medium described herein, the transmitting the preconfigured uplink resource configuration response message may be performed when the UE is in an idle mode or in a connected mode with the base station.

A method of wireless communication at a UE is described. The method may include determining an early data transmission configuration for an early data transmission procedure for transmitting UE payload data in an uplink message of the early data transmission procedure. In some cases, the uplink message may include a preconfigured uplink resource request message that indicates a requested configuration, reconfiguration, or release of a preconfigured uplink resource configuration. The method may further include transmitting the uplink message of the early data transmission procedure, and receiving a message from the base station indicating configuration or reconfiguration or release of preconfigured uplink resource configuration in a downlink message of the early data transmission procedure.

An apparatus for wireless communication at a UE is described. The apparatus may include a processor, memory coupled with the processor, and instructions stored in the memory. The instructions may be executable by the processor to cause the apparatus to determine an early data transmission configuration for an early data transmission procedure, transmit an uplink message of the early data transmission procedure, and receive a message from the base station indicating configuration or reconfiguration or release of preconfigured uplink resource configuration in a downlink message of the early data transmission procedure.

Another apparatus for wireless communication at a UE is described. The apparatus may include means for determining an early data transmission configuration for an early data transmission procedure, transmitting an uplink message of the early data transmission procedure, and receiving a message from the base station indicating configuration or reconfiguration or release of preconfigured uplink resource configuration in a downlink message of the early data transmission procedure.

A non-transitory computer-readable medium storing code for wireless communication at a UE is described. The code may include instructions executable by a processor to determine an early data transmission configuration for an early data transmission procedure, transmit an uplink message of the early data transmission procedure, and receive a message from the base station indicating configuration or reconfiguration or release of preconfigured uplink resource configuration in a downlink message of the early data transmission procedure.

Some examples of the method, apparatuses, and non-transitory computer-readable medium described herein may further include operations, features, means, or instructions for formatting a preconfigured uplink resource request message to be transmitted in the uplink message of the early data transmission procedure, where the preconfigured uplink resource request message indicates a requested configuration, reconfiguration, or release of a preconfigured uplink resource configuration, and transmitting the preconfigured uplink resource request message in the uplink message of the early data transmission procedure.

Some examples of the method, apparatuses, and non-transitory computer-readable medium described herein may further include operations, features, means, or instructions for determining, based on the preconfigured uplink resource (PUR) configuration message from the base station, a set of control channel resources to monitor for an uplink grant, and monitoring the set of control channel resources for the uplink grant, where the uplink grant indicates an uplink resource for transmission of a PUR configuration response message to the base station.

In some examples of the method, apparatuses, and non-transitory computer-readable medium described herein, the uplink message of the early data transmission procedure is transmitted in a message three (MSG3) transmission of the early data transmission procedure. In some examples of the method, apparatuses, and non-transitory computer-readable medium described herein, the preconfigured uplink resource (PUR) configuration message from the base station is received in an early data transmission (EDT) downlink message 4 that provides a RRC connection release message or an RRC early data complete message. In some examples of the method, apparatuses, and non-transitory computer-readable medium described herein, the PUR configuration is provided as a delta configuration that indicates differences over a prior PUR configuration of the UE. In some examples of the method, apparatuses, and non-transitory computer-readable medium described herein, the PUR configuration is provided as a delta configuration that indicates differences over a default PUR configuration or that indicates differences over a configuration being used at the UE. In some examples of the method, apparatuses, and non-transitory computer-readable medium described herein, the EDT message 4 explicitly or implicitly provides one or more of an indication that the UE is to use a prior PUR configuration, a confirmation of the prior PUR configuration, an indication to de-configure and release the prior PUR configuration, a new resource for a new PUR configuration, or any combinations thereof.

Some examples of the method, apparatuses, and non-transitory computer-readable medium described herein may further include operations, features, means, or instructions for transmitting, responsive to the preconfigured uplink resource (PUR) configuration message, an indication of a successful PUR configuration or PUR configuration failure using an uplink resource for a response message from the UE. Some examples of the method, apparatuses, and non-transitory computer-readable medium described herein may further include operations, features, means, or instructions for determining that a PUR configuration is de-configured based on receiving a broadcast system information transmission from the base station that indicates PUR may be unsupported, and releasing the PUR configuration. Some examples of the method, apparatuses, and non-transitory computer-readable medium described herein may further include operations, features, means, or instructions for receiving, from the base station, a PUR release message, and de-configuring a PUR configuration based on the PUR release message.

Some examples of the method, apparatuses, and non-transitory computer-readable medium described herein may further include operations, features, means, or instructions for formatting a preconfigured uplink resource request message to be transmitted to the base station that indicates a number of instances of preconfigured uplink resource grants requested by the UE, where the number of instances of preconfigured uplink resource (PUR) grants provides an explicit number of PUR grants or an indication of an infinite number of PUR grants.

A method of wireless communication at a UE is described. The method may include determining that a base station supports preconfigured uplink resources for grant-free uplink transmissions from the UE, transmitting a preconfigured uplink resource request message to the base station based on the determining that the base station supports preconfigured uplink resources, where the preconfigured uplink resource request message includes a number of instances of preconfigured uplink resource grants requested by the UE, and receiving a preconfigured uplink resource configuration from the base station.

An apparatus for wireless communication at a UE is described. The apparatus may include a processor, memory coupled with the processor, and instructions stored in the memory. The instructions may be executable by the processor to cause the apparatus to determine that a base station supports preconfigured uplink resources for grant-free uplink transmissions from the UE, transmit a preconfigured uplink resource request message to the base station based on the determining that the base station supports preconfigured uplink resources, where the preconfigured uplink resource request message includes a number of instances of preconfigured uplink resource grants requested by the UE, and receive a preconfigured uplink resource configuration from the base station.

Another apparatus for wireless communication at a UE is described. The apparatus may include means for determining that a base station supports preconfigured uplink resources for grant-free uplink transmissions from the UE, transmitting a preconfigured uplink resource request message to the base station based on the determining that the base station supports preconfigured uplink resources, where the preconfigured uplink resource request message includes a number of instances of preconfigured uplink resource grants requested by the UE, and receiving a preconfigured uplink resource configuration from the base station.

A non-transitory computer-readable medium storing code for wireless communication at a UE is described. The code may include instructions executable by a processor to determine that a base station supports preconfigured uplink resources for grant-free uplink transmissions from the UE, transmit a preconfigured uplink resource request message to the base station based on the determining that the base station supports preconfigured uplink resources, where the preconfigured uplink resource request message includes a number of instances of preconfigured uplink resource grants requested by the UE, and receive a preconfigured uplink resource configuration from the base station.

In some examples of the method, apparatuses, and non-transitory computer-readable medium described herein, the number of instances of preconfigured uplink resource (PUR) grants provides an explicit number of PUR grants or an indication of an infinite number of PUR grants. In some examples of the method, apparatuses, and non-transitory computer-readable medium described herein, the number of instances of preconfigured uplink resource (PUR) grants requested by the UE indicate a one-shot PUR configuration is requested or a multi-shot PUR configuration is requested.

In some examples of the method, apparatuses, and non-transitory computer-readable medium described herein, the preconfigured uplink resource configuration is provided as a delta configuration that indicates differences over a prior preconfigured uplink resource configuration of the UE. In some examples of the method, apparatuses, and non-transitory computer-readable medium described herein, the preconfigured uplink resource configuration us provided as a delta configuration that indicates differences over a default preconfigured uplink resource configuration or that indicates differences over a configuration being used at the UE. Some examples of the method, apparatuses, and non-transitory computer-readable medium described herein may further include operations, features, means, or instructions for transmitting, after receiving the preconfigured uplink resource (PUR) configuration, a PUR reconfiguration failure indication to the base station, and releasing the PUR configuration.

Some examples of the method, apparatuses, and non-transitory computer-readable medium described herein may further include operations, features, means, or instructions for determining, based on the message from the base station, a set of control channel resources to monitor for an uplink grant, and monitoring the set of control channel resources for the uplink grant, where the uplink grant indicates an uplink resource for transmission of a preconfigured uplink resource configuration response message to the base station. Some examples of the method, apparatuses, and non-transitory computer-readable medium described herein may further include operations, features, means, or instructions for determining that a preconfigured uplink resource (PUR) configuration may be de-configured based on receiving a broadcast system information transmission from the base station that indicates PUR may be unsupported, and releasing the PUR configuration.

In some examples of the method, apparatuses, and non-transitory computer-readable medium described herein, the preconfigured uplink resource request message may be transmitted to the base station in an uplink message of an early data transmission (EDT) procedure. Some examples of the method, apparatuses, and non-transitory computer-readable medium described herein may further include operations, features, means, or instructions for formatting the uplink resource request message to be transmitted in the uplink message of the EDT procedure, where the uplink resource request message indicates a requested configuration, reconfiguration, or release of a preconfigured uplink resource configuration.

In some examples of the method, apparatuses, and non-transitory computer-readable medium described herein, the uplink resource request message is transmitted in a message three (MSG3) transmission of the EDT procedure. In some examples of the method, apparatuses, and non-transitory computer-readable medium described herein, the message from the base station indicating preconfigured uplink resources of the UE is received in an early data transmission (EDT) downlink message 4 that provides a RRC connection release message or an RRC early data complete message. In some examples of the method, apparatuses, and non-transitory computer-readable medium described herein, the message from the base station explicitly or implicitly provides one or more of an indication that the UE is to use a prior preconfigured uplink resource (PUR) configuration, a confirmation of the prior PUR configuration, an indication to de-configure and release the prior PUR configuration, a new resource for a new PUR configuration, or any combinations thereof.

A method of wireless communication at a UE is described. The method may include receiving, from a base station, a radio resource configuration connection release message or radio resource configuration early data complete message that provides a preconfigured uplink resource configuration, where the preconfigured uplink resource configuration indicates a number of instances of preconfigured uplink resource grants for the UE and transmitting one or more uplink communications to the base station based on the preconfigured uplink resource configuration.

An apparatus for wireless communication at a UE is described. The apparatus may include a processor, memory coupled with the processor, and instructions stored in the memory. The instructions may be executable by the processor to cause the apparatus to receive, from a base station, a radio resource configuration connection release message or radio resource configuration early data complete message that provides a preconfigured uplink resource configuration, where the preconfigured uplink resource configuration indicates a number of instances of preconfigured uplink resource grants for the UE and transmit one or more uplink communications to the base station based on the preconfigured uplink resource configuration.

Another apparatus for wireless communication at a UE is described. The apparatus may include means for receiving, from a base station, a radio resource configuration connection release message or radio resource configuration early data complete message that provides a preconfigured uplink resource configuration, where the preconfigured uplink resource configuration indicates a number of instances of preconfigured uplink resource grants for the UE and transmitting one or more uplink communications to the base station based on the preconfigured uplink resource configuration.

A non-transitory computer-readable medium storing code for wireless communication at a UE is described. The code may include instructions executable by a processor to receive, from a base station, a radio resource configuration connection release message or radio resource configuration early data complete message that provides a preconfigured uplink resource configuration, where the preconfigured uplink resource configuration indicates a number of instances of preconfigured uplink resource grants for the UE and transmit one or more uplink communications to the base station based on the preconfigured uplink resource configuration.

In some examples of the method, apparatuses, and non-transitory computer-readable medium described herein, the number of instances of PUR grants provides an explicit number of PUR grants or an indication of an infinite number of PUR grants. Some examples of the method, apparatuses, and non-transitory computer-readable medium described herein may further include operations, features, means, or instructions for transmitting, prior to the receiving, a PUR request message to the base station based on determining that the base station supports preconfigured uplink resources, where the preconfigured uplink resource request message includes the number of instances of preconfigured uplink resource grants requested by the UE.

In some examples of the method, apparatuses, and non-transitory computer-readable medium described herein, the PUR request message is transmitted to the base station in an uplink message of an EDT procedure. In some examples of the method, apparatuses, and non-transitory computer-readable medium described herein, the uplink resource request message may be transmitted in a MSG3 transmission of the EDT procedure. In some examples of the method, apparatuses, and non-transitory computer-readable medium described herein, the preconfigured uplink resource configuration is provided as a delta configuration that indicates differences over a prior preconfigured uplink resource configuration of the UE, that indicates differences over a default preconfigured uplink resource configuration, or that indicates differences over a configuration being used at the UE.

A method of wireless communication at a UE is described. The method may include determining that a base station supports preconfigured uplink resources for grant-free uplink transmissions from the UE, transmitting a preconfigured uplink resource request message to the base station based on the determining that the base station supports preconfigured uplink resources, and receiving a preconfigured uplink resource response message from the base station responsive to the preconfigured uplink resource request message that indicates the preconfigured uplink resource request message is rejected, and where the preconfigured uplink resource response message indicates how the UE is to proceed based on the rejected preconfigured uplink resource request message.

An apparatus for wireless communication at a UE is described. The apparatus may include a processor, memory coupled with the processor, and instructions stored in the memory. The instructions may be executable by the processor to cause the apparatus to determine that a base station supports preconfigured uplink resources for grant-free uplink transmissions from the UE, transmit a preconfigured uplink resource request message to the base station based on the determining that the base station supports preconfigured uplink resources, and receive a preconfigured uplink resource response message from the base station responsive to the preconfigured uplink resource request message that indicates the preconfigured uplink resource request message is rejected, and where the preconfigured uplink resource response message indicates how the UE is to proceed based on the rejected preconfigured uplink resource request message.

Another apparatus for wireless communication at a UE is described. The apparatus may include means for determining that a base station supports preconfigured uplink resources for grant-free uplink transmissions from the UE, transmitting a preconfigured uplink resource request message to the base station based on the determining that the base station supports preconfigured uplink resources, and receiving a preconfigured uplink resource response message from the base station responsive to the preconfigured uplink resource request message that indicates the preconfigured uplink resource request message is rejected, and where the preconfigured uplink resource response message indicates how the UE is to proceed based on the rejected preconfigured uplink resource request message.

A non-transitory computer-readable medium storing code for wireless communication at a UE is described. The code may include instructions executable by a processor to determine that a base station supports preconfigured uplink resources for grant-free uplink transmissions from the UE, transmit a preconfigured uplink resource request message to the base station based on the determining that the base station supports preconfigured uplink resources, and receive a preconfigured uplink resource response message from the base station responsive to the preconfigured uplink resource request message that indicates the preconfigured uplink resource request message is rejected, and where the preconfigured uplink resource response message indicates how the UE is to proceed based on the rejected preconfigured uplink resource request message.

In some examples of the method, apparatuses, and non-transitory computer-readable medium described herein, the preconfigured uplink resource (PUR) request message indicates a reconfiguration of a prior PUR configuration is requested, and where the PUR response message indicates that the prior PUR configuration is to be released by the UE. In some examples of the method, apparatuses, and non-transitory computer-readable medium described herein, the preconfigured uplink resource (PUR) request message indicates a reconfiguration of a prior PUR configuration is requested, and where the PUR response message indicates that the prior PUR configuration is to be maintained by the UE.

A method of wireless communication at a base station is described. The method may include transmitting an indication that the base station supports preconfigured uplink resources for grant-free uplink transmissions, receiving, from a UE, a preconfigured uplink resource request message, transmitting, responsive to the preconfigured uplink resource request message, a preconfigured uplink resource configuration to the UE that identifies preconfigured uplink resources allocated to the UE, transmitting an uplink resource to the UE for a response message from the UE, and receiving, via the uplink resource for the response message, a preconfigured uplink resource configuration response from the UE.

An apparatus for wireless communication at a base station is described. The apparatus may include a processor, memory coupled with the processor, and instructions stored in the memory. The instructions may be executable by the processor to cause the apparatus to transmit an indication that the base station supports preconfigured uplink resources for grant-free uplink transmissions, receive, from a UE, a preconfigured uplink resource request message, transmit, responsive to the preconfigured uplink resource request message, a preconfigured uplink resource configuration to the UE that identifies preconfigured uplink resources allocated to the UE, transmit an uplink resource to the UE for a response message from the UE, and receive, via the uplink resource for the response message, a preconfigured uplink resource configuration response from the UE.

Another apparatus for wireless communication at a base station is described. The apparatus may include means for transmitting an indication that the base station supports preconfigured uplink resources for grant-free uplink transmissions, receiving, from a UE, a preconfigured uplink resource request message, transmitting, responsive to the preconfigured uplink resource request message, a preconfigured uplink resource configuration to the UE that identifies preconfigured uplink resources allocated to the UE, transmitting an uplink resource to the UE for a response message from the UE, and receiving, via the uplink resource for the response message, a preconfigured uplink resource configuration response from the UE.

A non-transitory computer-readable medium storing code for wireless communication at a base station is described. The code may include instructions executable by a processor to transmit an indication that the base station supports preconfigured uplink resources for grant-free uplink transmissions, receive, from a UE, a preconfigured uplink resource request message, transmit, responsive to the preconfigured uplink resource request message, a preconfigured uplink resource configuration to the UE that identifies preconfigured uplink resources allocated to the UE, transmit an uplink resource to the UE for a response message from the UE, and receive, via the uplink resource for the response message, a preconfigured uplink resource configuration response from the UE.

In some examples of the method, apparatuses, and non-transitory computer-readable medium described herein, the preconfigured uplink resource configuration may be provided as a delta configuration that indicates differences over a prior preconfigured uplink resource configuration of the UE, a current configuration being used by the UE, or a default preconfigured uplink resource configuration. In some examples of the method, apparatuses, and non-transitory computer-readable medium described herein, the uplink resource for the response message may be provided in an explicit indication with the preconfigured uplink resource configuration from the base station. In some examples of the method, apparatuses, and non-transitory computer-readable medium described herein, the uplink resource for the response message may be provided in a control channel transmission from the base station in a set of control channel resources to monitored by the UE. In some examples of the method, apparatuses, and non-transitory computer-readable medium described herein, the preconfigured uplink resource configuration failure indication may be transmitted when the UE is in an idle mode or in a connected mode with the base station.

A method of wireless communication at a base station is described. The method may include determining an early data transmission configuration for an early data transmission procedure available for transmitting the preconfigured uplink resource request message, where the early data transmission configuration provides for uplink transmission of UE payload data in an uplink message of the early data transmission procedure, receiving, from a UE, a preconfigured uplink resource request message in the uplink message of the early data transmission procedure, where the preconfigured uplink resource request message indicates a requested configuration, reconfiguration, or release of a preconfigured uplink resource configuration, and transmitting a preconfigured uplink resource configuration message to the UE responsive to the preconfigured uplink resource request message, where the preconfigured uplink resource configuration indicates an uplink resource for a response message from the UE.

An apparatus for wireless communication at a base station is described. The apparatus may include a processor, memory coupled with the processor, and instructions stored in the memory. The instructions may be executable by the processor to cause the apparatus to determine an early data transmission configuration for an early data transmission procedure available for transmitting the preconfigured uplink resource request message, where the early data transmission configuration provides for uplink transmission of UE payload data in an uplink message of the early data transmission procedure, receive, from a UE, a preconfigured uplink resource request message in the uplink message of the early data transmission procedure, where the preconfigured uplink resource request message indicates a requested configuration, reconfiguration, or release of a preconfigured uplink resource configuration, and transmit a preconfigured uplink resource configuration message to the UE responsive to the preconfigured uplink resource request message, where the preconfigured uplink resource configuration indicates an uplink resource for a response message from the UE.

Another apparatus for wireless communication at a base station is described. The apparatus may include means for determining an early data transmission configuration for an early data transmission procedure available for transmitting the preconfigured uplink resource request message, where the early data transmission configuration provides for uplink transmission of UE payload data in an uplink message of the early data transmission procedure, receiving, from a UE, a preconfigured uplink resource request message in the uplink message of the early data transmission procedure, where the preconfigured uplink resource request message indicates a requested configuration, reconfiguration, or release of a preconfigured uplink resource configuration, and transmitting a preconfigured uplink resource configuration message to the UE responsive to the preconfigured uplink resource request message, where the preconfigured uplink resource configuration indicates an uplink resource for a response message from the UE.

A non-transitory computer-readable medium storing code for wireless communication at a base station is described. The code may include instructions executable by a processor to determine an early data transmission configuration for an early data transmission procedure available for transmitting the preconfigured uplink resource request message, where the early data transmission configuration provides for uplink transmission of UE payload data in an uplink message of the early data transmission procedure, receive, from a UE, a preconfigured uplink resource request message in the uplink message of the early data transmission procedure, where the preconfigured uplink resource request message indicates a requested configuration, reconfiguration, or release of a preconfigured uplink resource configuration, and transmit a preconfigured uplink resource configuration message to the UE responsive to the preconfigured uplink resource request message, where the preconfigured uplink resource configuration indicates an uplink resource for a response message from the UE.

Some examples of the method, apparatuses, and non-transitory computer-readable medium described herein may further include operations, features, means, or instructions for transmitting an indication that the uplink message of the early data transmission procedure is available for the preconfigured uplink resource request message. In some examples of the method, apparatuses, and non-transitory computer-readable medium described herein, the indication may be transmitted in a system information block that is broadcast from the base station.

In some examples of the method, apparatuses, and non-transitory computer-readable medium described herein, the PUR configuration may be provided as a delta configuration that indicates differences over a prior PUR configuration of the UE, that indicates differences over a default PUR configuration, or that indicates differences over a configuration being used at the UE. Some examples of the method, apparatuses, and non-transitory computer-readable medium described herein may further include operations, features, means, or instructions for receiving, responsive to the preconfigured uplink resource (PUR) configuration message, an indication of a successful PUR configuration or PUR configuration failure using the uplink resource for the response message from the UE.

In some examples of the method, apparatuses, and non-transitory computer-readable medium described herein, the preconfigured uplink resource (PUR) configuration may be provided in an early data transmission (EDT) early data complete message that indicates configured PUR resources of the UE. In some examples of the method, apparatuses, and non-transitory computer-readable medium described herein, the EDT early data complete message explicitly or implicitly provides one or more of an indication that the UE is to use a prior PUR configuration, a confirmation of the prior PUR configuration, an indication to de-configure and release the prior PUR configuration, a new resource for a new PUR configuration, or any combinations thereof. In some examples of the method, apparatuses, and non-transitory computer-readable medium described herein, the indication to de-configure and release the prior PUR configuration includes a Boolean flag in the EDT early data complete message.

Some examples of the method, apparatuses, and non-transitory computer-readable medium described herein may further include operations, features, means, or instructions for transmitting a broadcast system information transmission that indicates PUR is unsupported and that UEs is to release PUR configurations. Some examples of the method, apparatuses, and non-transitory computer-readable medium described herein may further include operations, features, means, or instructions for determining that the PUR configuration of the UE is to be reconfigured or released, transmitting a page message to the UE, receiving the random access request message from the UE responsive to the page message, and transmitting an indication to reconfigure or release the PUR configuration responsive to the random access request message.

In some examples of the method, apparatuses, and non-transitory computer-readable medium described herein, the indication to reconfigure the PUR configuration indicates a new PUR configuration to be used by the UE, or indicates that the UE is to release the PUR configuration. Some examples of the method, apparatuses, and non-transitory computer-readable medium described herein may further include operations, features, means, or instructions for transmitting, to the UE, a preconfigured uplink resource (PUR) release message, and de-configuring the PUR configuration based on the PUR release message. In some examples of the method, apparatuses, and non-transitory computer-readable medium described herein, the PUR release message may be transmitted while the UE is in a connected mode or in an EDT random access response message, and where the PUR release message is a radio resource control (RRC) PUR reconfiguration message.

A method of wireless communication at a base station is described. The method may include transmitting an indication that the base station supports preconfigured uplink resources for grant-free uplink transmissions, receiving, from a UE, a preconfigured uplink resource request message, where the preconfigured uplink resources request message includes a number of instances of preconfigured uplink resource grants requested by the UE, and transmitting a preconfigured uplink resource configuration to the UE responsive to the preconfigured uplink resource request message.

An apparatus for wireless communication at a base station is described. The apparatus may include a processor, memory coupled with the processor, and instructions stored in the memory. The instructions may be executable by the processor to cause the apparatus to transmit an indication that the base station supports preconfigured uplink resources for grant-free uplink transmissions, receive, from a UE, a preconfigured uplink resource request message, where the preconfigured uplink resources request message includes a number of instances of preconfigured uplink resource grants requested by the UE, and transmit a preconfigured uplink resource configuration to the UE responsive to the preconfigured uplink resource request message.

Another apparatus for wireless communication at a base station is described. The apparatus may include means for transmitting an indication that the base station supports preconfigured uplink resources for grant-free uplink transmissions, receiving, from a UE, a preconfigured uplink resource request message, where the preconfigured uplink resources request message includes a number of instances of preconfigured uplink resource grants requested by the UE, and transmitting a preconfigured uplink resource configuration to the UE responsive to the preconfigured uplink resource request message.

A non-transitory computer-readable medium storing code for wireless communication at a base station is described. The code may include instructions executable by a processor to transmit an indication that the base station supports preconfigured uplink resources for grant-free uplink transmissions, receive, from a UE, a preconfigured uplink resource request message, where the preconfigured uplink resources request message includes a number of instances of preconfigured uplink resource grants requested by the UE, and transmit a preconfigured uplink resource configuration to the UE responsive to the preconfigured uplink resource request message.

In some examples of the method, apparatuses, and non-transitory computer-readable medium described herein, the number of instances of preconfigured uplink resource grants provides an explicit number of PUR grants or an indication of an indefinite number of PUR grants. In some examples of the method, apparatuses, and non-transitory computer-readable medium described herein, the number of instances being zero indicates the preconfigured uplink resource configuration is to be released. In some examples of the method, apparatuses, and non-transitory computer-readable medium described herein, the number of instances of preconfigured uplink resource (PUR) grants requested by the UE indicate a one-shot PUR configuration is requested or a multi-shot PUR configuration is requested.

A method of wireless communication at a base station is described. The method may include transmitting an indication that the base station supports preconfigured uplink resources for grant-free uplink transmissions, receiving, from a UE, a preconfigured uplink resource request message, and transmitting a preconfigured uplink resource response message to the UE responsive to the preconfigured uplink resources request message that indicates the preconfigured uplink resource request message is rejected, and where the preconfigured uplink resource response message indicates how the UE is to proceed based on the rejected preconfigured uplink resource request message.

An apparatus for wireless communication at a base station is described. The apparatus may include a processor, memory coupled with the processor, and instructions stored in the memory. The instructions may be executable by the processor to cause the apparatus to transmit an indication that the base station supports preconfigured uplink resources for grant-free uplink transmissions, receive, from a UE, a preconfigured uplink resource request message, and transmit a preconfigured uplink resource response message to the UE responsive to the preconfigured uplink resources request message that indicates the preconfigured uplink resource request message is rejected, and where the preconfigured uplink resource response message indicates how the UE is to proceed based on the rejected preconfigured uplink resource request message.

Another apparatus for wireless communication at a base station is described. The apparatus may include means for transmitting an indication that the base station supports preconfigured uplink resources for grant-free uplink transmissions, receiving, from a UE, a preconfigured uplink resource request message, and transmitting a preconfigured uplink resource response message to the UE responsive to the preconfigured uplink resources request message that indicates the preconfigured uplink resource request message is rejected, and where the preconfigured uplink resource response message indicates how the UE is to proceed based on the rejected preconfigured uplink resource request message.

A non-transitory computer-readable medium storing code for wireless communication at a base station is described. The code may include instructions executable by a processor to transmit an indication that the base station supports preconfigured uplink resources for grant-free uplink transmissions, receive, from a UE, a preconfigured uplink resource request message, and transmit a preconfigured uplink resource response message to the UE responsive to the preconfigured uplink resources request message that indicates the preconfigured uplink resource request message is rejected, and where the preconfigured uplink resource response message indicates how the UE is to proceed based on the rejected preconfigured uplink resource request message.

In some examples of the method, apparatuses, and non-transitory computer-readable medium described herein, the preconfigured uplink resource (PUR) request message indicates a reconfiguration of a prior PUR configuration is requested, and where the PUR response message indicates that the prior PUR configuration is to be released by the UE. In some examples of the method, apparatuses, and non-transitory computer-readable medium described herein, the preconfigured uplink resource (PUR) request message indicates a reconfiguration of a prior PUR configuration is requested, and where the PUR response message indicates that the prior PUR configuration is to be maintained by the UE.

DETAILED DESCRIPTION

Figure 1:
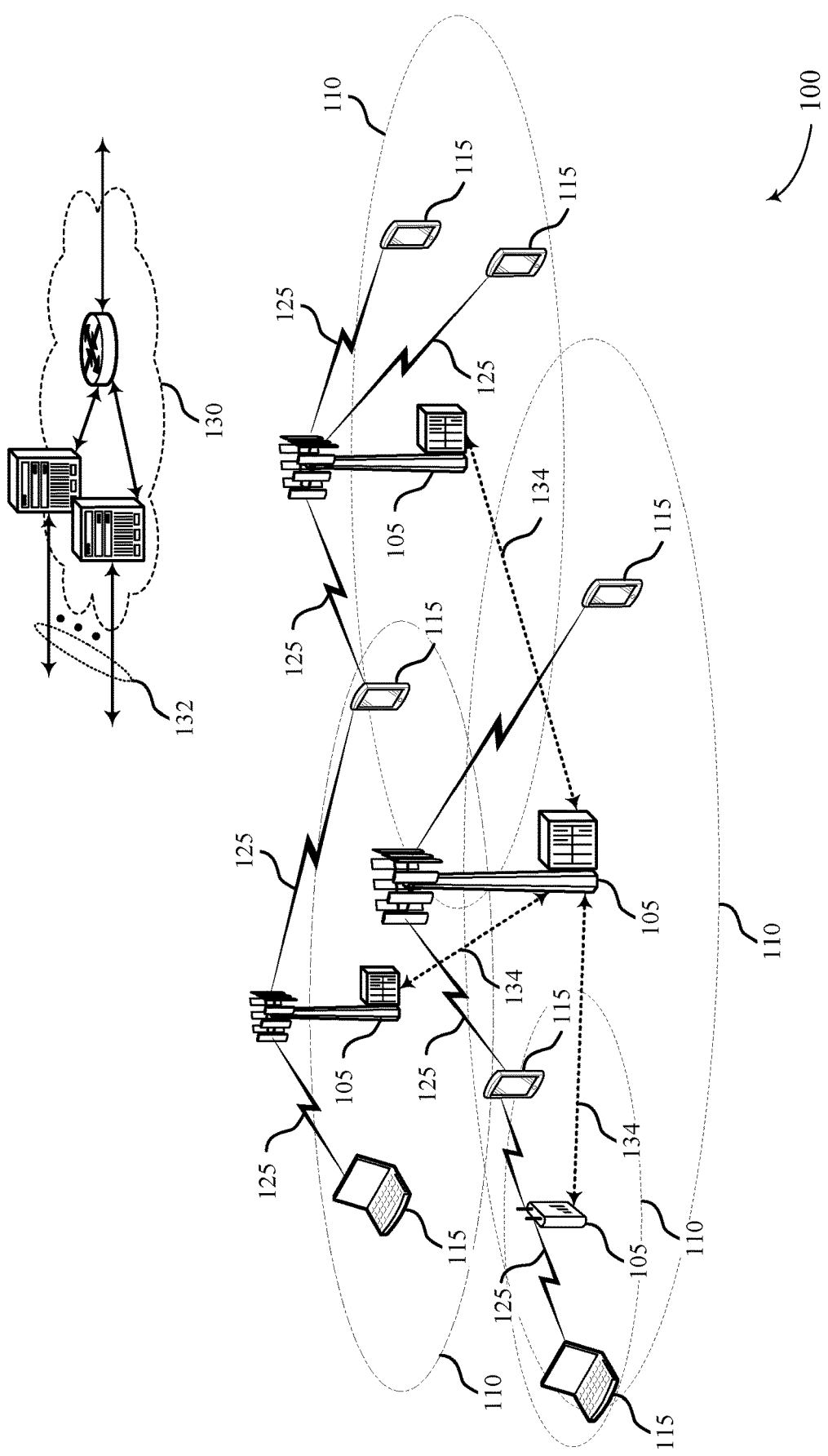
FIG. 1 illustrates an example of a system for wireless communications that supports preconfigured uplink resource (PUR) techniques in wireless communications in accordance with aspects of the present disclosure.

Various aspects of the present disclosure provide improved methods, systems, devices, and apparatuses that support signaling and configuration related to preconfigured uplink resources (PUR). Various described techniques provide for communicating that PUR resources are available at a base station, such as via a system information block (SIB) transmission that indicates support for PUR. A UE may receive the indication of support for PUR, and may determine to request PUR resources from a base station (e.g., based on uplink data to be transmitted to the base station). The UE, in some cases, may transmit a PUR request message requesting PUR resources. The base station may receive the PUR request message and determine whether to allocate PUR resources to the UE. The base station may transmit a PUR response with a PUR allocation to the UE in cases where the base station determines to allocate PUR resources to the UE, or may transmit a PUR rejection message to the UE in cases where the base station determines that no PUR resources are available to allocate to the UE.

In some cases, the base station may provide a PUR allocation that is different than a requested PUR configuration from the UE. It is noted that various examples of the present disclosure discuss techniques in which PUR configuration is requested or configured. Such techniques may also be used when a reconfiguration of an existing PUR configuration is requested or configured, and both PUR configuration and PUR reconfiguration may be referred to herein simply as "PUR configuration." In cases where the base station provides a PUR allocation that is different than a requested PUR configuration, the UE may determine that the different PUR configuration is not sufficient for the UE, and may transmit a PUR configuration failure. The PUR configuration failure may indicate that the UE will release the PUR configuration, and the base station may reallocate the configured PUR for other purposes. In some cases, the transmission from the base station to the UE that indicates the PUR configuration may provide an indication of uplink resources that may be used by the UE to transmit the PUR configuration failure indication, or that may be used by the UE to transmit a PUR configuration complete indication. In some cases, the indication of the uplink resources may be an explicit indication of an uplink grant that is provided with the PUR configuration. Additionally or alternatively, the UE may monitor for one or more downlink control channel (e.g., physical downlink control channel (PDCCH)) transmissions during a certain window to obtain an uplink grant for the PUR failure or PUR configuration complete indication. In some cases, the UE may transmit the PUR failure or PUR configuration complete message while in a connected mode (e.g., a radio resource control (RRC) connected mode) or while in an idle (e.g., an RRC idle) mode. In cases where the UE is in idle mode, the PUR failure or PUR configuration complete message may be transmitted in an initial occurrence of the configured PUR.

In some cases, the UE may determine that a random access procedure for establishing a connection with the base station is configured to allow for an early data transmission (EDT) as part of the random access procedure. Such an EDT random access procedure may allow for a UE to transmit a data payload as part of the random access procedure, which may reduce overhead and allow for transmissions of relatively small amounts of data. In some cases, an EDT random access procedure may be used to transmit a PUR request from the UE, and may be used by the base station to transmit a PUR configuration to the UE. In such cases, various aspects of an EDT random access procedure may include transmissions that provide for PUR request and configuration information to be communicated between the base station and UE.

In some cases a PUR request from the UE for a PUR configuration or PUR reconfiguration may provide an indication of a number of instances of PUR grants are requested. In such cases, a UE may indicate a value of a number of such PUR grants that are requested, may indicate that an indefinite number of PUR grants are requested (i.e., that such grants are to continue indefinitely), or may indicate that zero PUR grants are requested and that the PUR configuration is to be released. Additionally or alternatively, in some cases a base station may determine that a requested PUR reconfiguration is not available for a UE, and may transmit a PUR reject indication to the UE that may also indicate how the UE is to handle an existing PUR configuration. In some cases, the base station may indicate that the UE is to release the existing PUR configuration. In other cases, the base station may indicate that the UE is to maintain the existing PUR configuration. In some cases, the indication from the base station may be an explicit indication that is provided with the PUR reject indication.

Such techniques may allow for a single message data transmission from a UE. Such a single message transmission may have reduced overhead relative to other techniques for uplink transmissions of relatively small amounts of data, such as techniques that employ a four-step uplink random access procedure, allowing data transmission in a fifth message (MSG5), or EDT random access techniques that provide for data transmission in a third message (MSG3). In cases that use legacy random access procedures, or EDT procedures, such techniques still rely on a grant from a base station before a UE in IDLE mode can transmit uplink data. Single message uplink transmissions from a UE in IDLE mode and having an up to date timing advance (TA), as discussed herein, may be supported that have overhead that is further reduced relative to random access or EDT techniques. Such reduced overhead may enhance transmission efficiency and reduce power consumption. In some cases, UEs having relatively small amounts of data to transmit at certain intervals (e.g., enhanced machine type communication (eMTC) UEs, or narrowband Internet of Things (NB-IoT) UEs) that remain stationary (i.e., have an up to date TA) may benefit from the reduced signaling overhead of techniques such as discussed herein.

Aspects of the disclosure are initially described in the context of a wireless communications system. Several exemplary process flows are then discussed for signaling between UEs and base stations to configure and use PUR resources. Aspects of the disclosure are further illustrated by and described with reference to apparatus diagrams, system diagrams, and flowcharts that relate to PUR techniques in wireless communications.

FIG. 1 illustrates an example of a wireless communications system 100 that supports PUR techniques in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

In some cases, UEs 115 and base stations 105 may use PUR to help reduce signaling overhead associated with uplink transmissions. In some cases, a base station 105 may transmit an indication of PUR support (e.g., via a SIB). A UE 115 may receive the indication, and transmit a PUR request to the base station 105. A PUR response from the base station 105 may indicate a PUR allocation for the UE 115 that may be used for uplink transmissions. In some cases, the base station 105 may provide a PUR allocation that is different than a requested PUR configuration provided by the UE 115 in the PUR request. The UE 115 may determine that the different PUR configuration is not sufficient for the UE 115, and may transmit a PUR configuration failure to the base station 105. In some cases, the transmission from the base station 105 to the UE 115 that indicates the PUR configuration may provide an indication of uplink resources that may be used by the UE 115 to transmit the PUR configuration failure indication.

In some cases, an EDT random access procedure may be used to transmit a PUR request from the UE 115, and may be used by the base station 105 to transmit a PUR configuration to the UE 115. Additionally or alternatively, a PUR request from the UE 115 for a PUR configuration or PUR reconfiguration may provide an indication of a number of instances of PUR grants are requested. Additionally or alternatively, a base station 105 may determine that a requested PUR reconfiguration is not available for a UE 115, and may transmit a PUR reject indication to the UE 115 that may also indicates how the UE 115 is to handle an existing PUR configuration (e.g., whether to release the existing PUR configuration or maintain the existing PUR configuration).

Figure 2:
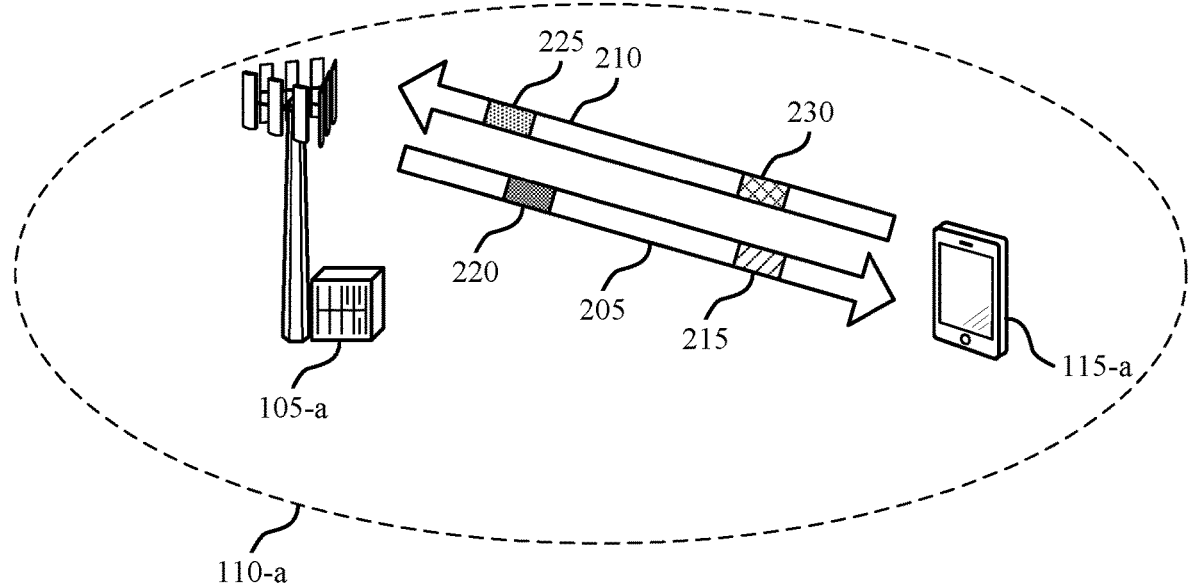
FIG. 2 illustrates an example of a portion of a wireless communications system that supports PUR techniques in wireless communications in accordance with aspects of the present disclosure.

FIG. 2 illustrates an example of a wireless communications system 200 that supports PUR techniques in wireless communications in accordance with aspects of the present disclosure. In some examples, wireless communications system 200 may implement aspects of wireless communications system 100. In some examples, the wireless communications system 200 may include a base station 105-a and UE 115-a, which may be examples of the corresponding devices as described with reference to FIG. 1. UE 115-a may communicate with the base station 105-a within a coverage area 110-a via downlink transmissions 205 and uplink transmissions 210.

In some cases, the base station 105-a may configure a set of resources as PUR that may be used for uplink transmissions of the UE 115-a, and other UEs that may be served by the base station 105-a. In some cases, the UE 115-a and base station 105-a may operate using eMTC or NB-IoT communications, and the UE 115-a may have periodic transmissions of relatively small amounts of data, such as data associated with a sensor reading or a device status. In some cases, the UE 115-a may be stationary, or may move within a relatively small area (e.g., in a factory automation deployment), and may thus have an up-to-date timing advance (TA) for synchronizing uplink transmissions to the base station 105-a even when the UE 115-a comes out of IDLE mode to send an uplink transmission.

In some cases, the base station 105-a may provide a PUR indication 215 that indicates support for PUR at the base station 105-*a*. Such an indication may be provided, for example, in a SIB or other downlink signaling (e.g., in a physical broadcast channel (PBCH) transmitted with a synchronization signal block (SSB), remaining minimum system information (RMSI), etc.). The UE 115-*a* may receive the PUR indication 215 and determine that data transmission needs at the UE 115-*a* would benefit from preconfigured uplink transmissions. For example, if the UE 115-*a* has periodic uplink transmissions that are less than a transmission size threshold, the UE 115-*a* may determine to request a PUR configuration from the base station 105-*a*. Additionally or alternatively, if the UE 115-*a* has relatively high priority traffic (e.g., data traffic for critical systems or safety-related information) the UE 115-*a* may determine to request a PUR configuration from the base station 105-*a*. In some cases, the PUR indication 215 may provide an indication of a data size for the associated uplink transmissions that the UE 115-*a* may use to determine whether to request a PUR configuration.

The UE 115-*a* may determine to request a PUR configuration, and may transmit a PUR request 225 to the base station 105-*a*. The UE 115-*a* may be in connected mode (e.g., in RRC CONNECTED mode) when it sends PUR request 225 in some cases, and may transmit the message using a dynamic uplink grant (e.g., uplink resources allocated by the base station 105-*a* and indicated to the UE 115-*a* in downlink control information (DCI)), or in a preconfigured grant (e.g., a semi-persistent scheduling (SPS) grant previously provided to the UE 115-*a*). In some cases, the UE 115-*a* may be in IDLE mode (e.g., RRC IDLE mode) and use EDT to send the PUR request 225 in cases where the base station 105-*a* supports EDT. Further, in some cases the UE 115-*a* may have an existing PUR allocation and may use the previously configured PUR grant to send PUR request 225 for a reconfiguration of the existing PUR allocation.

The base station 105-*a* may receive the PUR request 225 and determine a PUR configuration or reconfiguration for the UE 115-*a*, which may be transmitted to the UE 115-*a* in PUR allocation 220. In some cases, the base station 105-*a* may determine that sufficient PUR resources are not available for the request from the UE 115-*a* (e.g., due to other UEs having higher priority data using PUR), and may transmit a PUR rejection message, which in cases where an existing PUR configuration is present may indicate whether to maintain or release the existing PUR configuration. The UE 115-*a*, upon receiving a PUR rejection message that indicates to release the existing PUR configuration, or in cases where an existing PUR configuration is not present, may fall back to legacy uplink techniques (e.g., legacy random access procedures, or EDT random access procedures). In some cases, the UE 115-*a* may optionally acknowledge that the PUR allocation 220 (or rejection) was received. In cases where the UE 115-*a* is configured, or reconfigured, with a PUR allocation, the UE 115-*a* may then transmit uplink data 230 using the resources indicated in PUR configuration. In such a manner, the UE 115-*a* may be in idle mode (e.g., RRC IDLE mode) and may transmit uplink data in a single uplink transmission (e.g., similar to a random access MSG1 transmission) without receiving a separate uplink grant using the PUR allocation. In some cases, the UE 115-*a* may determine to request the PUR configuration based on, for example, a traffic pattern of uplink data (e.g., a size of packets, interarrival rate, etc.), a QOS requirement, or combinations thereof.

Figure 3:
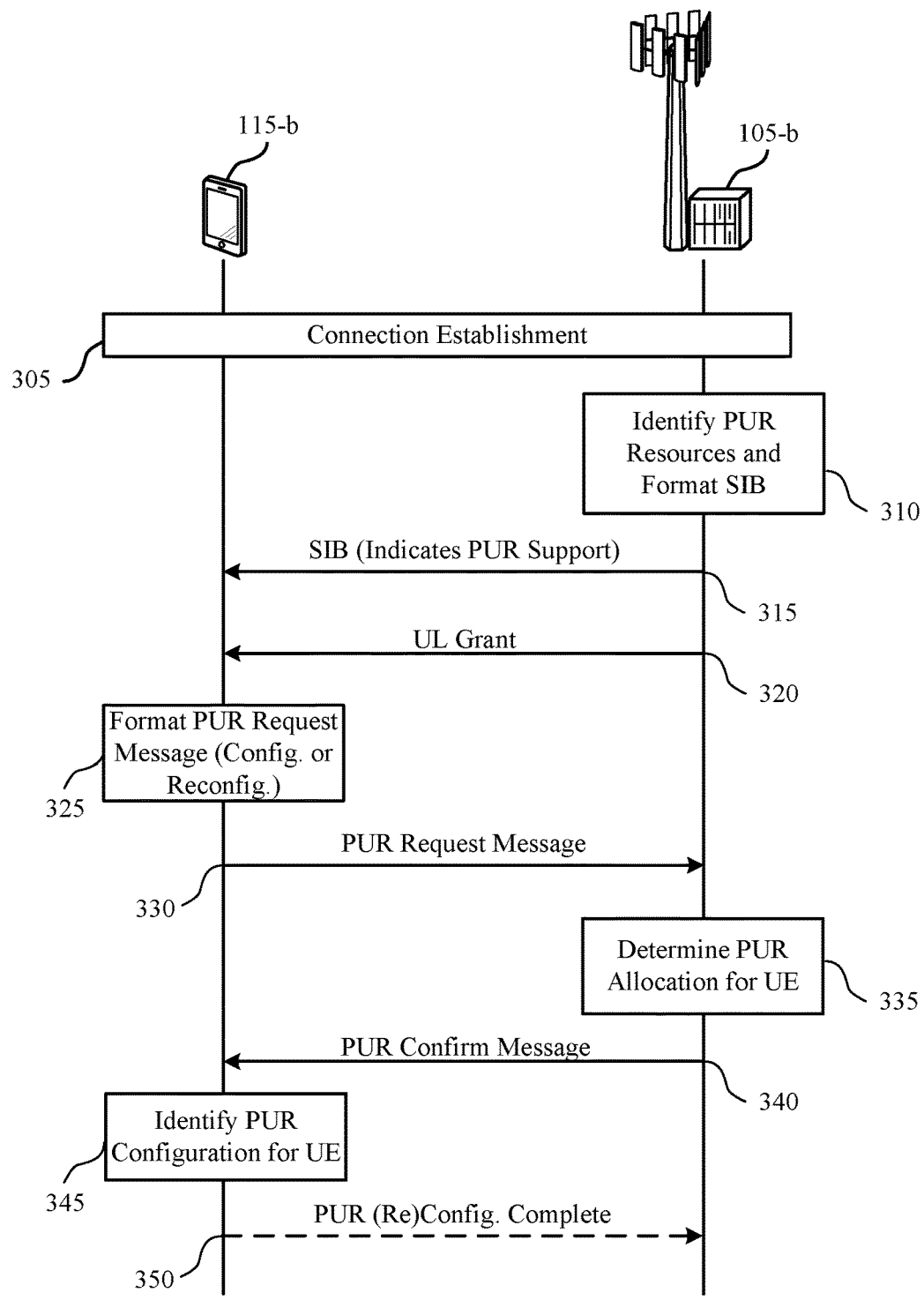
FIGS. 3 through 9 illustrate examples of a process flows that support PUR techniques in wireless communications in accordance with aspects of the present disclosure.

FIG. 3 illustrates an example of a process flow 300 that supports PUR techniques in wireless communications in accordance with aspects of the present disclosure. In some examples, process flow 300 may implement aspects of wireless communications system 100 or 200. In this example, process flow 300 includes UE 115-*b* and base station 105-*b*, which may be examples of the corresponding devices described with reference to FIGS. 1 and 2.

At 305, the base station 105-*b* and UE 115-*b* may perform a connection establishment (e.g., RRC Connection establishment). Such a connection establishment may be performed using connection establishment procedures that are established for wireless communications (e.g., using random access techniques established in LTE or NR systems).

At 310, the base station 105-*b* may identify PUR resources and format a SIB that indicates PUR support. In some cases, the SIB may provide information for various PUR parameters, such as an amount of data that may be transmitted in uplink transmissions using the PUR, a traffic or service priority associated with the PUR grants, etc. In some cases, the SIB may provide an index into a preconfigured mapping of PUR configurations. In some cases, the base station 105-*b* may configure a number of different sets of PURs and the SIB may be formatted to indicate the multiple sets of PURs. At 315, the base station 105-*b* may transmit, and the UE 115-*b* may receive, the SIB with the indication of PUR support.

In this example, the UE 115-*b* may be in connected mode, and at 320 the base station 105-*b* may provide an uplink grant to the UE 115-*b*. The uplink grant may be provided based on a buffer status report (BSR) provided by the UE 115-*b*, for example. At 325, the UE 115-*b* may format a PUR request message. The PUR request message may request a new PUR configuration, for example. In some cases, the UE 115-*b* may have an existing PUR configuration and the PUR request may be for a reconfiguration of the existing PUR configuration (e.g., based on updated data traffic at the UE 115-*b*, a change in a presence of higher priority data at the UE 115-*b*, etc.).

At 330, the UE 115-*b* may transmit the PUR request message. In some cases, the PUR request message may be transmitted using the uplink resources provided in the uplink grant. In other cases, as discussed in more detail below, the UE 115-*b* may transmit the PUR request message using other uplink resources (e.g., SPS resources, EDT random access procedure transmissions, other existing PUR resources, etc.).

At 335, the base station 105-*b* may receive the PUR request message and determine a PUR configuration for the UE 115-*b*. In some cases, the base station 105-*b* may determine the PUR configuration based on one or more of QOS information provided in the PUR request, a type of PUR requested (e.g., whether acknowledged mode (AM) or unacknowledged mode (UM) PUR are requested), other PUR allocations to other UEs, an amount of available PUR resources, or any combinations thereof.

At 340, the base station 105-*b* may transmit a PUR confirmation message to the UE 115-*b* that indicates a PUR configuration for the UE 115-*b*. In some cases, the PUR configuration may provide a new allocation of PUR for the UE 115-*b*. In other cases, the PUR configuration may be a reconfigured allocation of an existing PUR configuration of the UE 115-*b*. In some cases, the PUR configuration may be shared by multiple different UEs, and the PUR configuration may indicate the shared resources and provide information that may be used by the UE 115-*b* to allow the base station 105-*b* to differentiate transmissions from the UE 115-*b* (e.g., a preamble to be provided with uplink transmissions, a spreading sequence to be applied to uplink transmissions, a cyclic shift to be applied to a sequence, and the like).

At 345, the UE 115-*b* may identify the PUR configuration provided by the base station 105-*b*. In cases where the PUR configuration is a new configuration, the UE 115-*b* may configure uplink transmissions to be transmitted using the allocated PUR resources. In cases, where the PUR configuration is a reconfiguration of an existing PUR configuration, the UE 115-*b* may reconfigure the PUR configuration in accordance with the new PUR configuration. At 350, the UE 115-*b* may optionally transmit a PUR configuration (or reconfiguration) complete message to the base station 105-*b*. In some cases, as discussed in more detail below, the UE 115-*b* may determine that the received PUR configuration is not suitable for the UE (e.g., due to a number of PUR grants being below a number that is needed for a particular priority of transmissions, etc.). In such cases, rather than transmit a configuration complete indication, the UE 115-*b* may transmit a PUR failure indication that may allow both the UE 115-*b* and the base station 105-*b* to release the configured resources of the PUR configuration. In some cases, uplink resources for such an indication to the base station 105-*a* may be indicated in the PUR confirmation message (e.g., indicated in an explicit uplink grant, a window during which the UE 115-*b* is to monitor for a PDCCH transmission with the uplink grant, a first instance of a PUR grant, etc.).

Figure 4:
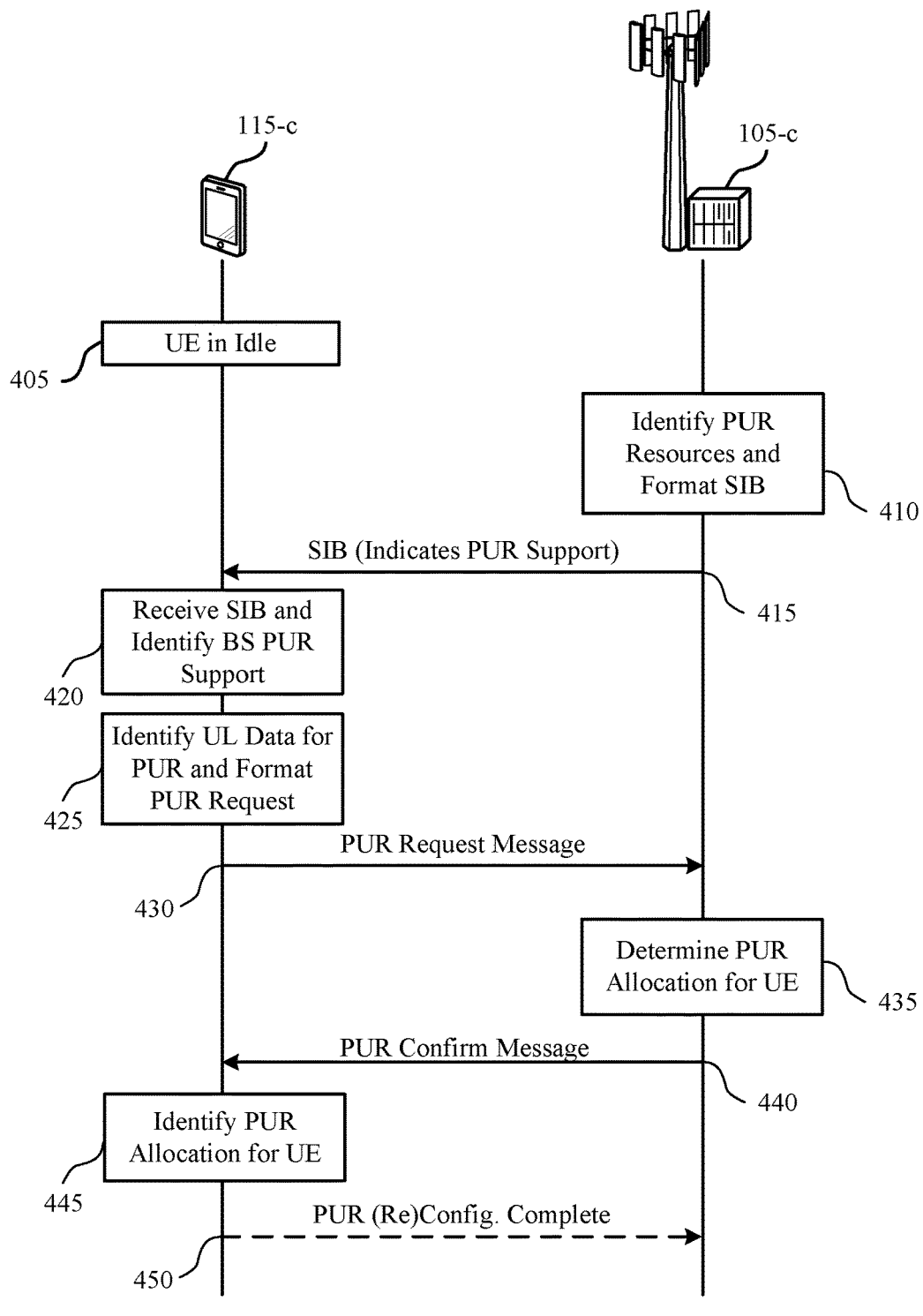

FIG. 4 illustrates another example of a process flow 400 that supports PUR techniques in wireless communications in accordance with aspects of the present disclosure. In some examples, process flow 400 may implement aspects of wireless communications system 100 or 200. In this example, process flow 400 includes UE 115-*c* and base station 105-*c*, which may be examples of the corresponding devices described with reference to FIGS. 1 and 2.

At 405, the UE 115-*c* may be in IDLE mode. In some cases, the UE 115-*c* may have previously performed a connection establishment and may be idle (e.g., in RRC_IDLE mode) due to a lack of uplink or downlink data to be transmitted.

At 410, the base station 105-*c* may identify PUR resources and format a SIB that indicates PUR support. In some cases, as discussed with respect to FIG. 3, the SIB may provide information for various PUR parameters, such as an amount of data that may be transmitted in uplink transmissions using the PUR resources, a traffic or service priority associated with the PUR configurations, etc. In some cases, the SIB may provide an index into a preconfigured mapping of PUR configurations. In some cases, the base station 105-*c* may configure a number of different PUR configurations and the SIB may be formatted to indicate the multiple PUR configurations. At 415, the base station 105-*c* may transmit, and the UE 115-*c* may receive, the SIB with the indication of PUR support.

In this example, the UE 115-*c* may be in idle mode, and at 420 the UE 115-*c* may receive the SIB and identify base station 105-*c* supports PUR. In some cases, the UE 115-*c* may periodically monitor for SIB and other downlink control transmissions while in idle mode, and may receive the SIB during such monitoring.

At 425, the UE 115-*c* may identify uplink data for PUR and format a PUR request message. The PUR request message may request a new PUR configuration, for example. In some cases, the UE 115-*c* may have an existing PUR configuration and the PUR request may be for a reconfiguration of the existing PUR configuration (e.g., based on updated data traffic at the UE 115-*c*, a change in a presence of higher priority data at the UE 115-*c*, etc.).

At 430, the UE 115-*c* may transmit the PUR request message. In some cases, the PUR request message may be transmitted using, for example, SPS resources that were previously allocated to the UE 115-*c*. In other cases, the UE 115-*c* may perform a random access procedure and transmit the PUR request upon completion of the random access procedure (e.g., in a MSG5 transmission). In still other cases, the UE 115-*c* may have an existing PUR allocation, and may transmit the PUR request using the existing PUR allocation. Further, in some cases as will be discussed in more detail with respect to FIG. 7, the PUR request message may be transmitted in an EDT random access message.

At 435, the base station 105-*c* may receive the PUR request message and determine a PUR configuration for the UE 115-*c*. In some cases, the base station 105-*c* may determine the PUR configuration based on one or more of QOS information provided in the PUR request, whether AM or UM PUR are requested, other PUR allocations to other UEs, an amount of available PUR resources, or any combinations thereof.

At 440, the base station 105-*c* may transmit a PUR confirmation message to the UE 115-*c* that indicates a PUR configuration for the UE 115-*c*. In some cases, the PUR configuration may be a new configuration for the UE 115-*c*. In other cases, the PUR configuration may be a reconfigured configuration of an existing PUR of the UE 115-*c*. In some cases, the PUR configuration may be shared by multiple different UEs, and the PUR configuration may indicate the shared resources and provide information that may be used by the UE 115-*c* to allow the base station 105-*c* to differentiate transmissions from the UE 115-*c* (e.g., a preamble to be provided with uplink transmissions, a spreading sequence to be applied to uplink transmissions, a cyclic shift to be applied to a sequence, and the like).

At 445, the UE 115-*c* may identify the PUR configuration provided by the base station 105-*c*. In cases where the PUR configuration is a new configuration, the UE 115-*c* may configure uplink transmissions to be transmitted using the PUR configuration. In cases, where the PUR configuration is a reconfiguration of an existing PUR configuration, the UE 115-*c* may reconfigure the PUR configuration in accordance with the new PUR configuration. At 450, the UE 115-*c* may optionally transmit a PUR configuration (or reconfiguration) complete message (or PUR configuration failure message) to the base station 105-*c*.

Figure 5:
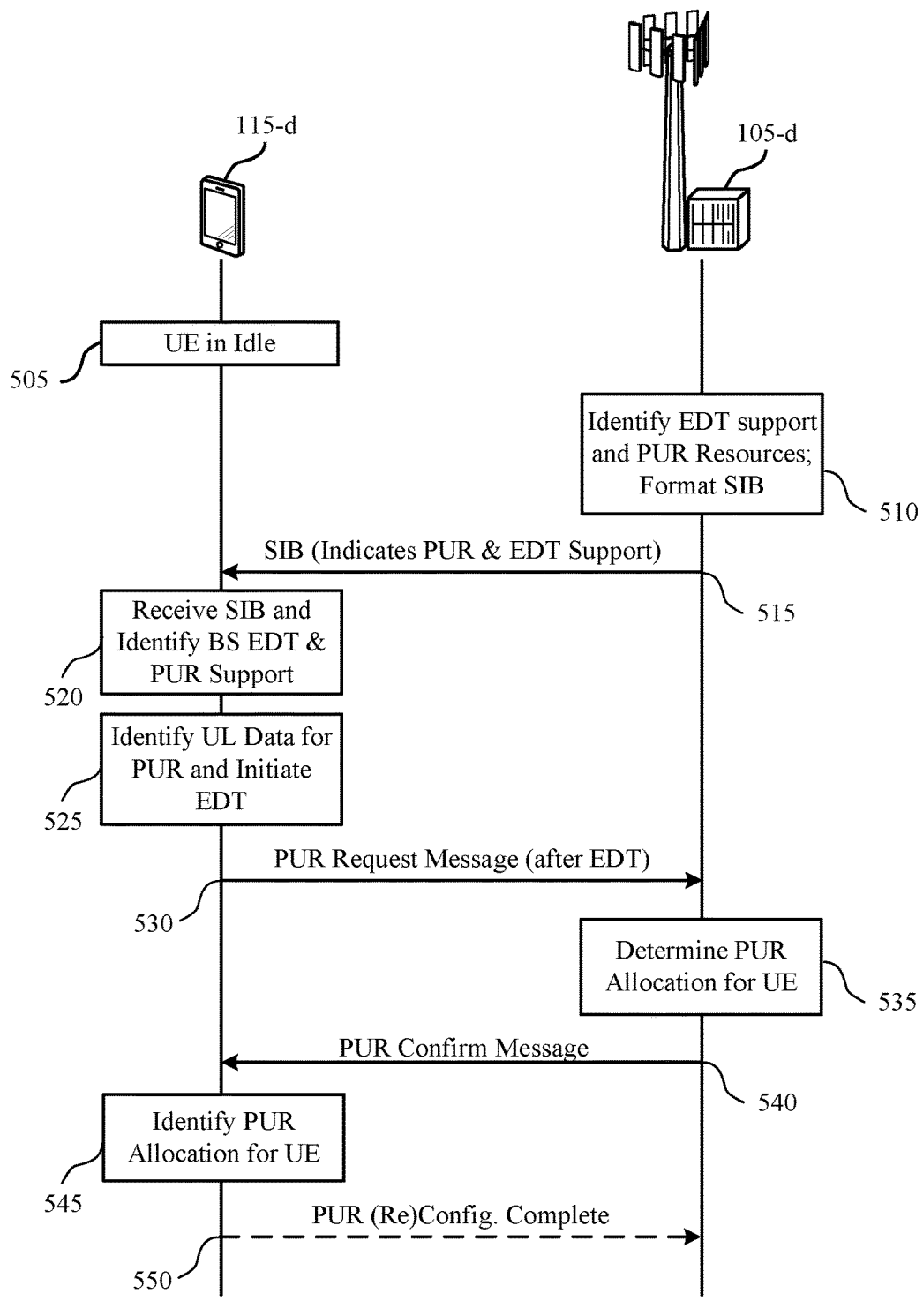

FIG. 5 illustrates an example of a process flow 500 that supports PUR techniques in wireless communications in accordance with aspects of the present disclosure. In some examples, process flow 500 may implement aspects of wireless communications system 100 or 200. In this example, process flow 500 includes UE 115-*d* and base station 105-*d*, which may be examples of the corresponding devices described with reference to FIGS. 1 and 2.

At 505, the UE 115-*d* may be in IDLE mode. In some cases, the UE 115-*d* may have previously performed a connection establishment and may be idle due to a lack of uplink or downlink data to be transmitted. At 510, the base station 105-*d* may identify EDT support and PUR resources, and format a SIB that indicates PUR and EDT support. In some cases, the base station may use separate SIBs to indicate PUR and EDT support. In some cases, as discussed with respect to FIGS. 3 and 4, the SIB may provide information for various PUR parameters, such as an amount of data that may be transmitted in uplink transmissions using the PUR resources, a traffic or service priority associated with PUR configurations, etc. In some cases, the SIB may provide an index into a preconfigured mapping of PUR configurations. In some cases, the base station 105-*d* may configure a number of different PUR configurations and the SIB may be formatted to indicate the multiple PUR configurations. At 515, the base station 105-*d* may transmit, and the UE 115-*d* may receive, the SIB with the indication of PUR support.

In this example, the UE 115-*d* may be in idle mode, and at 520 the UE 115-*d* may receive the SIB(s) and identify base station 105-*d* supports EDT and PUR. In some cases, the UE 115-*d* may periodically monitor for SIB and other downlink control transmissions while in idle mode, and may receive the SIB(s) during such monitoring.

At 525, the UE 115-*d* may identify uplink data for PUR and format a PUR request message to be transmitted in an EDT. The PUR request message may request a new PUR configuration, for example. In some cases, the UE 115-*d* may have an existing PUR configuration and the PUR request may be for a reconfiguration of the existing PUR configuration (e.g., based on updated data traffic at the UE 115-*d*, a change in a presence of higher priority data at the UE 115-*d*, etc.).

At 530, the UE 115-*d* may transmit the PUR request message (e.g., after EDT). In some cases, the UE 115-*d* may transmit a random access request and provide the PUR request in an EDT associated with the random access procedure, in accordance with established techniques for transmitting EDT, as will be discussed in more detail with respect to FIG. 7.

At 535, the base station 105-*d* may receive the PUR request message and determine a PUR configuration for the UE 115-*d*. In some cases, the base station 105-*d* may determine the PUR configuration based on one or more of QOS information provided in the PUR request, whether AM or UM PUR are requested, other PUR configuration to other UEs, an amount of available PUR resources, or any combinations thereof.

At 540, the base station 105-*d* may transmit a PUR confirmation message to the UE 115-*d* that indicates a PUR configuration for the UE 115-*d*. In some cases, the PUR configuration may be a new configuration for the UE 115-*d*. In other cases, the PUR configuration may be a reconfigured existing PUR configuration of the UE 115-*d*. In some cases, the PUR configuration may be shared by multiple different UEs, and the PUR configuration may indicate the shared resources and provide information that may be used by the UE 115-*d* to allow the base station 105-*d* to identify transmissions from the UE 115-*d* (e.g., a preamble to be provided with uplink transmissions, a spreading sequence to be applied to uplink transmissions, a cyclic shift to be applied to a sequence, and the like).

At 545, the UE 115-*d* may identify the PUR configuration provided by the base station 105-*d*. In cases where the PUR configuration is a new configuration, the UE 115-*d* may configure uplink transmissions to be transmitted using the PUR configuration. In cases, where the PUR configuration is a reconfiguration of an existing PUR configuration, the UE 115-*d* may reconfigure the PUR configuration in accordance with the new PUR configuration. At 550, the UE 115-*d* may optionally transmit a PUR configuration (or reconfiguration) complete message (or configuration failure message) to the base station 105-*d*.

Figure 6:
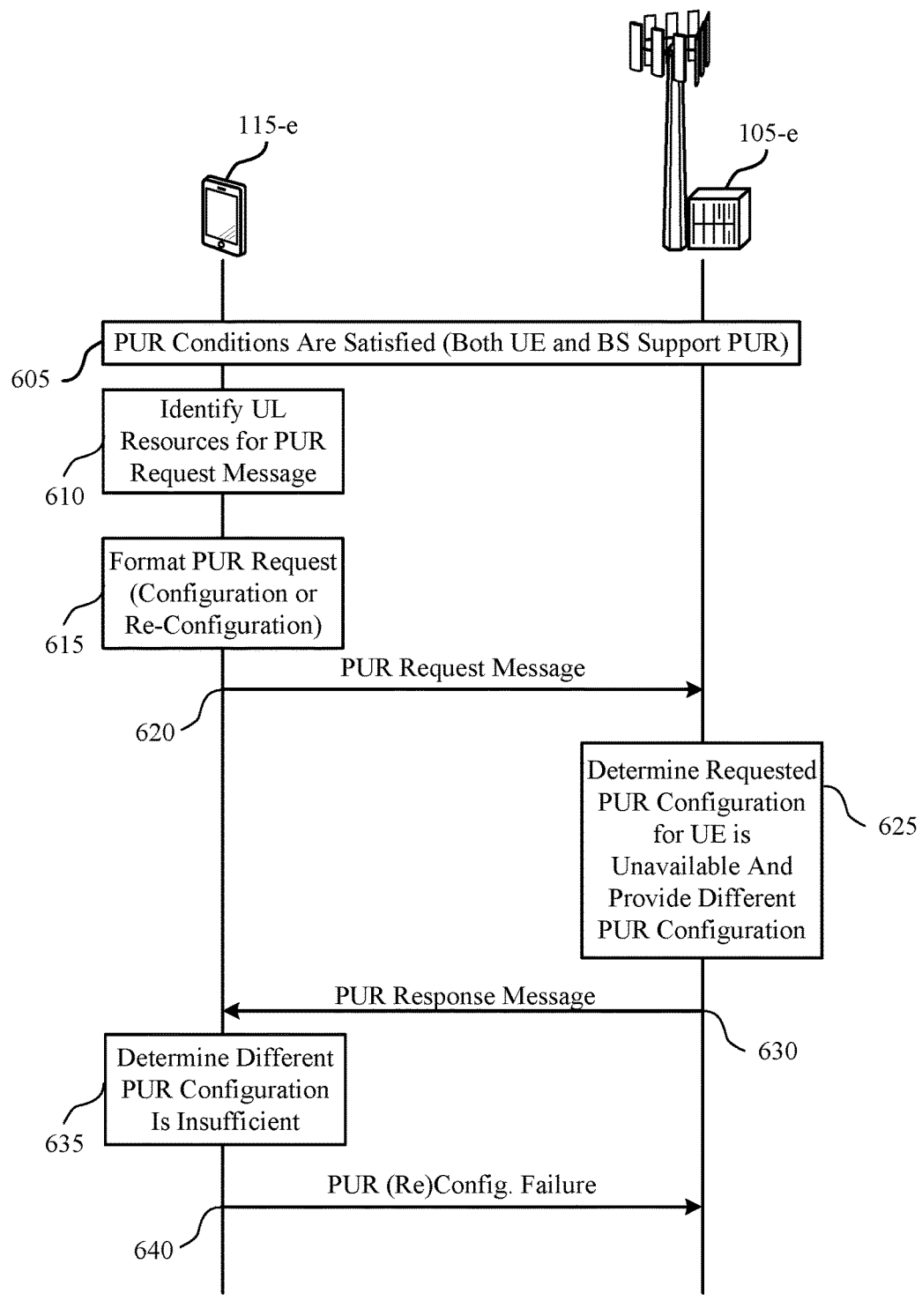

As indicated above, in some cases a base station may determine that a PUR configuration corresponding to a received PUR request is not available, and the base station may provide a different PUR configuration for use by the UE (e.g., with fewer PUR grants available for uplink transmissions from the UE). In such cases, the UE may determine whether the different PUR configuration is sufficient to meet the needs of the UE. In cases where the different PUR configuration is not adequate to properly service the data associated with the requested PUR configuration, the UE may transmit a PUR configuration failure message to the base station responsive to receiving the different PUR configuration. FIG. 6 illustrates an example of a process flow in which a UE may provide such a PUR configuration failure message.

FIG. 6 illustrates an example of a process flow 600 that supports PUR techniques in wireless communications in accordance with aspects of the present disclosure. In some examples, process flow 600 may implement aspects of wireless communications system 100 or 200. In this example, process flow 600 includes UE 115-*e* and base station 105-*e*, which may be examples of the corresponding devices described with reference to FIGS. 1 and 2.

At 605, the base station 105-*e* and UE 115-*e* may each determine that PUR conditions are satisfied. Such determinations may be made as discussed in various examples herein, such as based on the base station 105-*e* establishing PUR configuration(s) and providing an indication thereof (e.g., in a SIB) to UEs, which UE 115-*e* may receive to determine to request a PUR configuration.

At 610, the UE may identify uplink resources for transmission of a PUR request message. In some cases, the uplink resources may be provided in an uplink grant associated with the connected-mode UE 115-*e*. In other cases, a connected mode or idle mode UE 115-*e* may identify other uplink resources (e.g., SPS resources, an EDT transmissions, other existing PUR resources, etc.).

At 615, the UE may format a PUR request message. The PUR request message may request a new configuration of PUR resources, for example. In some cases, the UE 115-*e* may have an existing PUR allocation and the PUR request may be for a reconfiguration of the existing PUR allocation (e.g., based on updated data traffic at the UE 115-*e*, a change in a presence of higher priority data at the UE 115-*e*, etc.). At 620, the UE 115-*e* may transmit, and the base station 105-*e* may receive, the PUR request message.

At 625, the base station 105-*e* may determine that the requested PUR allocation for the UE 115-*e* is unavailable. In some cases, the base station 105-*e* may determine the PUR allocation is unavailable based on one or more of an amount of PUR grants in the requested PUR configuration, QOS information provided in the PUR request, whether AM or UM PUR are requested, other PUR allocations to other UEs, an amount of available PUR resources, or any combinations thereof. The base station 105-*e* may identify a different PUR configuration that is available for the UE 115-*e*.

At 630, the base station 105-*e* may transmit a PUR response message to the UE 115-*e* that indicates the different PUR configuration that has been allocated for the UE 115-*e*. At 635, the UE 115-*e* may determine that the PUR configuration provided by the base station 105-*e* is insufficient for the uplink transmissions of the UE 115-*e*. For example, the UE 115-*e* may have uplink data to be transmitted at a set periodicity (e.g., sensor data to be transmitted once every 30 seconds), and the PUR configuration provided by the base station 105-*e* may provide PUR grants at less than the set periodicity (e.g., one PUR grant every 60 seconds). Thus, in this example, based on the insufficient uplink grants in the PUR configuration, the UE 115-*e* may determine that the PUR configuration is insufficient. In other examples, the UE 115-*e* may determine that the PUR configuration is no longer needed, or cannot be applied due to other configurations that conflict with the PUR configuration.

At 640, the UE 115-*e* may transmit a PUR configuration failure indication to the base station 105-*e*. In some cases, the UE 115-e and the base station 105-e may release the PUR configuration based on the PUR configuration failure indication. Such a release may allow the base station 105-e to re-allocate the associated uplink resources to one or more other UEs and more efficiently use network resources.

In some cases, when the UE 115-e is in a connected mode, a dedicated grant may be provided after the PUR response message for the UE 115-e to be able to send the message PUR configuration failure message. In some cases, the uplink dedicated grant may be provided in the PUR configuration or in the PUR response message itself. Additionally or alternatively, the UE 115-e may monitor PDCCH during a certain window following the PUR response message, to obtain an UL grant for use in transmitting the PUR configuration failure message (or a PUR configuration confirmation message).

In other cases, the UE 115-e may be in an idle mode, and the uplink grant may be provided after the PUR response message for the UE 115-e to be able to send the PUR configuration failure from idle mode. In some cases, the uplink grant may be provided in the PUR configuration or PUR response message itself. Additionally or alternatively, the UE 115-e may monitor PDCCH during a certain window following the PUR response message, to obtain an uplink grant for use in transmitting the PUR configuration failure message (or a PUR configuration confirmation message) while in idle mode. In further cases, additionally or alternatively, a procedure may be defined where the UE is expected to use the first occurrence of the newly configured (or reconfigured) PUR for transmission of the PUR configuration failure message (or a PUR configuration confirmation message) while in idle mode.

Figure 7:
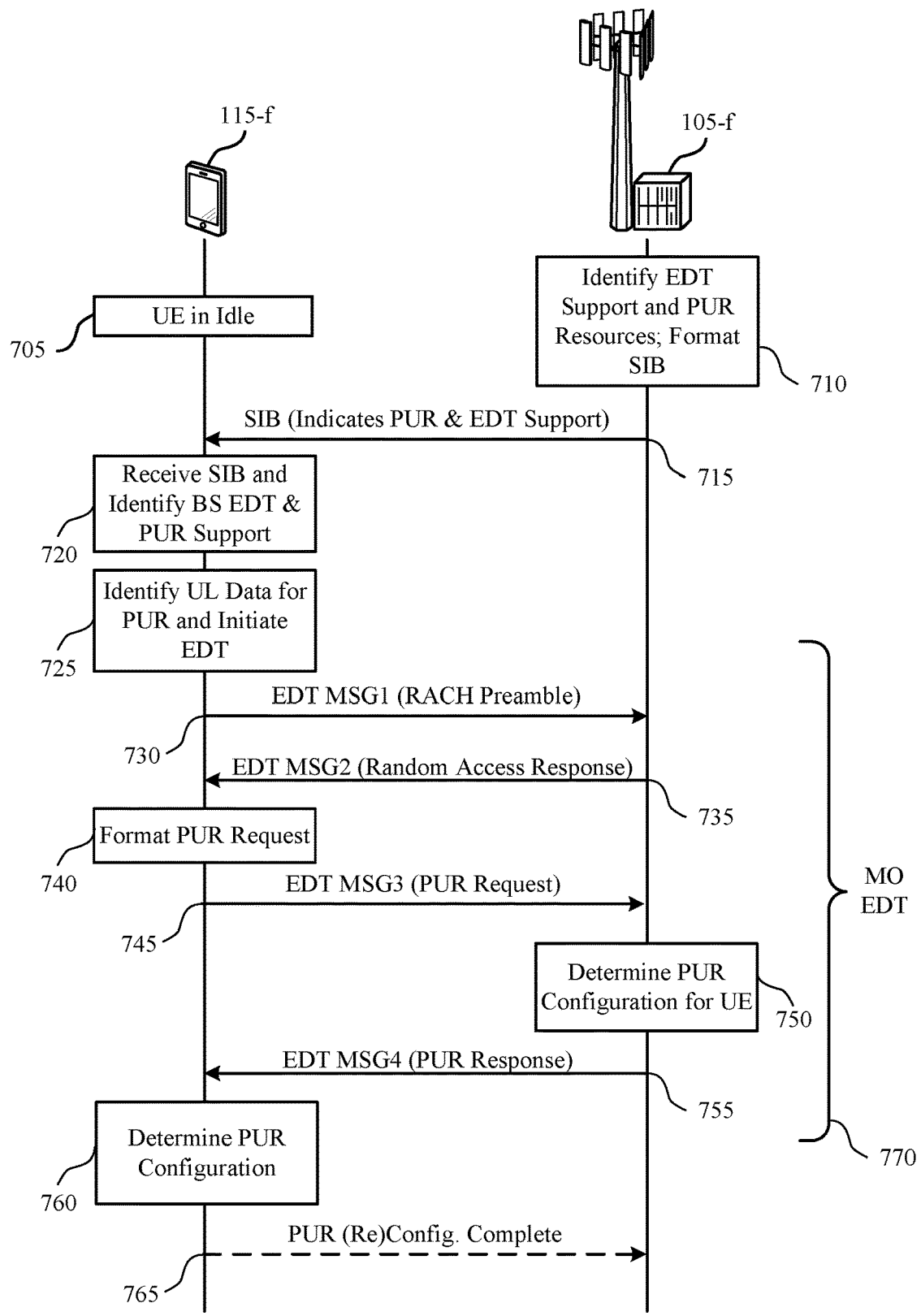

As indicated with respect to FIG. 5, in some cases EDT procedures may be used to exchange PUR request and configuration messages. FIG. 7 illustrates an example of a process flow 700 that supports PUR techniques in EDT in accordance with aspects of the present disclosure. In some examples, process flow 700 may implement aspects of wireless communications system 100 or 200. In this example, process flow 700 includes UE 115-f and base station 105-f, which may be examples of the corresponding devices described with reference to FIGS. 1 and 2.

At 705, the UE 115-f may be in IDLE mode. In some cases, the UE 115-f may have previously performed a connection establishment and may be idle due to a lack of uplink or downlink data to be transmitted. At 710, the base station 105-f may identify EDT support and PUR resources, and format a SIB that indicates PUR and EDT support. In some cases, the base station 105-f may determine whether the UE 115-f is allowed to use EDT to request PUR configuration/reconfiguration/release. In some cases, the base station may use separate SIBs to indicate PUR and EDT support. In some cases, as discussed with respect to FIGS. 3 and 4, the SIB may provide information for various PUR parameters, such as an amount of data that may be transmitted in uplink transmissions using the PUR resources, a traffic or service priority associated with PUR configurations, etc. In some cases, the SIB may provide an index into a preconfigured mapping of PUR configurations. In some cases, the base station 105-f may configure a number of different PUR configurations and the SIB may be formatted to indicate the multiple PUR configurations. At 715, the base station 105-f may transmit, and the UE 115-f may receive, the SIB with the indication of PUR and EDT support.

In this example, the UE 115-f may be in idle mode, and at 720 the UE 115-f may receive the SIB(s) and identify base station 105-f supports EDT and PUR. In some cases, the UE 115-f may periodically monitor for SIB and other downlink control transmissions while in idle mode, and may receive the SIB(s) during such monitoring.

At 725, the UE 115-f may identify uplink data for PUR and initiate the EDT procedure. At 730, the UE 115-f, in accordance with the EDT procedure, may transmit a first EDT message (EDT MSG1), that may include a random access channel (RACH) preamble. The base station 105-f may receive the EDT message and transmit a random access response that includes EDT MSG2. For example, the random access response may include an identifier associated with the UE 115-f and a resource assignment (e.g., resource block assignment) and modulation and coding scheme (MCS) for a subsequent EDT message.

At 740, the UE 115-f may format a PUR request message to be transmitted in an EDT. The PUR request message may request a new PUR configuration, for example. In some cases, the UE 115-f may have an existing PUR configuration and the PUR request may be for a reconfiguration of the existing PUR configuration or a release of the existing PUR configuration (e.g., based on updated data traffic at the UE 115-f, a change in a presence of higher priority data at the UE 115-f, etc.).

At 745, the UE 115-f may transmit the PUR request message using EDT MSG3. At 750, the base station 105-f may receive the PUR request message and determine a PUR configuration for the UE 115-f. In some cases, the base station 105-f may determine the PUR configuration based on one or more of a requested PUR configuration, QOS information provided in the PUR request, whether AM or UM PUR are requested, other PUR configuration to other UEs, an amount of available PUR resources, or any combinations thereof.

At 755, the base station 105-f may transmit a PUR response in EDT MSG4. The PUR response may indicate a PUR configuration for the UE 115-f. In some cases, the PUR configuration may be a new configuration for the UE 115-f In other cases, the PUR configuration may be a reconfigured existing PUR configuration of the UE 115-f. In some cases, the PUR configuration may be shared by multiple different UEs, and the PUR configuration may indicate the shared resources and provide information that may be used by the UE 115-f to allow the base station 105-f to identify transmissions from the UE 115-f (e.g., a preamble to be provided with uplink transmissions, a spreading sequence to be applied to uplink transmissions, a cyclic shift to be applied to a sequence, and the like).

At 760, the UE 115-f may identify the PUR configuration provided by the base station 105-f In cases where the PUR configuration is a new configuration, the UE 115-f may configure uplink transmissions to be transmitted using the PUR configuration. In cases, where the PUR configuration is a reconfiguration of an existing PUR configuration, the UE 115-f may reconfigure the PUR configuration in accordance with the new PUR configuration. At 765, the UE 115-f may optionally transmit a PUR configuration (or reconfiguration) complete message to the base station 105-f.

Thus, in this example, the UE 115-f and base station 105-f may use a mobile originated (MO) EDT process 770 to communicate the PUR request and the PUR response. In other cases, such as illustrated in FIG. 5, the PUR request and PUR response may be exchanged subsequent to an EDT procedure. In some cases, UE 115-f may, from idle mode, use a Control Plane CIoT EPS Optimization based EDT (CP-EDT) procedure. In other cases the UE 115-f may, from idle mode, use a User Plane CIoT EPS Optimization based EDT (UP-EDT). In some cases, EDT RRC messages (e.g., RRCEarlyDataRequest for CP-EDT, RRCConnectionResumeRequest for UP-EDT) may be extended to include PUR configuration, reconfiguration, or release request information elements. Such information elements may be appended or concatenated with other RRC information elements, for example. In one example, an establishmentCause may be used to indicate that the EDT MSG3 includes a PUR configuration, reconfiguration, or release request. For CP-EDT, the dedicatedInfoNAS may be empty if there is no uplink payload (user data), which may indicate that the message is a PUR request. In other cases, separate RRC messages may be included in the EDT MSG3 transmission, one for EDT and one for the PUR request message (i.e., the PUR configuration/reconfiguration/release request message).

Further, as indicated in FIG. 7, the base station 105-*f* may transmit an EDT MSG4 with a PUR response. The PUR response may include the PUR configuration, reconfiguration or release message as response. In some cases, the EDT MSG4 may be an RRC Early Data Complete or RRC Connection Release with suspend indication. In some cases, such RRC messages may be extended to include PUR configuration/reconfiguration or release indications. In other cases separate RRC messages may be included in the EDT MSG4, namely one RRC message for EDT and one RRC message that provides PUR configuration/reconfiguration or release messages.

In some cases, for signaling efficiency, a delta configuration may be used for configuring or reconfiguring the PUR. Such delta configurations may provide only the parameters that are changed from a prior PUR configuration, for a current configuration of the UE 115-*f*, or from a default PUR configuration, and any parameters that are absent are assumed to either have default values or unchanged values from the current UE values (e.g., EARFCN).

As indicated, in some cases the EDT MSG4 may provide (e.g., for CP-EDT) an RRC Early Data Complete message. In some cases, such a message may contain an implicit or explicit indication the UE 115-*f*, with respect to the PUR resources, may perform one or more of continuing to use assigned random access MSG1 data resources already (previously) assigned (i.e., existing PUR Configuration), confirm the validity or invalidity of the PUR configuration already (previously) assigned, de-configure or release of the PUR configuration already (previously) assigned, assign a new Msg1 data resource, or any combinations thereof. In some cases, an explicit indication for PUR release may be a provided in a Boolean flag to indicate release of the PUR resources, and in absence of such flag, the previously configured PUR is considered to still be valid when the UE 115-*f* goes back to idle mode. In some cases, the Boolean flag may be included in a RRC connection release message or RRC connection resume message. In some cases, the base station 105-*f* may indicate that PUR support is turned off for all UEs in a call by providing a SIB indication that PUR is unsupported, in which case UE 115-*f* (and other UEs that may receive the SIB) may release any PUR configurations.

Additionally or alternatively, the base station 105-*f* may determine that a PUR configuration of the UE 115-*f* is to be reconfigured. For example, the base station 105-*f* may determine that resources allocated for PUR are to be reallocated for other PUR configurations (e.g., higher priority PUR configurations). In such cases, the base station 105-*f* may initiate a PUR reconfiguration or release indication that may be provided in a EDT downlink message (e.g., EDT MSG2 or EDT MSG4). For example, the base station 105-*f* may transmit a page to the UE 115-*f* in idle mode to trigger the UE 115-*f* to establish an RRC connection, and once UE 115-*f* is in connected mode, base station 105-*f* may provide a release indication or release command message, or a reconfiguration of PUR. In some cases, an explicit PUR release message may be provided that is used by the base station 105-*f* to indicate to the UE 115-*f* that a configured PUR should be released.

Further, in some cases, when the UE 115-*f* transmits a PUR request message, one or more items of assistance information may be provided, such as a coverage enhancement (CE) level of the UE, or traffic related information. Such traffic related information may include, for example, one or more of traffic periodicity (or traffic arrival pattern), traffic probability (i.e., if the UE will always transmit or sometimes will not have data), a delay tolerance associated with the traffic, a packet size to be transmitted, or any combinations thereof. Additionally or alternatively, in some cases, the UE 115-*f* may also provide, the PUR configuration or reconfiguration request message, a requested number of PUR grant occurrences. In some cases, the number of occurrences may be indicated as one, to request a one-shot PUR, or another number greater than one to request a multi-shot PUR of that number. In other cases, the number of occurrences may be indicated as infinite or indefinite, to request PUR grants be indefinitely valid until one criteria for PUR release is met. In some cases, the number of occurrences may be provided in an information element in the PUR request. In some cases, the number of occurrences may be indicated as absent to request PUR resources to be indefinitely valid until one of the criteria for PUR release is met. Similarly, in some cases the number of occurrences may be indicated as zero to request release of the PUR resources, which may avoid having a separate PUR release request message specifically for the purpose of requesting release. In such cases, one or more other fields in the PUR request message may be optional so that the UE 115-*f* does not need to include other parameters when requesting PUR release by indicating a request for zero occurrences of PUR grants. Additionally or alternatively, the UE 115-*f* may indicate a PUR reconfiguration failure, as discussed with respect to FIG. 8, that may indicate that the PUR configuration is released.

Figure 8:
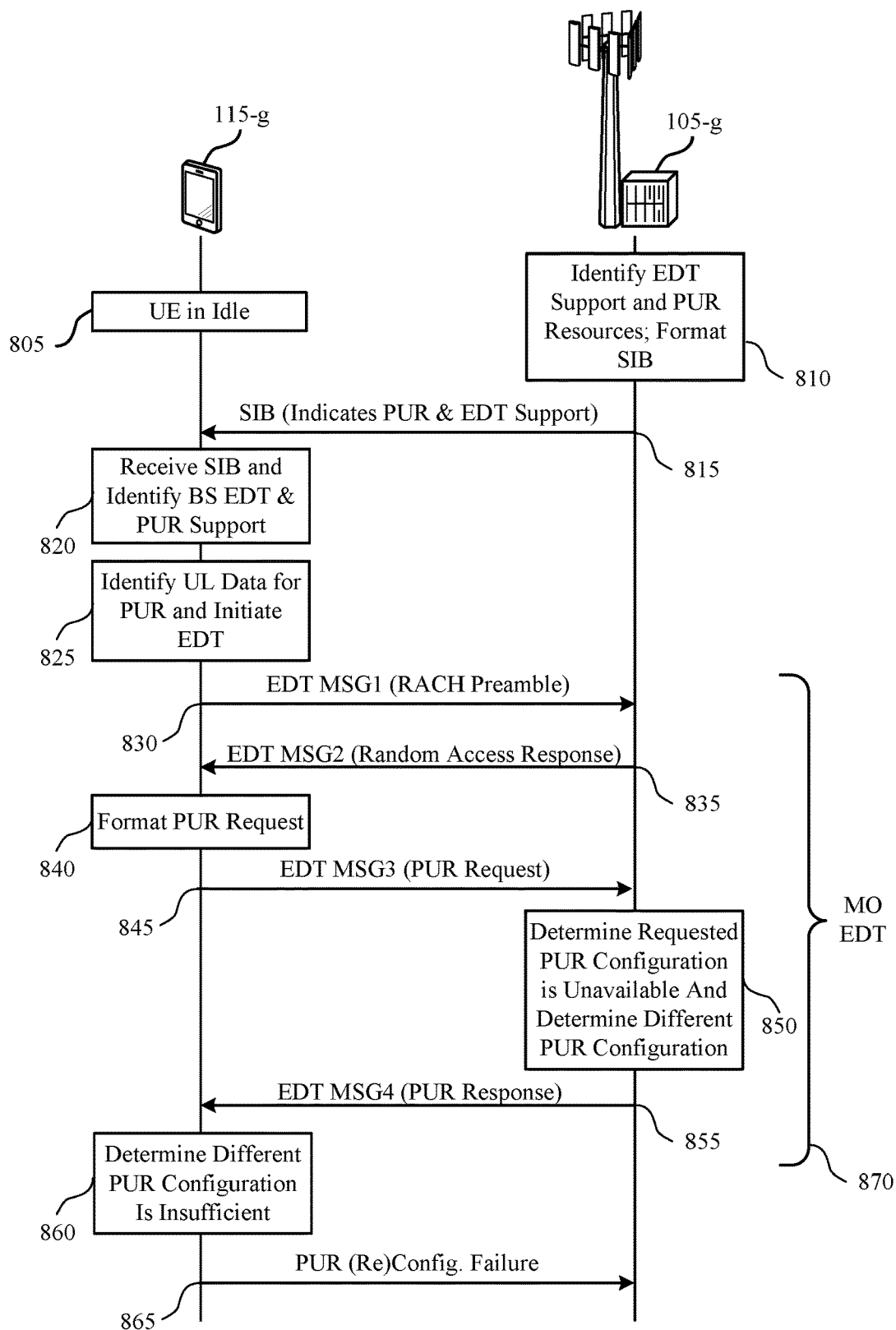

FIG. 8 illustrates an example of a process flow 800 that supports PUR techniques in wireless communications in accordance with aspects of the present disclosure. In some examples, process flow 800 may implement aspects of wireless communications system 100 or 200. In this example, process flow 800 includes UE 115-*g* and base station 105-*g*, which may be examples of the corresponding devices described with reference to FIGS. 1 and 2. In this example, an EDT procedure may again be used to exchange PUR request and configuration messages, similarly as in FIG. 7, but with the UE 115-*g* indicating a PUR configuration failure in the event that a PUR configuration provided by the base station 105-*h* is insufficient for the UE 115-*f*.

In this example, at 805, the UE 115-*g* may be in IDLE mode. In some cases, the UE 115-*g* may have previously performed a connection establishment and may be idle due to a lack of uplink or downlink data to be transmitted. At 810, the base station 105-*g* may identify EDT support and PUR resources, and format a SIB that indicates PUR and EDT support. At 815, the base station 105-*g* may transmit, and the UE 115-*g* may receive, the SIB with the indication of PUR and EDT support.

In this example, the UE 115-*g* may again be in idle mode, and at 820 the UE 115-*g* may receive the SIB(s) and identify base station 105-*g* supports EDT and PUR. In some cases, the UE 115-g may periodically monitor for SIB and other downlink control transmissions while in idle mode, and may receive the SIB(s) during such monitoring.

At 825, the UE 115-g may identify uplink data for PUR and initiate the EDT procedure. At 830, the UE 115-g, in accordance with the EDT procedure, may transmit a first EDT message (EDT MSG1), that may include a RACH preamble. The base station 105-g may receive the EDT message and transmit a random access response that includes and EDT MSG2 at 835. For example, the random access response may include an identifier associated with the UE 115-g and a resource assignment (e.g., resource block assignment) and modulation and coding scheme (MCS) for a subsequent EDT message.

At 840, the UE 115-g may format a PUR request message to be transmitted in an EDT. The PUR request message may request a new PUR configuration, for example. In some cases, the UE 115-g may have an existing PUR configuration and the PUR request may be for a reconfiguration of the existing PUR configuration or a release of the existing PUR configuration (e.g., based on updated data traffic at the UE 115-g, a change in a presence of higher priority data at the UE 115-g, etc.).

At 845, the UE 115-g may transmit the PUR request message using EDT MSG3. At 850, the base station 105-g may receive the PUR request message and determine a PUR configuration for the UE 115-g. In this example, at 850, the base station 105-g may determine that the requested PUR configuration is unavailable, and may determine a different PUR configuration for the UE 115-g.

At 855, the base station 105-g may transmit a PUR response in EDT MSG4. The PUR response may indicate the different PUR configuration for the UE 115-g. In some cases, the PUR configuration may be a new configuration for the UE 115-g. In other cases, the PUR configuration may be a reconfigured existing PUR configuration of the UE 115-g.

At 860, the UE 115-g may identify the different PUR configuration provided by the base station 105-g, and determine that the different PUR configuration is insufficient (e.g., based on fewer PUR grants than needed for uplink data transmission). At 865, the UE 115-g may transmit a PUR configuration (or reconfiguration) failure message to the base station 105-g. Thus, in this example, the UE 115-g and base station 105-g may again use a MO EDT process 870 to communicate the PUR request and the PUR response. Further, an additional uplink transmission to indicate the PUR configuration failure may be provided, in which uplink resources for the uplink transmission may be identified as discussed herein, such as with respect to FIG. 6.

Figure 9:
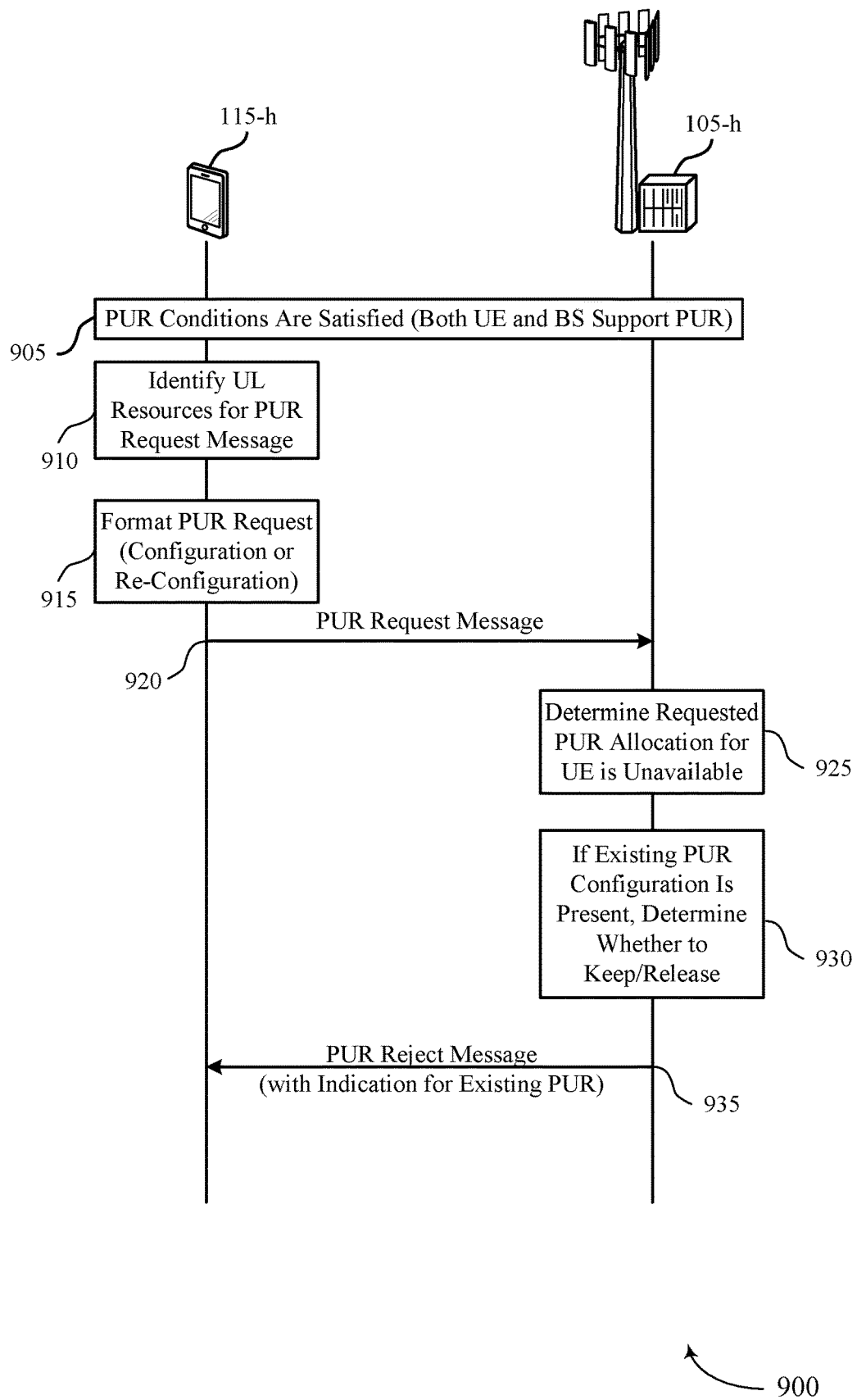

In some cases, if the base station determines that a requested PUR configuration is unavailable, the base station may transmit a PUR reject message to the UE rather than a PUR configuration or reconfiguration message. UE operations after receiving such a reject message may be based on one or more implicit or explicit indications associated with the reject message. FIG. 9 illustrates an example of a process flow 900 that supports PUR techniques in which a PUR reject message is transmitted to a UE, in accordance with aspects of the present disclosure. In some examples, process flow 900 may implement aspects of wireless communications system 100 or 200. In this example, process flow 900 includes UE 115-h and base station 105-h, which may be examples of the corresponding devices described with reference to FIGS. 1 and 2.

At 905, the base station 105-h and UE 115-h may each determine that PUR conditions are satisfied. Such determinations may be made as discussed in various examples herein, such as based on the base station 105-h establishing PUR configuration(s) and providing an indication thereof (e.g., in a SIB) to UEs, which UE 115-h may receive to determine to request a PUR configuration.

At 910, the UE may identify uplink resources for transmission of a PUR request message. In some cases, the uplink resources may be provided in an uplink grant associated with the connected-mode UE 115-h. In other cases, a connected mode or idle mode UE 115-h may identify other uplink resources (e.g., SPS resources, an EDT transmissions, other existing PUR resources, etc.).

At 915, the UE may format a PUR request message. The PUR request message may request a new configuration of PUR resources, for example. In some cases, the UE 115-h may have an existing PUR allocation and the PUR request may be for a reconfiguration of the existing PUR allocation (e.g., based on updated data traffic at the UE 115-h, a change in a presence of higher priority data at the UE 115-h, etc.). At 920, the UE 115-h may transmit, and the base station 105-h may receive, the PUR request message.

At 925, the base station 105-h may determine that the requested PUR allocation for the UE 115-h is unavailable. In some cases, the base station 105-h may determine the PUR allocation is unavailable based on one or more of an amount of PUR grants in the requested PUR configuration, QOS information provided in the PUR request, whether AM or UM PUR are requested, other PUR allocations to other UEs, an amount of available PUR resources, or any combinations thereof. The base station 105-h may identify a different PUR configuration that is available for the UE 115-h.

At 930, the base station 105-h may determine, in cases where an existing PUR configuration is present, whether to keep or release the existing PUR configuration of the UE 115-h. At 935, the base station 105-h may transmit a PUR reject message to the UE 115-h, which may provide an indication for UE 115-h handling of the existing PUR configuration where such an existing PUR configuration is present. In cases where there is not an existing PUR, the UE 115-h may fallback to other techniques for uplink data transmission (e.g., scheduling request transmissions, EDT procedures, random access techniques, SPS transmissions, etc.). In cases where an existing PUR configuration is present, one or more predefined rules may be provided that indicate that the existing PUR configuration is to be continued or released. In some cases, if the UE 115-h does not receive a response message from the base station 105-h, the UE 115-h may consider the PUR request to be rejected, and may use the predefined rules for an existing PUR configuration if present. In some cases, the PUR reject message may include an explicit indication for handling of the existing PUR configuration. For example, the base station 105-h may indicate to the UE 115-h that the PUR request is rejected and that the configured PUR is to be released, or that the PUR request is rejected and the configured PUR is to be maintained. Such an explicit indication may provide enhanced flexibility to the base station 105-h to decide and explicitly indicate UE 115-h behavior based on various conditions at the base station 105-h that resulted in the PUR reject message.

Figure 10:
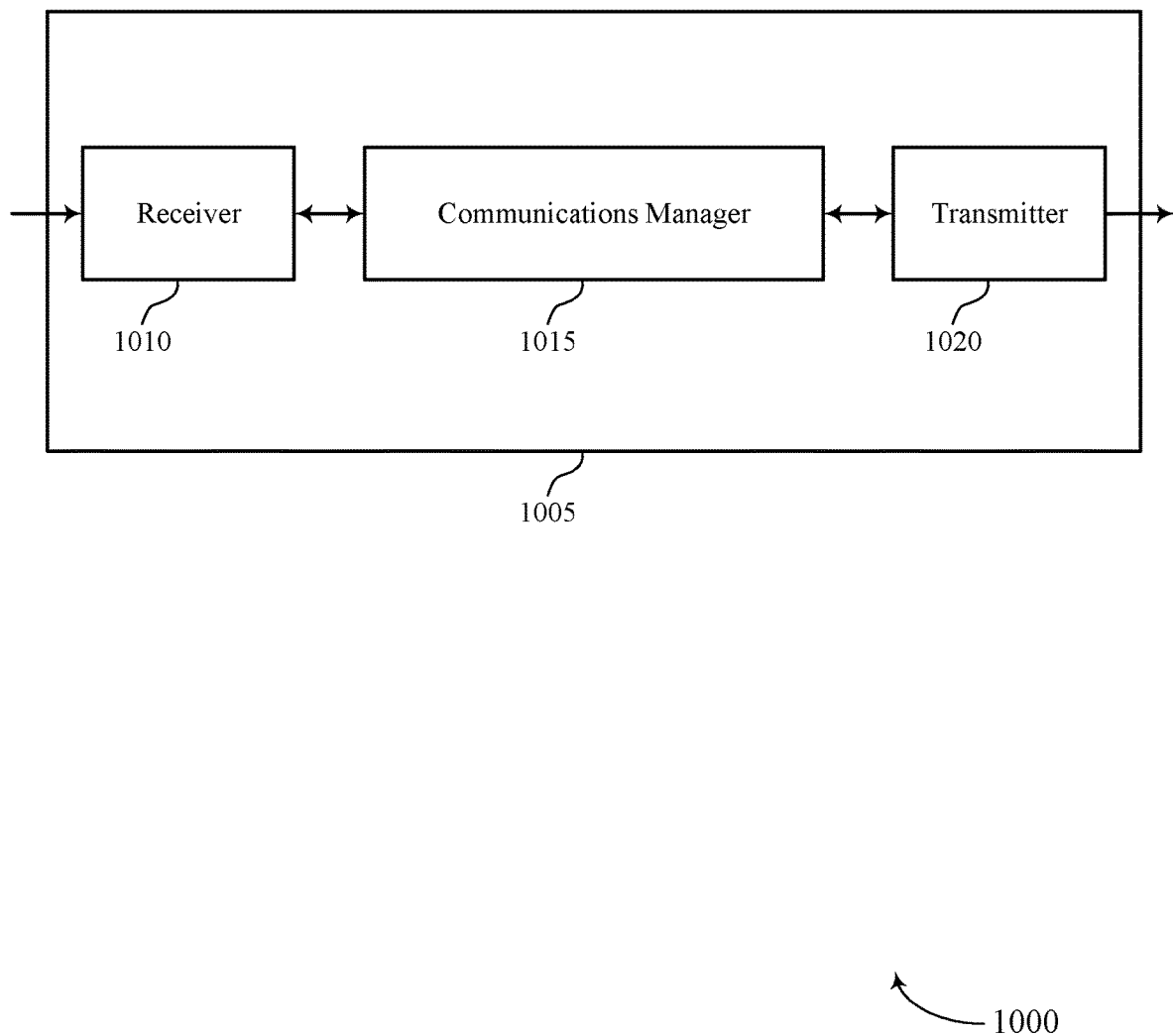
FIGS. 10 and 11 show block diagrams of devices that support PUR techniques in wireless communications in accordance with aspects of the present disclosure.

FIG. 10 shows a block diagram 1000 of a device 1005 that supports PUR techniques in wireless communications in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to PUR techniques in wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

In some cases, the communications manager 1015 may determine that a base station supports PURs for grant-free uplink transmissions from the UE, transmit a PUR request message to the base station based on the determining that the base station supports PUR, receive, responsive to the PUR request message, a PUR configuration from the base station that identifies PUR allocated to the UE, receive an uplink resource for a response message to be transmitted from the UE, and transmit, using the uplink resource for the response message, a PUR configuration response message to the base station.

In some cases, the communications manager 1015 may also determine an EDT configuration for an EDT procedure, where the EDT configuration provides for uplink transmission of UE payload data in an uplink message of the EDT procedure, format a PUR request message to be transmitted in the uplink message of the EDT procedure, where the PUR request message may indicate a requested configuration, reconfiguration, or release of a PUR configuration, transmit the PUR request message in the uplink message of the EDT procedure, and receive a PUR configuration message from the base station responsive to the uplink message.

In some cases, the communications manager 1015 may also communicate with a base station according to a preconfigured uplink resource configuration, where the preconfigured uplink resource configuration provides for grant-free uplink transmissions from the UE to the base station, receive, from the base station, a preconfigured uplink resource release message that indicates the UE is to de-configure the preconfigured uplink resource configuration, and de-configure the preconfigured uplink resource configuration based at least in part on the preconfigured uplink resource release message.

In some cases, the communications manager 1015 may also determine that a base station supports PUR for grant-free uplink transmissions from the UE, transmit a PUR request message to the base station based on the determining that the base station supports PUR, where the PUR request message includes a number of instances of PUR grants requested by the UE, and receive a PUR configuration from the base station responsive to the PUR request message.

In some cases, the communications manager 1015 may also determine that a base station supports PUR for grant-free uplink transmissions from the UE, transmit a PUR request message to the base station based on the determining that the base station supports PUR, and receive a PUR response message from the base station responsive to the PUR request message that indicates the PUR request message is rejected, and where the PUR response message indicates how the UE is to proceed based on the rejected PUR request message. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
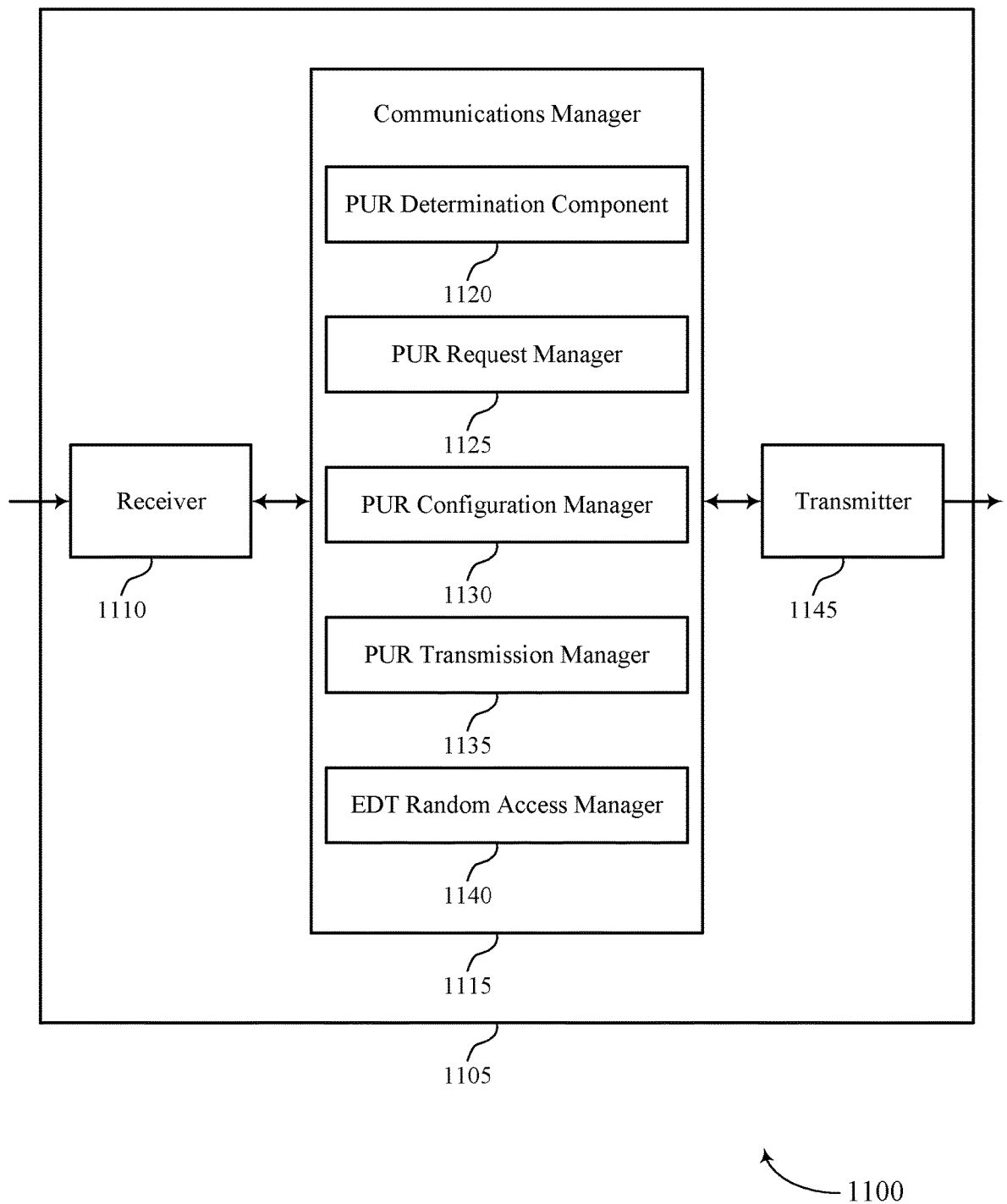

FIG. 11 shows a block diagram 1100 of a device 1105 that supports PUR techniques in wireless communications in accordance with aspects of the present disclosure. The device 1105 may be an example of aspects of a device 1005, or a UE 115 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to PUR techniques in wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a PUR determination component 1120, a PUR request manager 1125, a PUR configuration manager 1130, a PUR transmission manager 1135, and an EDT random access manager 1140. The communications manager 1115 may be an example of aspects of the communications manager 1310 described herein.

The PUR determination component 1120 may determine that a base station supports PUR for grant-free uplink transmissions from the UE. The PUR request manager 1125 may transmit a PUR request message to the base station based on the determining that the base station supports PUR. The PUR configuration manager 1130 may receive, responsive to the PUR request message, a PUR configuration from the base station that identifies PUR allocated to the UE. The PUR transmission manager 1135 may receive an uplink resource for a response message to be transmitted from the UE and transmit, using the uplink resource for the response message, a PUR configuration response message to the base station.

The EDT random access manager 1140 may determine an EDT configuration for an EDT procedure, where the EDT configuration provides for uplink transmission of UE payload data in an uplink message of the EDT procedure. The PUR request manager 1125 may format a PUR request message to be transmitted in the uplink message of the EDT procedure, where the PUR request message indicates a requested configuration, reconfiguration, or release of a PUR configuration and transmit the PUR request message in the uplink message of the EDT procedure. The PUR configuration manager 1130 may receive a PUR configuration message from the base station responsive to the PUR request message.

The PUR determination component 1120 may determine that a base station supports PUR for grant-free uplink transmissions from the UE. The PUR request manager 1125 may transmit a PUR request message to the base station based on the determining that the base station supports PUR, where the PUR request message includes a number of instances of PUR grants requested by the UE. The PUR configuration manager 1130 may receive a PUR configuration from the base station responsive to the PUR request message.

The PUR determination component 1120 may determine that a base station supports PUR for grant-free uplink transmissions from the UE. The PUR request manager 1125 may transmit a PUR request message to the base station based on the determining that the base station supports PUR. The PUR configuration manager 1130 may receive a PUR response message from the base station responsive to the PUR request message that indicates the PUR request message is rejected, and where the PUR response message indicates how the UE is to proceed based on the rejected PUR request message.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
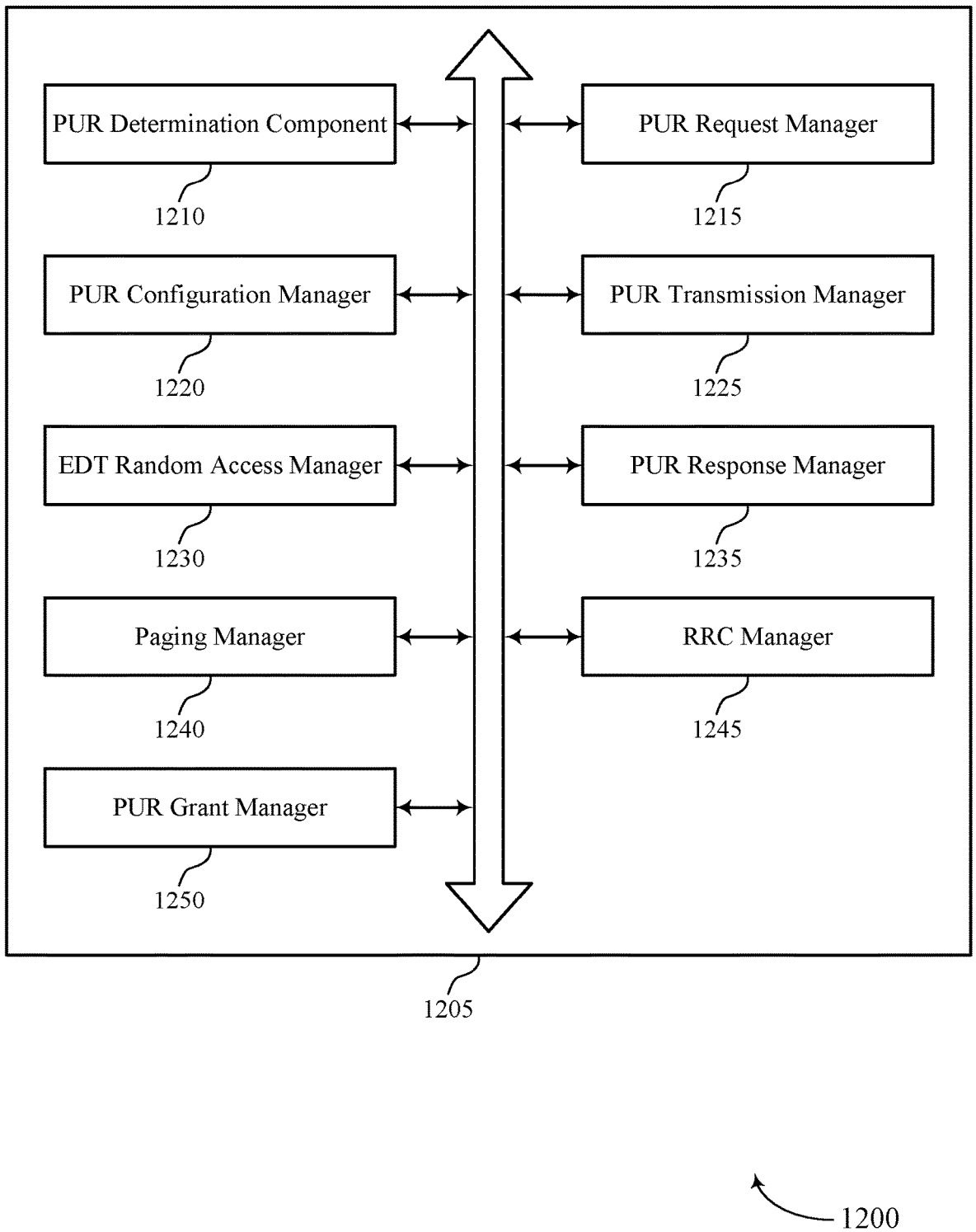
FIG. 12 shows a block diagram of a communications manager that supports PUR techniques in wireless communications in accordance with aspects of the present disclosure.

FIG. 12 shows a block diagram 1200 of a communications manager 1205 that supports PUR techniques in wireless communications in accordance with aspects of the present disclosure. The communications manager 1205 may be an example of aspects of a communications manager 1015, a communications manager 1115, or a communications manager 1310 described herein. The communications manager 1205 may include a PUR determination component 1210, a PUR request manager 1215, a PUR configuration manager 1220, a PUR transmission manager 1225, an EDT random access manager 1230, a PUR response manager 1235, a paging manager 1240, a RRC manager 1245, and a PUR grant manager 1250. Each of these modules may communicate, directly or indirectly, with one another (e.g., via one or more buses).

The PUR determination component 1210 may determine that a base station supports PUR for grant-free uplink transmissions from the UE.

The PUR request manager 1215 may transmit a PUR request message to the base station based on the determining that the base station supports PUR. In some examples, the PUR request manager 1215 may format a PUR request message to be transmitted in the uplink message of the EDT procedure, where the PUR request message indicates a requested configuration, reconfiguration, or release of a PUR configuration. In some examples, the PUR request manager 1215 may transmit the PUR request message in the uplink message of the EDT procedure.

In some examples, the PUR request manager 1215 may transmit a PUR request message to the base station based on the determining that the base station supports PUR, where the PUR request message includes a number of instances of PUR grants requested by the UE. In some examples, the PUR request manager 1215 may transmit a PUR request message to the base station based on the determining that the base station supports PUR.

The PUR configuration manager 1220 may receive, responsive to the PUR request message, a PUR configuration from the base station that identifies PUR allocated to the UE. In some examples, the PUR configuration manager 1220 may receive a PUR configuration message from the base station responsive to the PUR request message.

In some examples, the PUR configuration manager 1220 may receive a PUR response message from the base station responsive to the PUR request message that indicates the PUR request message is rejected, and where the PUR response message indicates how the UE is to proceed based on the rejected PUR request message.

In some examples, the PUR configuration manager 1220 may determine, based on the PUR configuration from the base station, a set of control channel resources to monitor for an uplink grant. In some examples, the PUR configuration manager 1220 may monitor the set of control channel resources for the uplink grant, where the uplink grant indicates the uplink resource for the transmission of the PUR configuration response message to the base station.

In some examples, the PUR configuration manager 1220 may determine that the PUR configuration is de-configured based on receiving a broadcast system information transmission from the base station that indicates PUR is unsupported. In some examples, the PUR configuration manager 1220 may release the PUR configuration.

In some examples, the PUR configuration manager 1220 may receive, from the base station, an indication to reconfigure the PUR configuration. In some examples, the PUR configuration manager 1220 may receive the indication in a random access response message from the base station that is transmitted in response to a random access request message of the UE.

In some examples, the PUR configuration manager 1220 may receive, from the base station, a PUR release message. In some examples, the PUR configuration manager 1220 may de-configure the PUR configuration based on the PUR release message. In some examples, the PUR configuration manager 1220 may determine that a prior PUR configuration is to be released.

In some examples, the PUR configuration manager 1220 may transmit an indication of zero instances of PUR grants in the PUR request message.

In some examples, the PUR configuration manager 1220 may transmit, after receiving the PUR configuration, a PUR reconfiguration failure indication to the base station. In some examples, the PUR configuration manager 1220 may release the PUR configuration.

In some cases, the PUR configuration is provided as a delta configuration that indicates differences over a prior PUR configuration of the UE. In some cases, the PUR configuration is provided as a delta configuration that indicates differences over a current configuration being used by the UE. In some cases, the PUR configuration is provided as a delta configuration that indicates differences over a default PUR configuration.

In some cases, the uplink resource for the response message is provided in an explicit indication with the PUR configuration from the base station. In some cases, the PUR configuration message from the base station is received in an EDT downlink message. In some cases, the PUR configuration is provided in an EDT early data complete message that indicates configured PUR resources of the UE. In some cases, the EDT early data complete message explicitly or implicitly provides one or more of an indication that the UE is to use a prior PUR configuration, a confirmation of the prior PUR configuration, an indication to de-configure and release the prior PUR configuration, a new resource for a new PUR configuration, or any combinations thereof. In some cases, the indication to de-configure and release the prior PUR configuration includes a Boolean flag in the EDT early data complete message.

In some cases, the PUR request message indicates a reconfiguration of a prior PUR configuration is requested, and where the PUR response message indicates that the prior PUR configuration is to be released by the UE. In some cases, the PUR request message indicates a reconfiguration of a prior PUR configuration is requested, and where the PUR response message indicates that the prior PUR configuration is to be maintained by the UE.

The PUR transmission manager 1225 may receive an uplink resource for a response message to be transmitted from the UE. In some examples, the PUR transmission manager 1225 may transmit, using the uplink resource for the response message, a PUR configuration response message to the base station. In some cases, the uplink resource for the response message is included in a first instance of the PUR allocated to the UE. In some cases, the transmitting the PUR configuration response message is performed when the UE is in an idle mode or in a connected mode with the base station.

The EDT random access manager 1230 may determine an EDT configuration for an EDT procedure, where the EDT configuration provides for uplink transmission of UE payload data in an uplink message of the EDT procedure. In some examples, the EDT random access manager 1230 may receive an indication from the base station that the uplink message of the EDT procedure is available for transmitting the PUR request message. In some cases, the indication from the base station is provided in a system information block that is broadcast from the base station. In some cases, the PUR request message is transmitted in a message three (MSG3) transmission of the EDT procedure. In some cases, the PUR request message is provided in one or more information elements of a RRC message of the EDT procedure. In some cases, an establishment cause in the RRC message indicates that the random access message includes the PUR request. In some cases, the RRC message includes an indication of uplink payload data, and where a predetermined value of the indication of uplink payload data indicates that the random access message includes the PUR request. In some cases, the RRC message of the EDT procedure includes a concatenated first RRC message associated with the EDT procedure and a second RRC message associated with the PUR request.

The PUR response manager 1235 may transmit, responsive to the PUR configuration message, an indication of a successful PUR configuration or PUR configuration failure using the uplink resource for the response message from the UE.

The paging manager 1240 may receive a page message from the base station. In some examples, the paging manager 1240 may transmit the random access request message to the base station responsive to the page message, and where the receiving the indication to reconfigure the PUR configuration is responsive to the random access request message. In some cases, the indication to reconfigure the PUR configuration indicates a new PUR configuration to be used by the UE, or indicates that the UE is to release the PUR configuration.

The RRC manager 1245 may manage RRC signaling between the UE and base station. In some cases, the UE receives the PUR release message while in a connected mode or in an EDT random access message, and where the PUR release message is a RRC PUR reconfiguration message.

The PUR grant manager 1250 may receive PUR grants and identify a number of instances of PUR grants to be requested for a PUR configuration. In some cases, the number of instances of PUR grants provides an explicit number of PUR grants or an indication of an indefinite number of PUR grants. In some cases, the indefinite number of PUR grants is indicated by an absence of a PUR grant request field of the PUR request message or by a predetermined value in the PUR grant request field. In some cases, the number of instances of PUR grants requested by the UE indicate a one-shot PUR configuration is requested or a multi-shot PUR configuration is requested.

Figure 13:
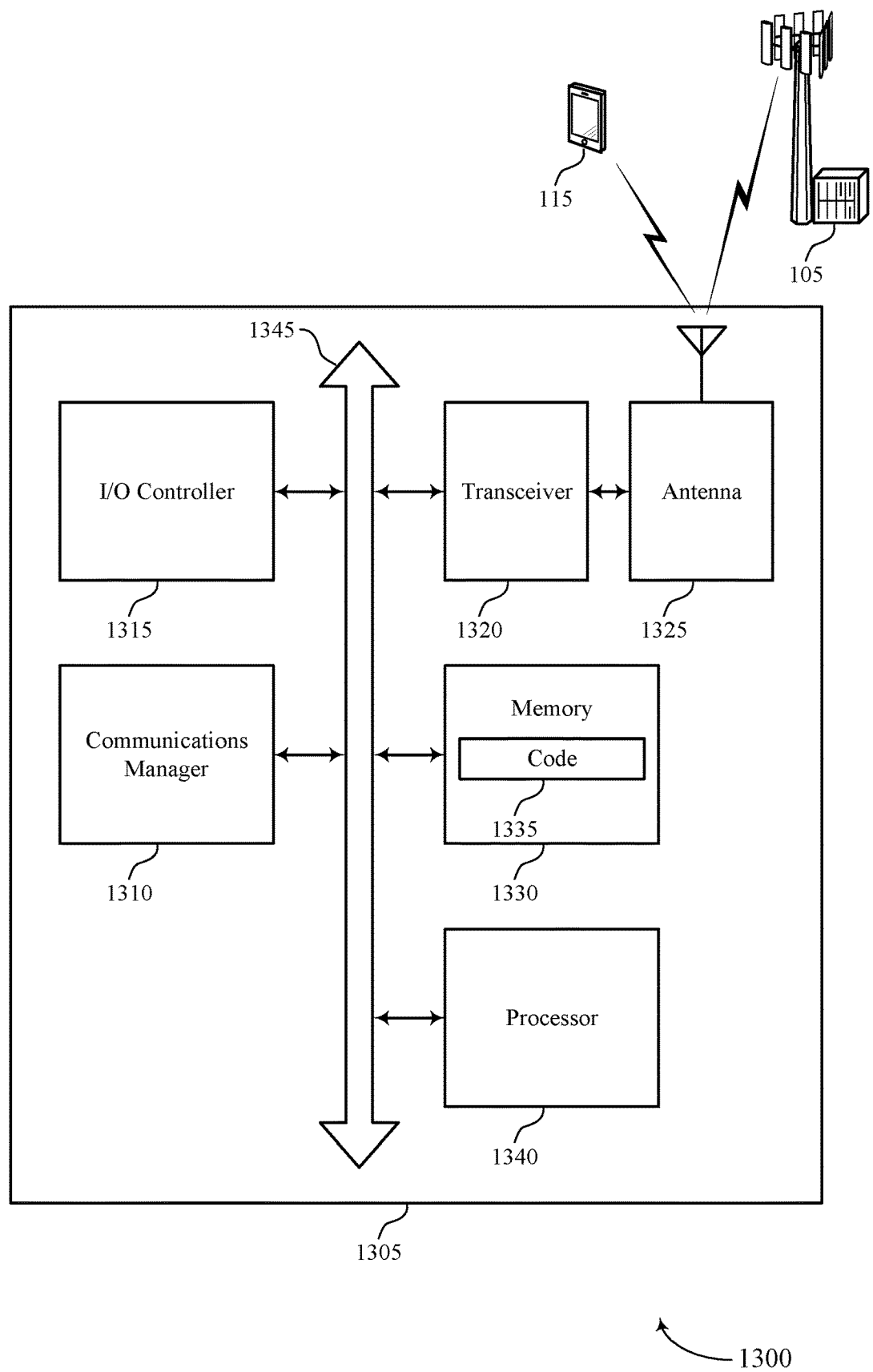
FIG. 13 shows a diagram of a system including a device that supports PUR techniques in wireless communications in accordance with aspects of the present disclosure.

FIG. 13 shows a diagram of a system 1300 including a device 1305 that supports PUR techniques in wireless communications in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may determine that a base station supports PUR for grant-free uplink transmissions from the UE, transmit a PUR request message to the base station based on the determining that the base station supports PUR, receive, responsive to the PUR request message, a PUR configuration from the base station that identifies PUR allocated to the UE, receive an uplink resource for a response message to be transmitted from the UE, and transmit, using the uplink resource for the response message, a PUR configuration response message to the base station.

The communications manager 1310 may also determine an EDT configuration for an EDT procedure, where the EDT configuration provides for uplink transmission of UE payload data in an uplink message of the EDT procedure, format a PUR request message to be transmitted in the uplink message of the EDT procedure, where the PUR request message indicates a requested configuration, reconfiguration, or release of a PUR configuration, transmit the PUR request message in the uplink message of the EDT procedure, and receive a PUR configuration message from the base station responsive to the PUR request message.

The communications manager 1310 may also communicate with a base station according to a preconfigured uplink resource configuration, where the preconfigured uplink resource configuration provides for grant-free uplink transmissions from the UE to the base station, receive, from the base station, a preconfigured uplink resource release message that indicates the UE is to de-configure the preconfigured uplink resource configuration, and de-configure the preconfigured uplink resource configuration based at least in part on the preconfigured uplink resource release message.

The communications manager 1310 may also determine that a base station supports PUR for grant-free uplink transmissions from the UE, transmit a PUR request message to the base station based on the determining that the base station supports PUR, where the PUR request message includes a number of instances of PUR grants requested by the UE, and receive a PUR configuration from the base station responsive to the PUR request message.

The communications manager 1310 may also determine that a base station supports PUR for grant-free uplink transmissions from the UE, transmit a PUR request message to the base station based on the determining that the base station supports PUR, and receive a PUR response message from the base station responsive to the PUR request message that indicates the PUR request message is rejected, and where the PUR response message indicates how the UE is to proceed based on the rejected PUR request message.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting PUR techniques in wireless communications).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
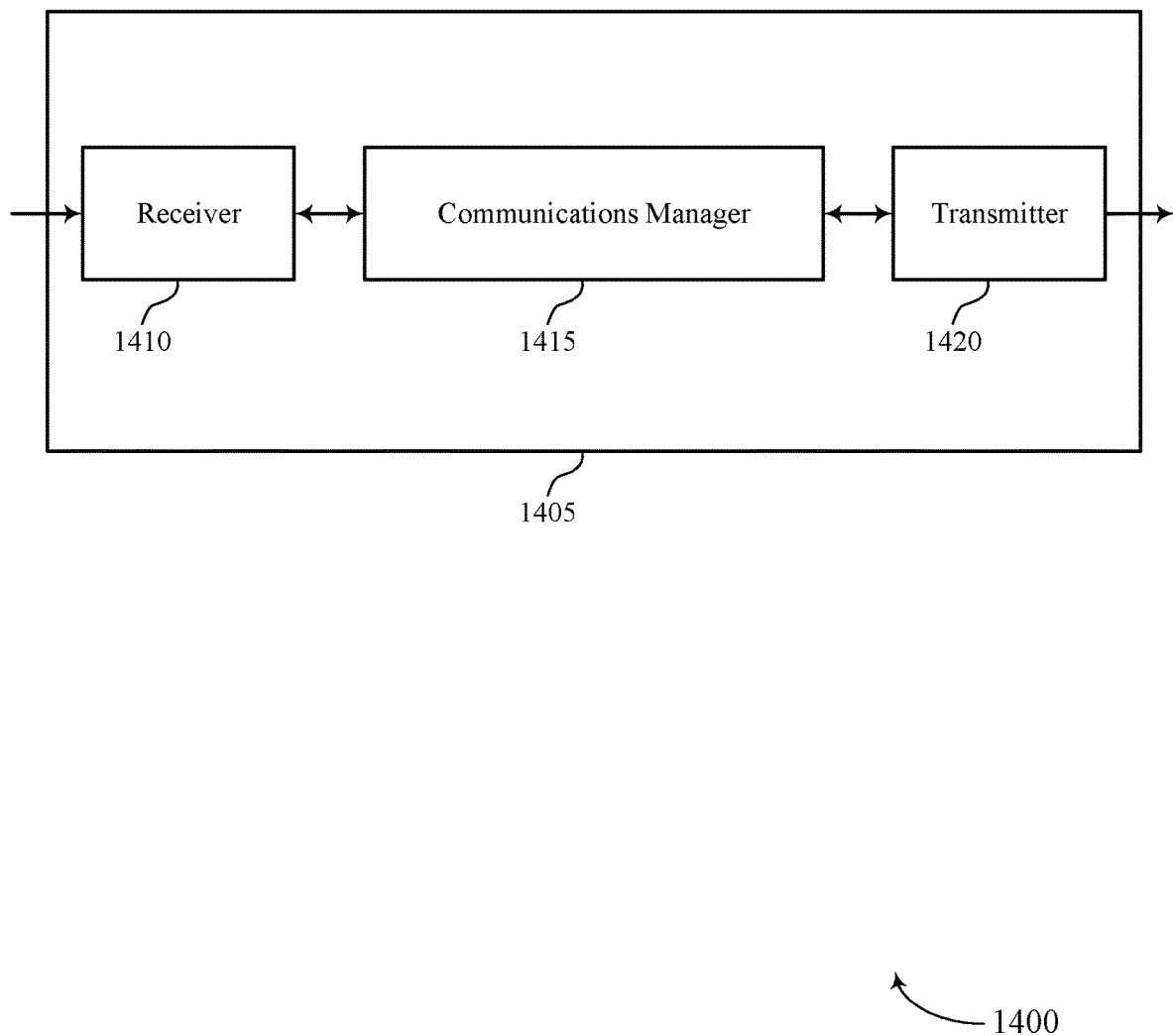
FIGS. 14 and 15 show block diagrams of devices that support PUR techniques in wireless communications in accordance with aspects of the present disclosure.

FIG. 14 shows a block diagram 1400 of a device 1405 that supports PUR techniques in wireless communications in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to PUR techniques in wireless communications, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit an indication that the base station supports PUR for grant-free uplink transmissions, transmit, responsive to the PUR request message, a PUR configuration to the UE that identifies PUR allocated to the UE, receive, from a UE, a PUR request message, and receive, via the uplink resource for the response message, a PUR configuration response from the UE.

The communications manager 1415 may also determine an EDT configuration for an EDT procedure, where the EDT configuration provides for uplink transmission of UE payload data in an uplink message of the EDT procedure, receive, from a UE, a PUR request message in the uplink message of the EDT procedure, where the PUR request message indicates a requested configuration, reconfiguration, or release of a PUR configuration, and transmit a PUR configuration message to the UE responsive to the PUR request message, where the PUR configuration indicates an uplink resource for a response message from the UE.

The communications manager 1415 may also transmit an indication that the base station supports PUR for grant-free uplink transmissions, transmit a PUR configuration to the UE responsive to the PUR request message, and receive, from a UE, a PUR request message, where the PUR request message includes a number of instances of PUR grants requested by the UE.

The communications manager 1415 may also transmit an indication that the base station supports PUR for grant-free uplink transmissions, transmit a PUR response message to the UE responsive to the PUR request message that indicates the PUR request message is rejected, and where the PUR response message indicates how the UE is to proceed based on the rejected PUR request message, and receive, from a UE, a PUR request message. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
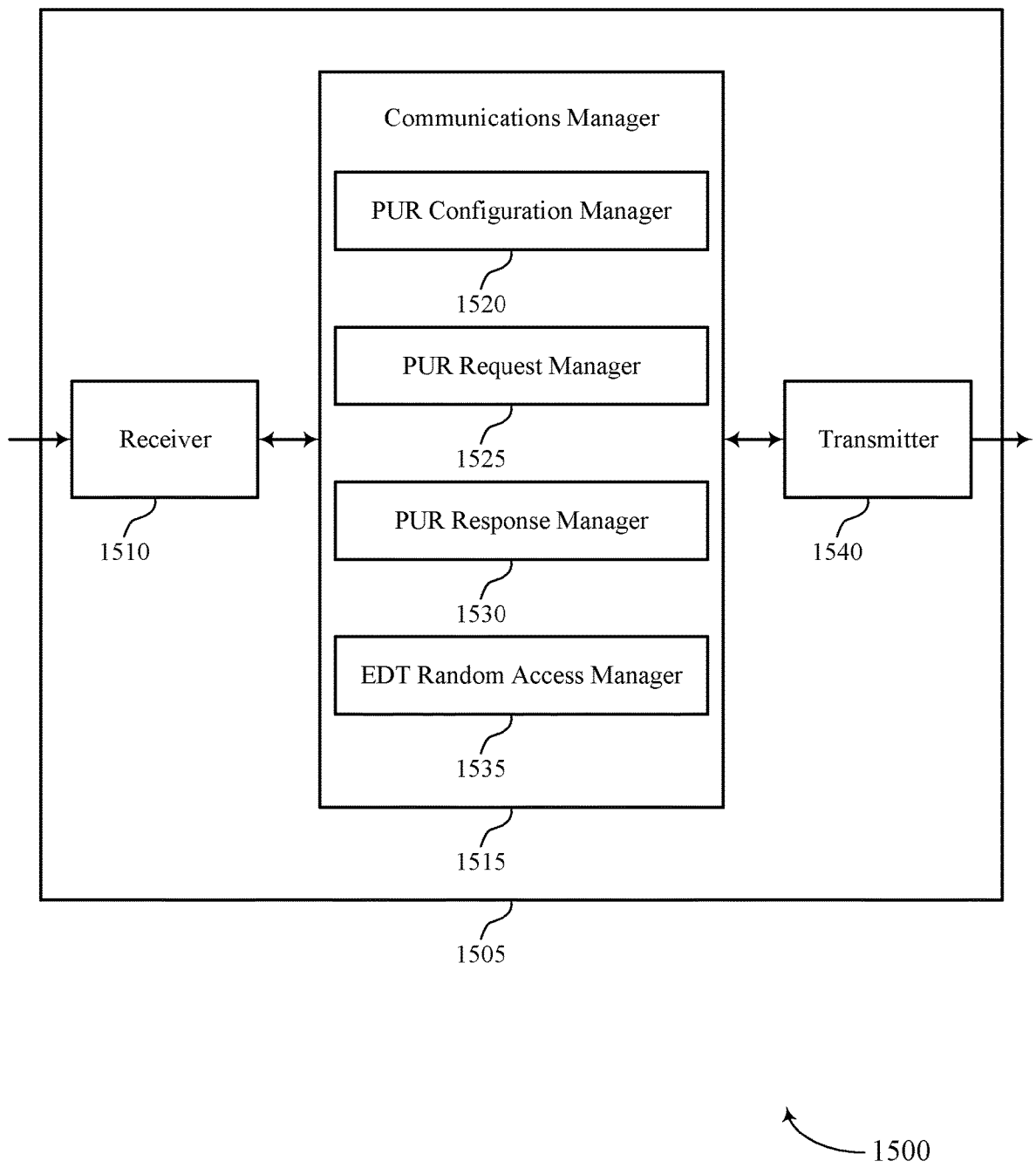

FIG. 15 shows a block diagram 1500 of a device 1505 that supports PUR techniques in wireless communications in accordance with aspects of the present disclosure. The device 1505 may be an example of aspects of a device 1405, or a base station 105 as described herein. The device 1505 may include a receiver 1510, a communications manager 1515, and a transmitter 1540. The device 1505 may also include a processor. Each of these components may be in communication with one another (e.g., via one or more buses).

The receiver 1510 may receive information such as packets, user data, or control information associated with various information channels (e.g., control channels, data channels, and information related to PUR techniques in wireless communications, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a PUR configuration manager 1520, a PUR request manager 1525, a PUR response manager 1530, and an EDT random access manager 1535. The communications manager 1515 may be an example of aspects of the communications manager 1710 described herein.

The PUR configuration manager 1520 may transmit an indication that the base station supports PUR for grant-free uplink transmissions and transmit, responsive to the PUR request message, a PUR configuration to the UE that identifies PUR allocated to the UE. The PUR request manager 1525 may receive, from a UE, a PUR request message. The PUR response manager 1530 may receive, via the uplink resource for the response message, a PUR configuration response from the UE.

The EDT random access manager 1535 may determine an EDT configuration for an EDT procedure, where the EDT configuration provides for uplink transmission of UE payload data in an uplink message of the EDT procedure. The PUR request manager 1525 may receive, from a UE, a PUR request message in the uplink message of the EDT procedure, where the PUR request message indicates a requested configuration, reconfiguration, or release of a PUR configuration. The PUR configuration manager 1520 may transmit a PUR configuration message to the UE responsive to the PUR request message, where the PUR configuration indicates an uplink resource for a response message from the UE.

The PUR configuration manager 1520 may transmit an indication that the base station supports PUR for grant-free uplink transmissions and transmit a PUR configuration to the UE responsive to the PUR request message. The PUR request manager 1525 may receive, from a UE, a PUR request message, where the PUR request message includes a number of instances of PUR grants requested by the UE.

The PUR configuration manager 1520 may transmit an indication that the base station supports PUR for grant-free uplink transmissions and transmit a PUR response message to the UE responsive to the PUR request message that indicates the PUR request message is rejected, and where the PUR response message indicates how the UE is to proceed based on the rejected PUR request message. The PUR request manager 1525 may receive, from a UE, a PUR request message.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
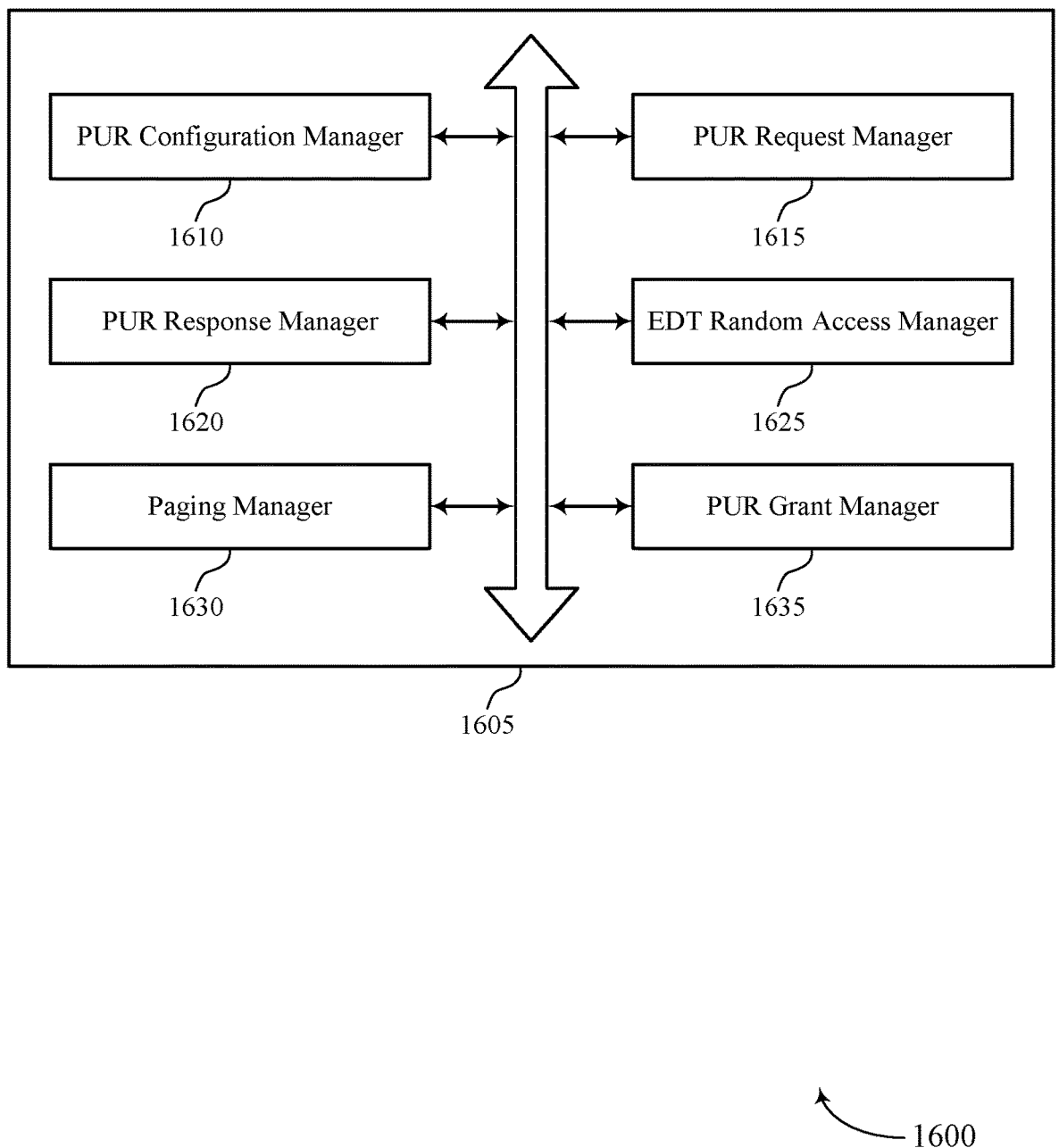
FIG. 16 shows a block diagram of a communications manager that supports PUR techniques in wireless communications in accordance with aspects of the present disclosure.

FIG. 16 shows a block diagram 1600 of a communications manager 1605 that supports PUR techniques in wireless communications in accordance with aspects of the present disclosure. The communications manager 1605 may be an example of aspects of a communications manager 1415, a communications manager 1515, or a communications manager 1710 described herein. The communications manager 1605 may include a PUR configuration manager 1610, a PUR request manager 1615, a PUR response manager 1620, an EDT random access manager 1625, a paging manager 1630, and a PUR grant manager 1635. Each of these modules may communicate, directly or indirectly, with one another (e.g., via one or more buses).

The PUR configuration manager 1610 may transmit an indication that the base station supports PUR for grant-free uplink transmissions. In some examples, the PUR configuration manager 1610 may transmit, responsive to the PUR request message, a PUR configuration to the UE that identifies PUR allocated to the UE. In some examples, the PUR configuration manager 1610 may transmit a PUR configuration message to the UE responsive to the PUR request message, where the PUR configuration indicates an uplink resource for a response message from the UE. In some examples, the PUR configuration manager 1610 may transmit an indication that the base station supports PUR for grant-free uplink transmissions. In some examples, the PUR configuration manager 1610 may transmit a PUR configuration to the UE responsive to the PUR request message.

In some examples, the PUR configuration manager 1610 may transmit a PUR response message to the UE responsive to the PUR request message that indicates the PUR request message is rejected, and where the PUR response message indicates how the UE is to proceed based on the rejected PUR request message. In some examples, the PUR configuration manager 1610 may receive, responsive to the PUR configuration message, an indication of a successful PUR configuration or PUR configuration failure using the uplink resource for the response message from the UE. In some examples, the PUR configuration manager 1610 may transmit a broadcast system information transmission that indicates PUR is unsupported and that UEs are to release PUR configurations.

In some examples, the PUR configuration manager 1610 may transmit, to the UE, a PUR release message. In some examples, the PUR configuration manager 1610 may de-configure the PUR configuration based on the PUR release message.

In some cases, the PUR configuration is provided as a delta configuration that indicates differences over a prior PUR configuration of the UE, a current configuration being used by the UE, or a default PUR configuration. In some cases, the uplink resource for the response message is provided in an explicit indication with the PUR configuration from the base station. In some cases, the uplink resource for the response message is provided in a control channel transmission from the base station in a set of control channel resources to monitored by the UE. In some cases, the PUR configuration failure indication is transmitted when the UE is in an idle mode or in a connected mode with the base station. In some cases, the PUR configuration is provided as a delta configuration that indicates differences over a prior PUR configuration of the UE, that indicates differences over a default PUR configuration, or that indicates differences over a configuration being used at the UE.

In some cases, the PUR configuration is provided in an EDT early data complete message that indicates configured PUR resources of the UE. In some cases, the EDT early data complete message explicitly or implicitly provides one or more of an indication that the UE is to use a prior PUR configuration, a confirmation of the prior PUR configuration, an indication to de-configure and release the prior PUR configuration, a new resource for a new PUR configuration, or any combinations thereof. In some cases, the indication to de-configure and release the prior PUR configuration includes a Boolean flag in the EDT early data complete message. In some cases, the PUR release message is transmitted while the UE is in a connected mode or in an EDT random access response message, and where the PUR release message is a RRC PUR reconfiguration message. In some cases, the PUR request message indicates a reconfiguration of a prior PUR configuration is requested, and where the PUR response message indicates that the prior PUR configuration is to be released by the UE. In some cases, the PUR request message indicates a reconfiguration of a prior PUR configuration is requested, and where the PUR response message indicates that the prior PUR configuration is to be maintained by the UE.

The PUR request manager 1615 may receive, from a UE, a PUR request message. In some examples, the PUR request manager 1615 may receive, from a UE, a PUR request message in the uplink message of the EDT procedure, where the PUR request message indicates a requested configuration, reconfiguration, or release of a PUR configuration. In some examples, the PUR request manager 1615 may receive, from a UE, a PUR request message, where the PUR request message includes a number of instances of PUR grants requested by the UE. In some examples, the PUR request manager 1615 may receive, from a UE, a PUR request message.

The PUR response manager 1620 may receive, via the uplink resource for the response message, a PUR configuration response from the UE.

The EDT random access manager 1625 may determine an EDT configuration for an EDT procedure, where the EDT configuration provides for uplink transmission of UE payload data in an uplink message of the EDT procedure. In some examples, the EDT random access manager 1625 may transmit an indication that the uplink message of the EDT procedure is available for the PUR request message. In some cases, the indication is transmitted in a system information block that is broadcast from the base station.

The paging manager 1630 may determine that the PUR configuration of the UE is to be reconfigured or released. In some examples, the paging manager 1630 may transmit a page message to the UE. In some examples, the paging manager 1630 may receive the random access request message from the UE responsive to the page message. In some examples, the paging manager 1630 may transmit an indication to reconfigure or release the PUR configuration responsive to the random access request message. In some cases, the indication to reconfigure the PUR configuration indicates a new PUR configuration to be used by the UE, or indicates that the UE is to release the PUR configuration.

The PUR grant manager 1635 may identify PUR grants for a UE PUR configuration. In some cases, the number of instances of PUR grants provides an explicit number of PUR grants or an indication of an indefinite number of PUR grants. In some cases, the number of instances being zero indicates the PUR configuration is to be released. In some cases, the number of instances of PUR grants requested by the UE indicate a one-shot PUR configuration is requested or a multi-shot PUR configuration is requested.

Figure 17:
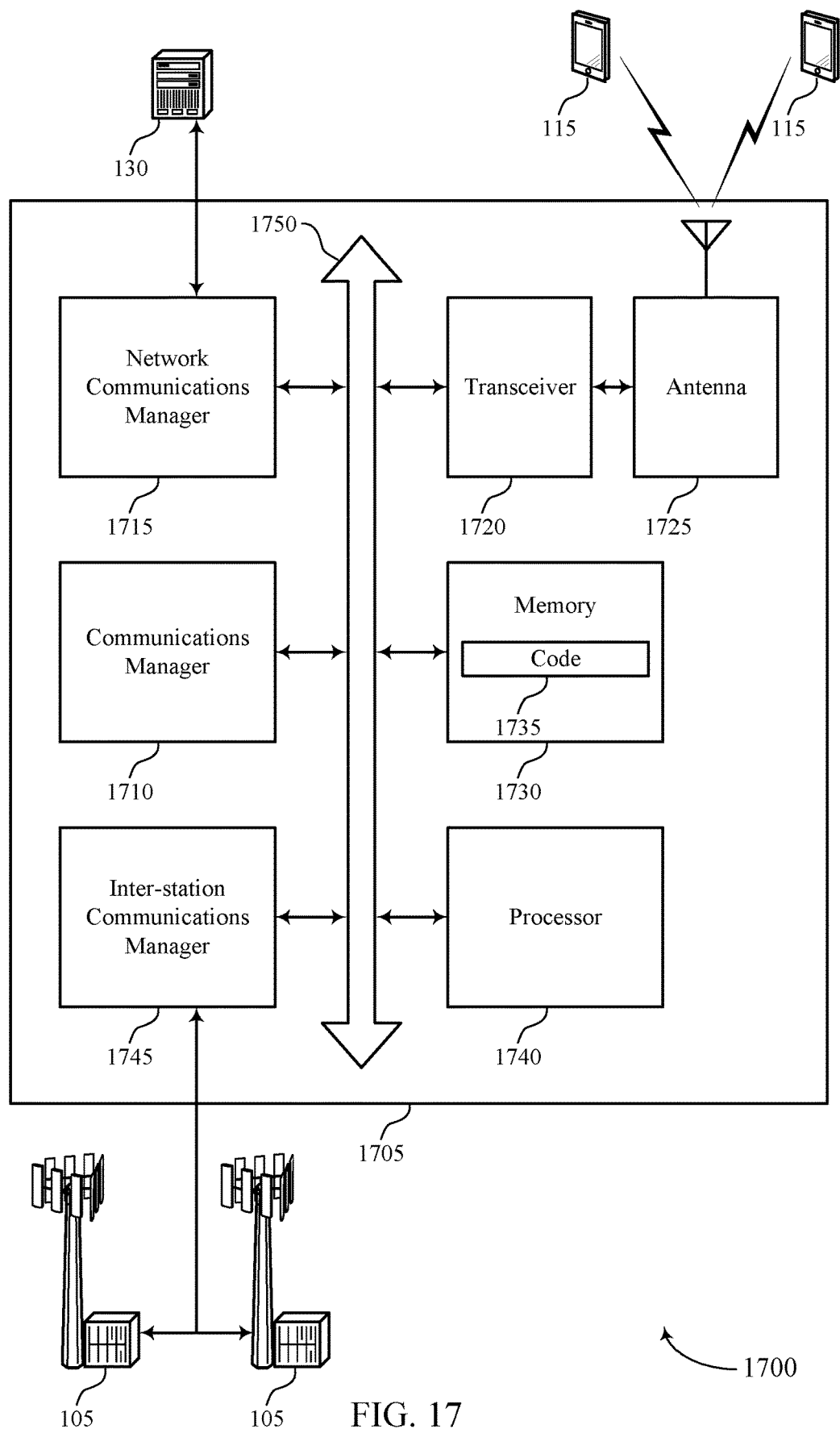
FIG. 17 shows a diagram of a system including a device that supports PUR techniques in wireless communications in accordance with aspects of the present disclosure.

FIG. 17 shows a diagram of a system 1700 including a device 1705 that supports PUR techniques in wireless communications in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may transmit an indication that the base station supports PUR for grant-free uplink transmissions, transmit, responsive to the PUR request message, a PUR configuration to the UE that identifies PUR allocated to the UE, receive, from a UE, a PUR request message, and receive, via the uplink resource for the response message, a PUR configuration response from the UE.

The communications manager 1710 may also determine an EDT configuration for an EDT procedure, where the EDT configuration provides for uplink transmission of UE payload data in an uplink message of the EDT procedure, receive, from a UE, a PUR request message in the uplink message of the EDT procedure, where the PUR request message indicates a requested configuration, reconfiguration, or release of a PUR configuration, and transmit a PUR configuration message to the UE responsive to the PUR request message, where the PUR configuration indicates an uplink resource for a response message from the UE.

The communications manager 1710 may also transmit an indication that the base station supports PUR for grant-free uplink transmissions, transmit a PUR configuration to the UE responsive to the PUR request message, and receive, from a UE, a PUR request message, where the PUR request message includes a number of instances of PUR grants requested by the UE.

The communications manager 1710 may also transmit an indication that the base station supports PUR for grant-free uplink transmissions, transmit a PUR response message to the UE responsive to the PUR request message that indicates the PUR request message is rejected, and where the PUR response message indicates how the UE is to proceed based on the rejected PUR request message, and receive, from a UE, a PUR request message.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting PUR techniques in wireless communications).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
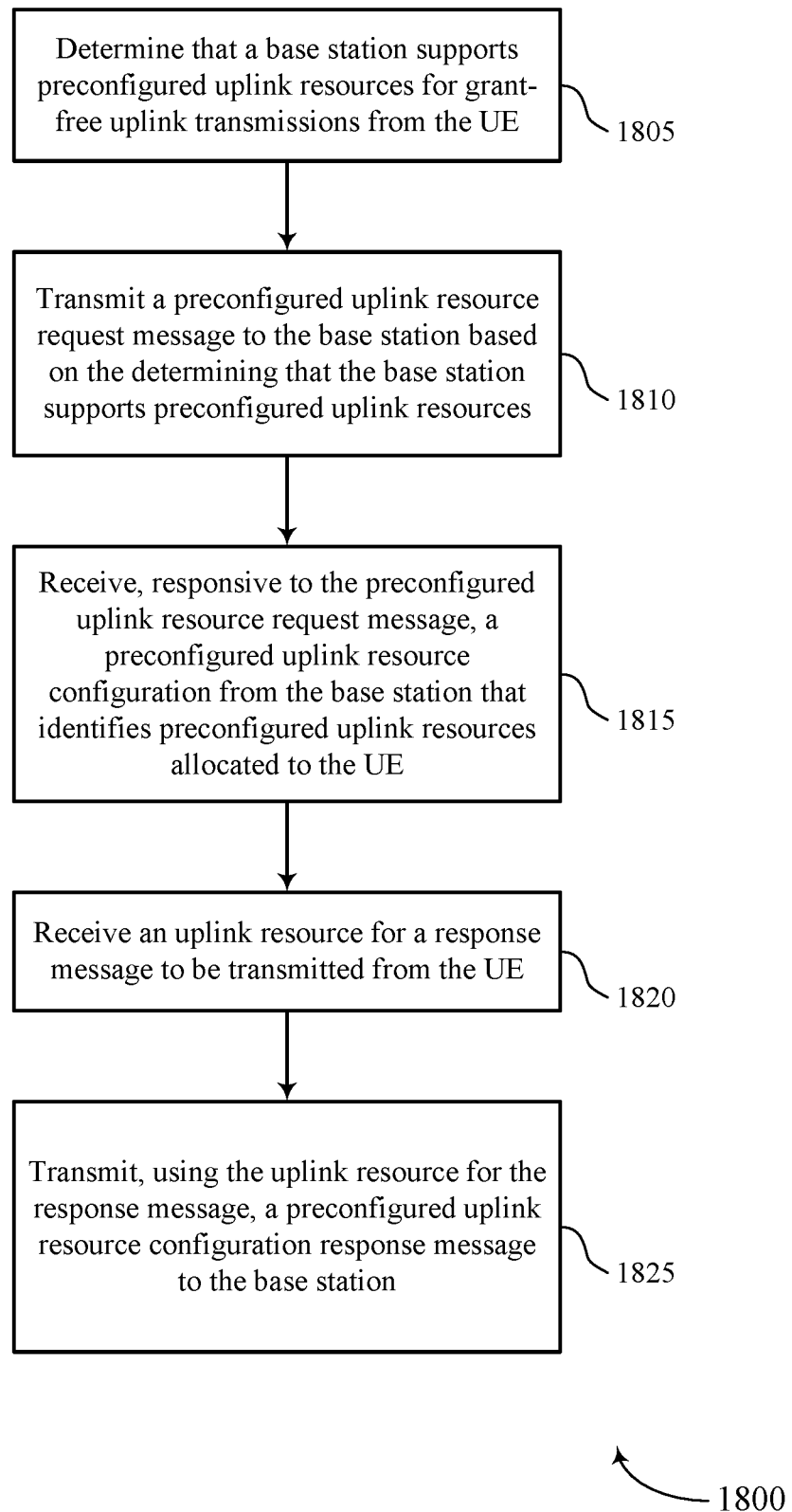
FIGS. 18 through 29 show flowcharts illustrating methods that support PUR techniques in wireless communications in accordance with aspects of the present disclosure.

FIG. 18 shows a flowchart illustrating a method 1800 that supports PUR techniques in wireless communications in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may determine that a base station supports PUR for grant-free uplink transmissions from the UE. The operations of 1805 may be performed according to the methods described herein. In some examples, aspects of the operations of 1805 may be performed by a PUR determination component as described with reference to FIGS. 10 through 13.

At 1810, the UE may transmit a PUR request message to the base station based on the determining that the base station supports PUR. The operations of 1810 may be performed according to the methods described herein. In some examples, aspects of the operations of 1810 may be performed by a PUR request manager as described with reference to FIGS. 10 through 13.

At 1815, the UE may receive, responsive to the PUR request message, a PUR configuration from the base station that identifies PUR allocated to the UE. The operations of 1815 may be performed according to the methods described herein. In some examples, aspects of the operations of 1815 may be performed by a PUR configuration manager as described with reference to FIGS. 10 through 13.

At 1820, the UE may receive an uplink resource for a response message to be transmitted from the UE. The operations of 1820 may be performed according to the methods described herein. In some examples, aspects of the operations of 1820 may be performed by a PUR transmission manager as described with reference to FIGS. 10 through 13.

At 1825, the UE may transmit, using the uplink resource for the response message, a PUR configuration response message to the base station. The operations of 1825 may be performed according to the methods described herein. In some examples, aspects of the operations of 1825 may be performed by a PUR transmission manager as described with reference to FIGS. 10 through 13.

Figure 19:
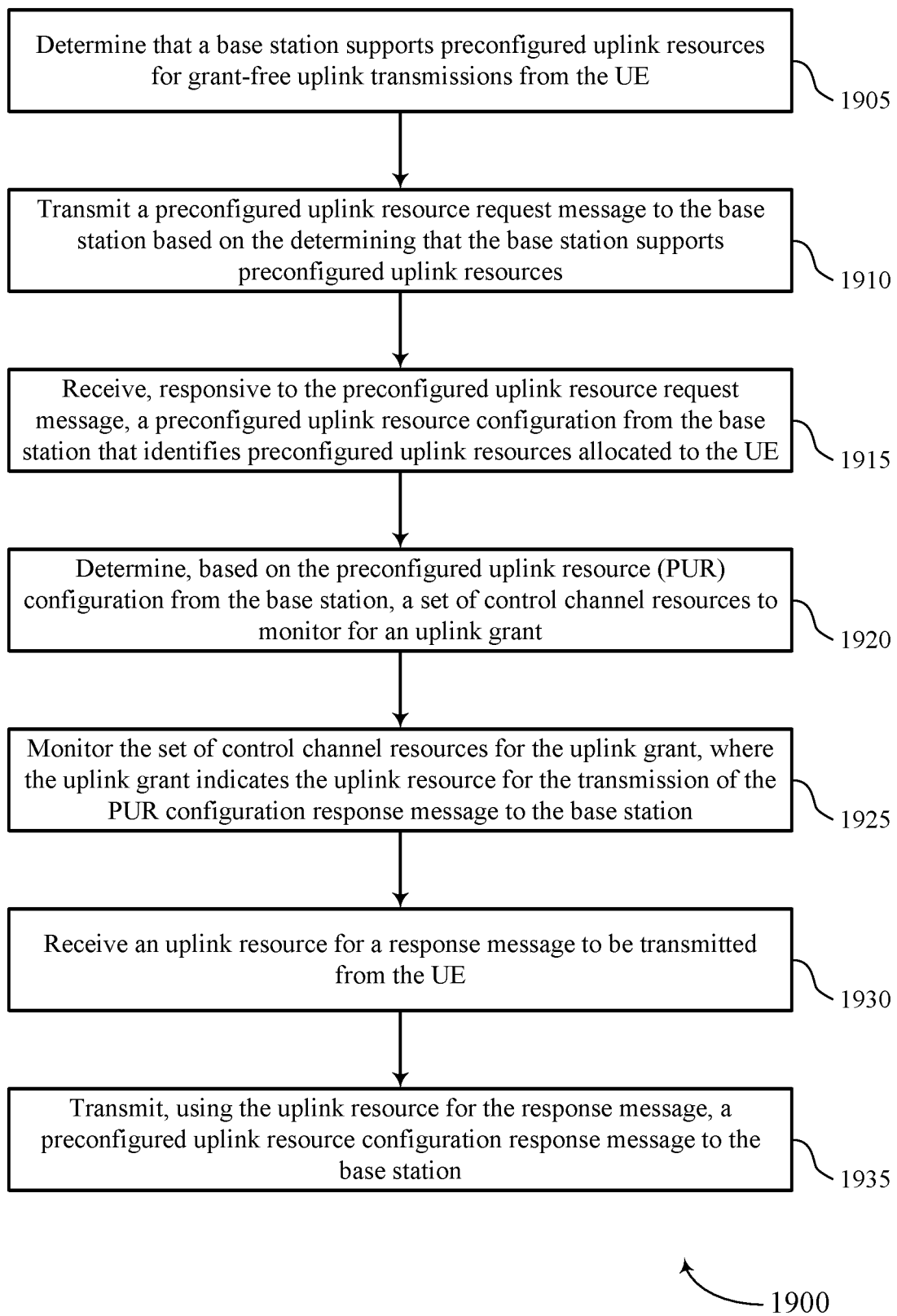

FIG. 19 shows a flowchart illustrating a method 1900 that supports PUR techniques in wireless communications in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may determine that a base station supports PUR for grant-free uplink transmissions from the UE. The operations of 1905 may be performed according to the methods described herein. In some examples, aspects of the operations of 1905 may be performed by a PUR determination component as described with reference to FIGS. 10 through 13.

At 1910, the UE may transmit a PUR request message to the base station based on the determining that the base station supports PUR. The operations of 1910 may be performed according to the methods described herein. In some examples, aspects of the operations of 1910 may be performed by a PUR request manager as described with reference to FIGS. 10 through 13.

At 1915, the UE may receive, responsive to the PUR request message, a PUR configuration from the base station that identifies PUR allocated to the UE. The operations of 1915 may be performed according to the methods described herein. In some examples, aspects of the operations of 1915 may be performed by a PUR configuration manager as described with reference to FIGS. 10 through 13.

At 1920, the UE may determine, based on the PUR configuration from the base station, a set of control channel resources to monitor for an uplink grant. The operations of 1920 may be performed according to the methods described herein. In some examples, aspects of the operations of 1920 may be performed by a PUR configuration manager as described with reference to FIGS. 10 through 13.

At 1925, the UE may monitor the set of control channel resources for the uplink grant, where the uplink grant indicates the uplink resource for the transmission of the PUR configuration response message to the base station. The operations of 1925 may be performed according to the methods described herein. In some examples, aspects of the operations of 1925 may be performed by a PUR configuration manager as described with reference to FIGS. 10 through 13.

At 1930, the UE may receive an uplink resource for a response message to be transmitted from the UE. The operations of 1930 may be performed according to the methods described herein. In some examples, aspects of the operations of 1930 may be performed by a PUR transmission manager as described with reference to FIGS. 10 through 13.

At 1935, the UE may transmit, using the uplink resource for the response message, a PUR configuration response message to the base station. The operations of 1935 may be performed according to the methods described herein. In some examples, aspects of the operations of 1935 may be performed by a PUR transmission manager as described with reference to FIGS. 10 through 13.

Figure 20:
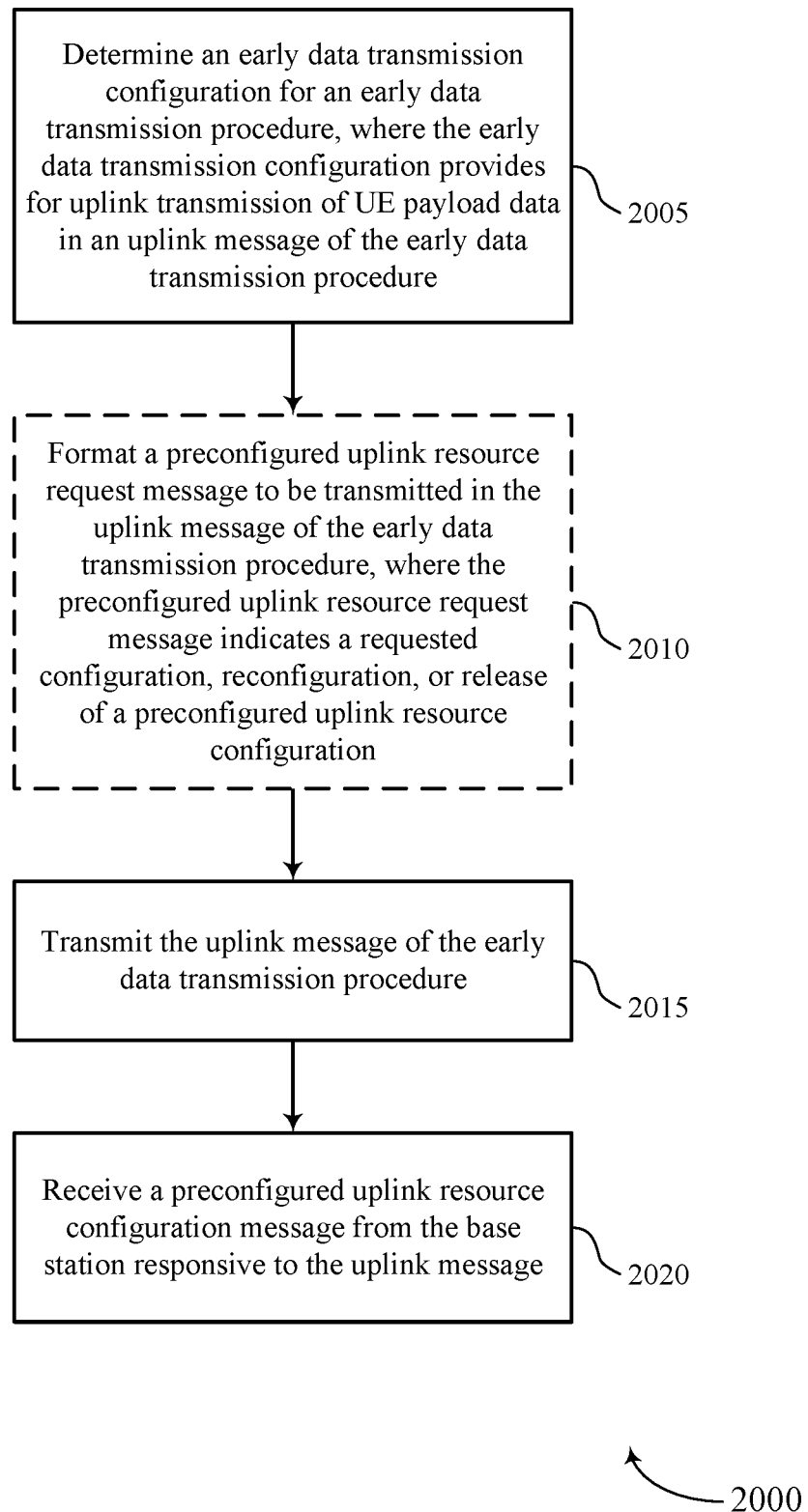

FIG. 20 shows a flowchart illustrating a method 2000 that supports PUR techniques in wireless communications in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2005, the UE may determine an EDT configuration for an EDT procedure, where the EDT configuration provides for uplink transmission of UE payload data in an uplink message of the EDT procedure. The operations of 2005 may be performed according to the methods described herein. In some examples, aspects of the operations of 2005 may be performed by an EDT random access manager as described with reference to FIGS. 10 through 13.

Optionally, at 2010, the UE may format a PUR request message to be transmitted in the uplink message of the EDT procedure, where the PUR request message indicates a requested configuration, reconfiguration, or release of a PUR configuration. The operations of 2010 may be performed according to the methods described herein. In some examples, aspects of the operations of 2010 may be performed by a PUR request manager as described with reference to FIGS. 10 through 13.

At 2015, the UE may transmit the uplink message of the EDT procedure. In some cases, the uplink message may include a PUR request message that indicates a requested configuration, reconfiguration, or release of a PUR configuration. The operations of 2015 may be performed according to the methods described herein. In some examples, aspects of the operations of 2015 may be performed by a PUR request manager as described with reference to FIGS. 10 through 13.

At 2020, the UE may receive a PUR configuration message from the base station responsive to the uplink message. The operations of 2020 may be performed according to the methods described herein. In some examples, aspects of the operations of 2020 may be performed by a PUR configuration manager as described with reference to FIGS. 10 through 13.

Figure 21:
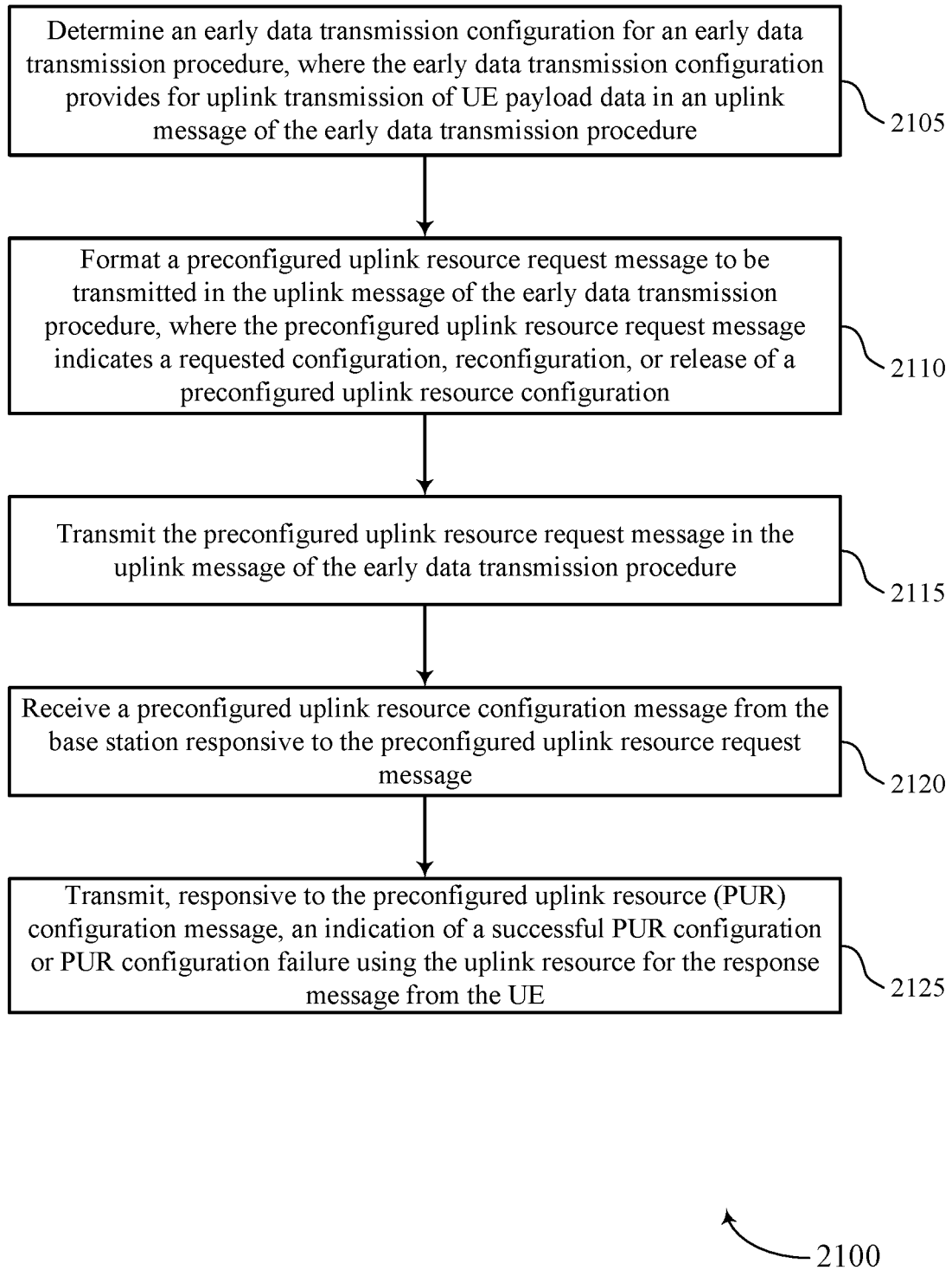

FIG. 21 shows a flowchart illustrating a method 2100 that supports PUR techniques in wireless communications in accordance with aspects of the present disclosure. The operations of method 2100 may be implemented by a UE 115 or its components as described herein. For example, the operations of method 2100 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2105, the UE may determine an EDT configuration for an EDT procedure, where the EDT configuration provides for uplink transmission of UE payload data in an uplink message of the EDT procedure. The operations of 2105 may be performed according to the methods described herein. In some examples, aspects of the operations of 2105 may be performed by an EDT random access manager as described with reference to FIGS. 10 through 13.

At 2110, the UE may format a PUR request message to be transmitted in the uplink message of the EDT procedure, where the PUR request message indicates a requested configuration, reconfiguration, or release of a PUR configuration. The operations of 2110 may be performed according to the methods described herein. In some examples, aspects of the operations of 2110 may be performed by a PUR request manager as described with reference to FIGS. 10 through 13.

At 2115, the UE may transmit the PUR request message in the uplink message of the EDT procedure. The operations of 2115 may be performed according to the methods described herein. In some examples, aspects of the operations of 2115 may be performed by a PUR request manager as described with reference to FIGS. 10 through 13.

At 2120, the UE may receive a PUR configuration message from the base station responsive to the PUR request message. The operations of 2120 may be performed according to the methods described herein. In some examples, aspects of the operations of 2120 may be performed by a PUR configuration manager as described with reference to FIGS. 10 through 13.

At 2125, the UE may transmit, responsive to the PUR configuration message, an indication of a successful PUR configuration or PUR configuration failure using the uplink resource for the response message from the UE. The operations of 2125 may be performed according to the methods described herein. In some examples, aspects of the operations of 2125 may be performed by a PUR response manager as described with reference to FIGS. 10 through 13.

Figure 22:
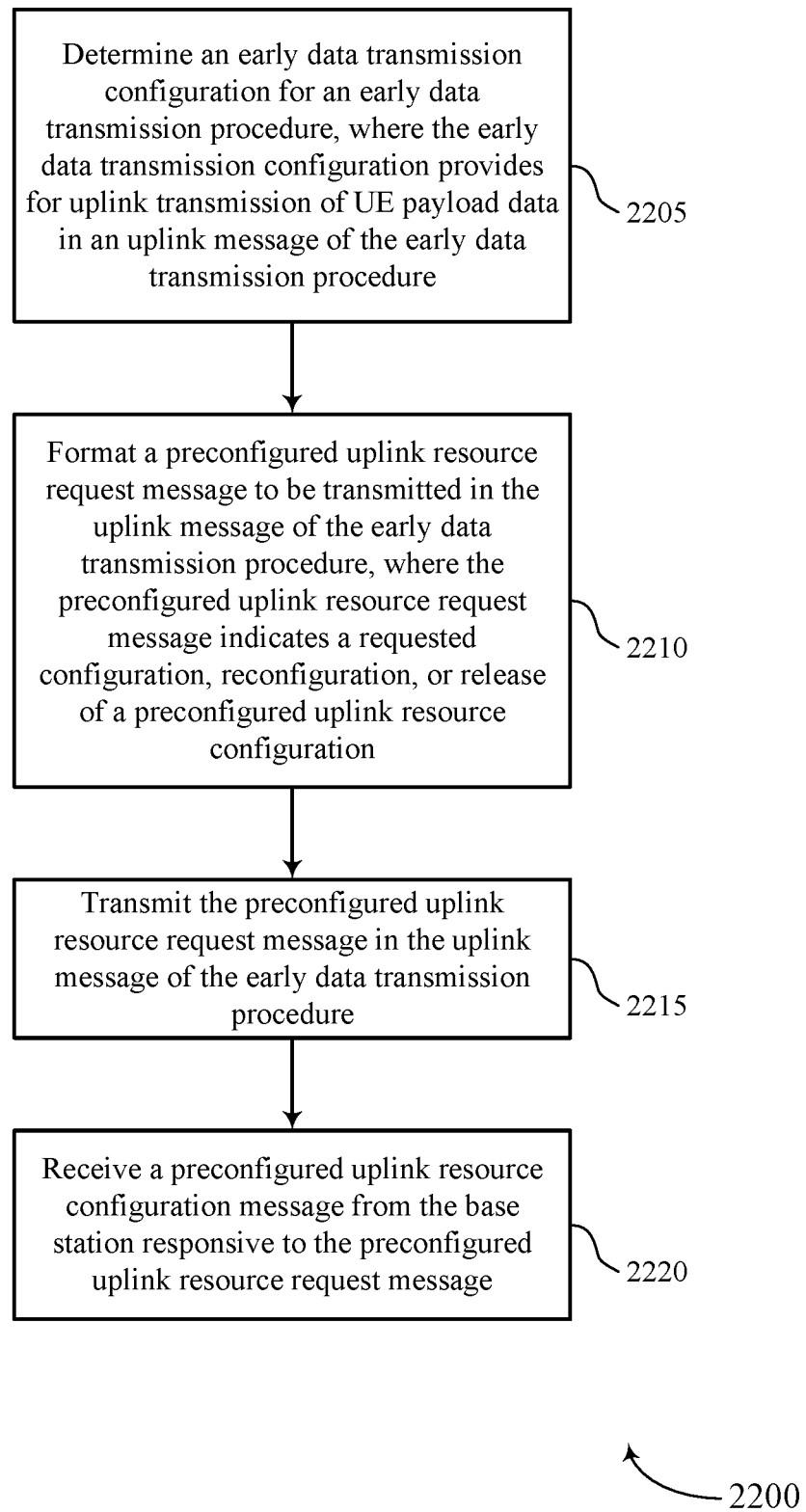

FIG. 22 shows a flowchart illustrating a method 2200 that supports PUR techniques in wireless communications in accordance with aspects of the present disclosure. The operations of method 2200 may be implemented by a UE 115 or its components as described herein. For example, the operations of method 2200 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2205, the UE may determine an EDT configuration for an EDT procedure, where the EDT configuration provides for uplink transmission of UE payload data in an uplink message of the EDT procedure. The operations of 2205 may be performed according to the methods described herein. In some examples, aspects of the operations of 2205 may be performed by an EDT random access manager as described with reference to FIGS. 10 through 13.

At 2210, the UE may format a PUR request message to be transmitted in the uplink message of the EDT procedure, where the PUR request message indicates a requested configuration, reconfiguration, or release of a PUR configuration. The operations of 2210 may be performed according to the methods described herein. In some examples, aspects of the operations of 2210 may be performed by a PUR request manager as described with reference to FIGS. 10 through 13.

At 2215, the UE may transmit the PUR request message in the uplink message of the EDT procedure. The operations of 2215 may be performed according to the methods described herein. In some examples, aspects of the operations of 2215 may be performed by a PUR request manager as described with reference to FIGS. 10 through 13.

At 2220, the UE may receive a PUR configuration message from the base station responsive to the PUR request message. The operations of 2220 may be performed according to the methods described herein. In some examples, aspects of the operations of 2220 may be performed by a PUR configuration manager as described with reference to FIGS. 10 through 13.

Figure 23:
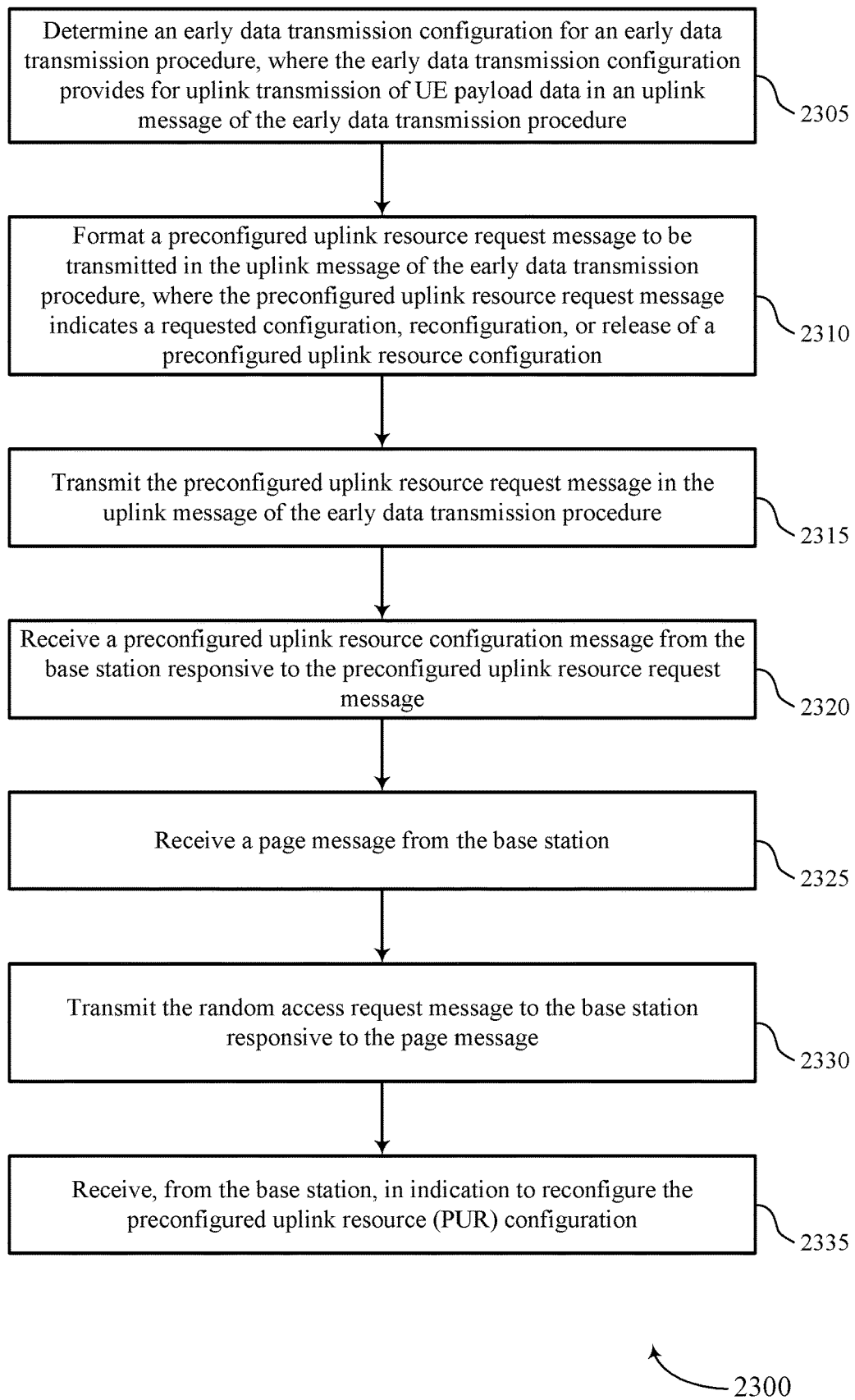

FIG. 23 shows a flowchart illustrating a method 2300 that supports PUR techniques in wireless communications in accordance with aspects of the present disclosure. The operations of method 2300 may be implemented by a UE 115 or its components as described herein. For example, the operations of method 2300 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2305, the UE may determine an EDT configuration for an EDT procedure, where the EDT configuration provides for uplink transmission of UE payload data in an uplink message of the EDT procedure. The operations of 2305 may be performed according to the methods described herein. In some examples, aspects of the operations of 2305 may be performed by an EDT random access manager as described with reference to FIGS. 10 through 13.

At 2310, the UE may format a PUR request message to be transmitted in the uplink message of the EDT procedure, where the PUR request message indicates a requested configuration, reconfiguration, or release of a PUR configuration. The operations of 2310 may be performed according to the methods described herein. In some examples, aspects of the operations of 2310 may be performed by a PUR request manager as described with reference to FIGS. 10 through 13.

At 2315, the UE may transmit the PUR request message in the uplink message of the EDT procedure. The operations of 2315 may be performed according to the methods described herein. In some examples, aspects of the operations of 2315 may be performed by a PUR request manager as described with reference to FIGS. 10 through 13.

At 2320, the UE may receive a PUR configuration message from the base station responsive to the PUR request message. The operations of 2320 may be performed according to the methods described herein. In some examples, aspects of the operations of 2320 may be performed by a PUR configuration manager as described with reference to FIGS. 10 through 13.

At 2325, the UE may receive a page message from the base station. The operations of 2325 may be performed according to the methods described herein. In some examples, aspects of the operations of 2325 may be performed by a paging manager as described with reference to FIGS. 10 through 13.

At 2330, the UE may transmit a random access request message to the base station responsive to the page message. The operations of 2330 may be performed according to the methods described herein. In some examples, aspects of the operations of 2330 may be performed by a paging manager as described with reference to FIGS. 10 through 13.

At 2335, the UE may receive, from the base station, an indication to reconfigure the PUR configuration. The operations of 2335 may be performed according to the methods described herein. In some examples, aspects of the operations of 2335 may be performed by a PUR configuration manager as described with reference to FIGS. 10 through 13.

Figure 24:
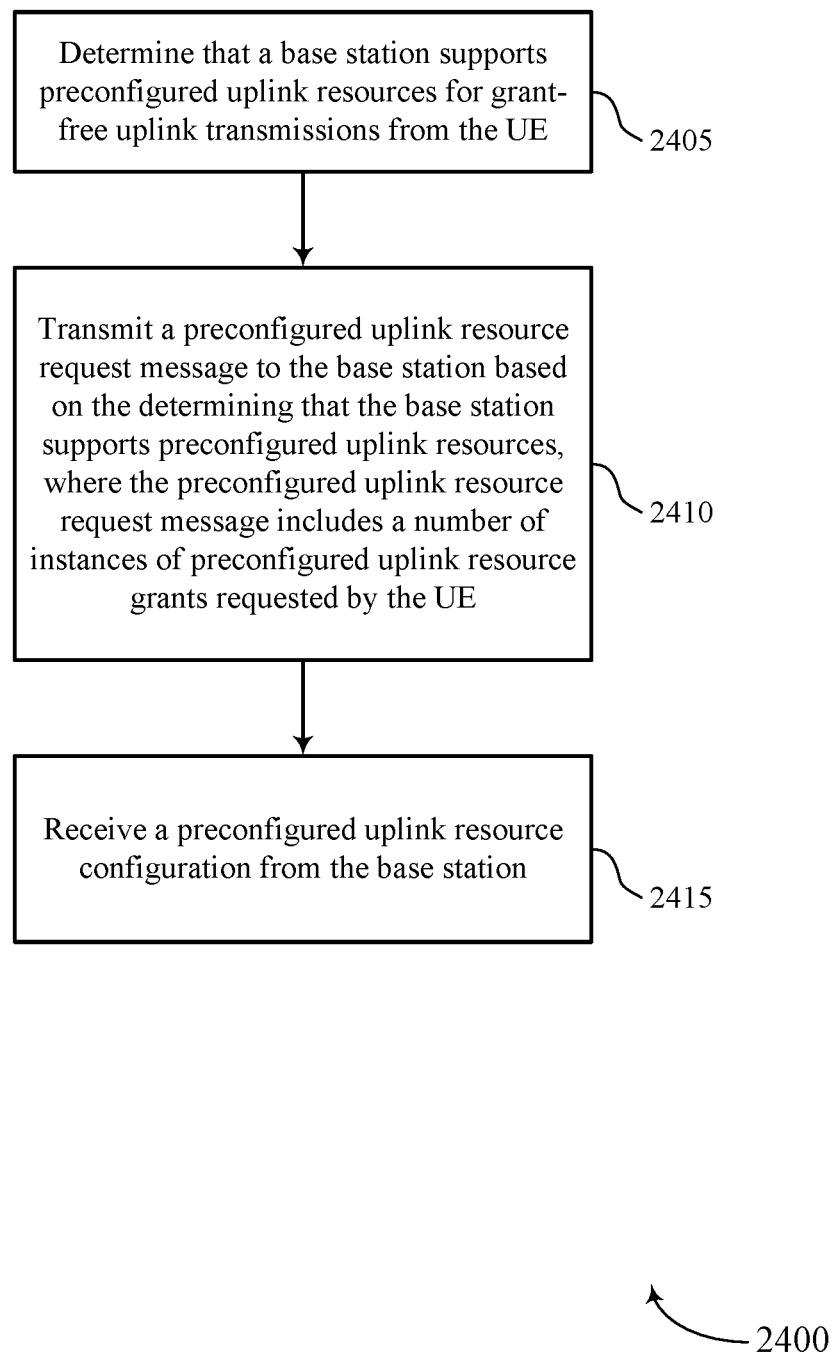

FIG. 24 shows a flowchart illustrating a method 2400 that supports PUR techniques in wireless communications in accordance with aspects of the present disclosure. The operations of method 2400 may be implemented by a UE 115 or its components as described herein. For example, the operations of method 2400 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2405, the UE may determine that a base station supports PUR for grant-free uplink transmissions from the UE. The operations of 2405 may be performed according to the methods described herein. In some examples, aspects of the operations of 2405 may be performed by a PUR determination component as described with reference to FIGS. 10 through 13.

At 2410, the UE may transmit a PUR request message to the base station based on the determining that the base station supports PUR, where the PUR request message includes a number of instances of PUR grants requested by the UE. The operations of 2410 may be performed according to the methods described herein. In some examples, aspects of the operations of 2410 may be performed by a PUR request manager as described with reference to FIGS. 10 through 13.

At 2415, the UE may receive a PUR configuration from the base station. The operations of 2415 may be performed according to the methods described herein. In some examples, aspects of the operations of 2415 may be performed by a PUR configuration manager as described with reference to FIGS. 10 through 13. In some cases, the PUR configuration may be based on the number of instances of PUR grants requested by the UE.

Figure 25:
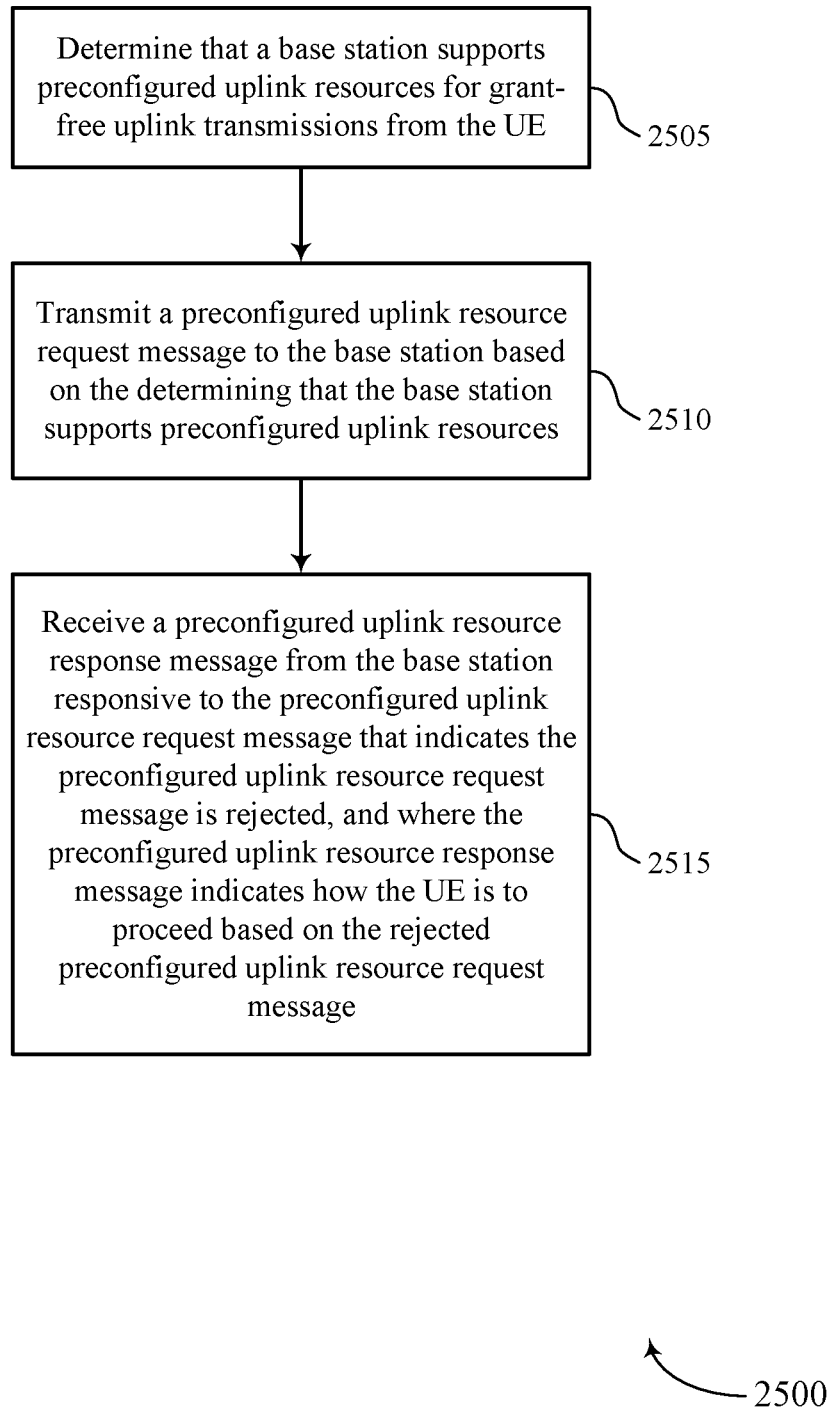

FIG. 25 shows a flowchart illustrating a method 2500 that supports PUR techniques in wireless communications in accordance with aspects of the present disclosure. The operations of method 2500 may be implemented by a UE 115 or its components as described herein. For example, the operations of method 2500 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2505, the UE may determine that a base station supports PUR for grant-free uplink transmissions from the UE. The operations of 2505 may be performed according to the methods described herein. In some examples, aspects of the operations of 2505 may be performed by a PUR determination component as described with reference to FIGS. 10 through 13.

At 2510, the UE may transmit a PUR request message to the base station based on the determining that the base station supports PUR. The operations of 2510 may be performed according to the methods described herein. In some examples, aspects of the operations of 2510 may be performed by a PUR request manager as described with reference to FIGS. 10 through 13.

At 2515, the UE may receive a PUR response message from the base station responsive to the PUR request message that indicates the PUR request message is rejected, and where the PUR response message indicates how the UE is to proceed based on the rejected PUR request message. The operations of 2515 may be performed according to the methods described herein. In some examples, aspects of the operations of 2515 may be performed by a PUR configuration manager as described with reference to FIGS. 10 through 13.

Figure 26:
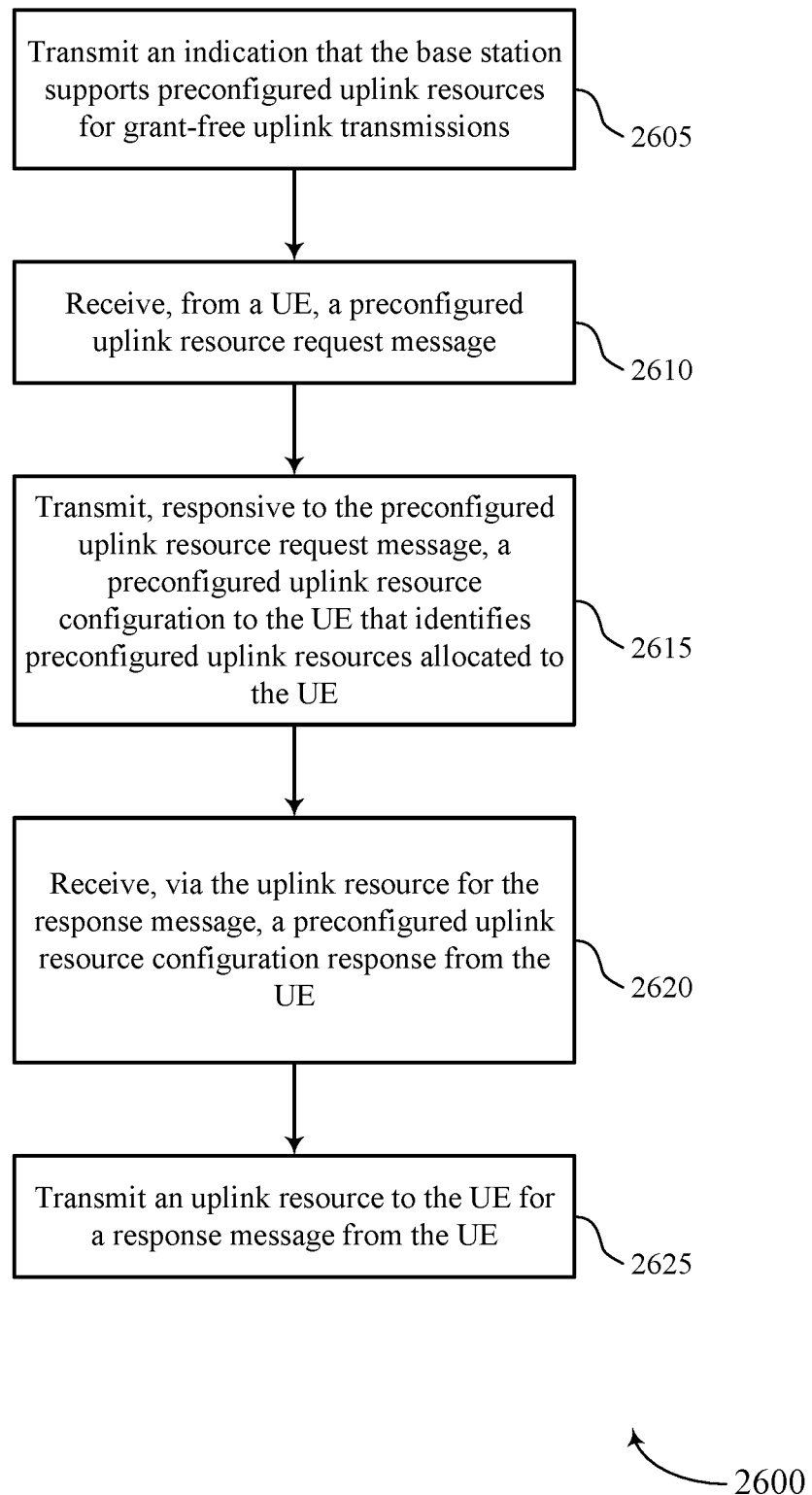

FIG. 26 shows a flowchart illustrating a method 2600 that supports PUR techniques in wireless communications in accordance with aspects of the present disclosure. The operations of method 2600 may be implemented by a base station 105 or its components as described herein. For example, the operations of method 2600 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2605, the base station may transmit an indication that the base station supports PUR for grant-free uplink transmissions. The operations of 2605 may be performed according to the methods described herein. In some examples, aspects of the operations of 2605 may be performed by a PUR configuration manager as described with reference to FIGS. 14 through 17.

At 2610, the base station may receive, from a UE, a PUR request message. The operations of 2610 may be performed according to the methods described herein. In some examples, aspects of the operations of 2610 may be performed by a PUR request manager as described with reference to FIGS. 14 through 17.

At 2615, the base station may transmit, responsive to the PUR request message, a PUR configuration to the UE that identifies PUR allocated to the UE. The operations of 2615 may be performed according to the methods described herein. In some examples, aspects of the operations of 2615 may be performed by a PUR configuration manager as described with reference to FIGS. 14 through 17.

At 2620, the base station may receive, via the uplink resource for the response message, a PUR configuration response from the UE. The operations of 2620 may be performed according to the methods described herein. In some examples, aspects of the operations of 2620 may be performed by a PUR response manager as described with reference to FIGS. 14 through 17.

At 2625, the base station may transmit an uplink resource to the UE for a response message from the UE. The operations of 2625 may be performed according to the methods described herein. In some examples, aspects of the operations of 2625 may be performed by a undefined as described with reference to FIGS. 14 through 17.

Figure 27:
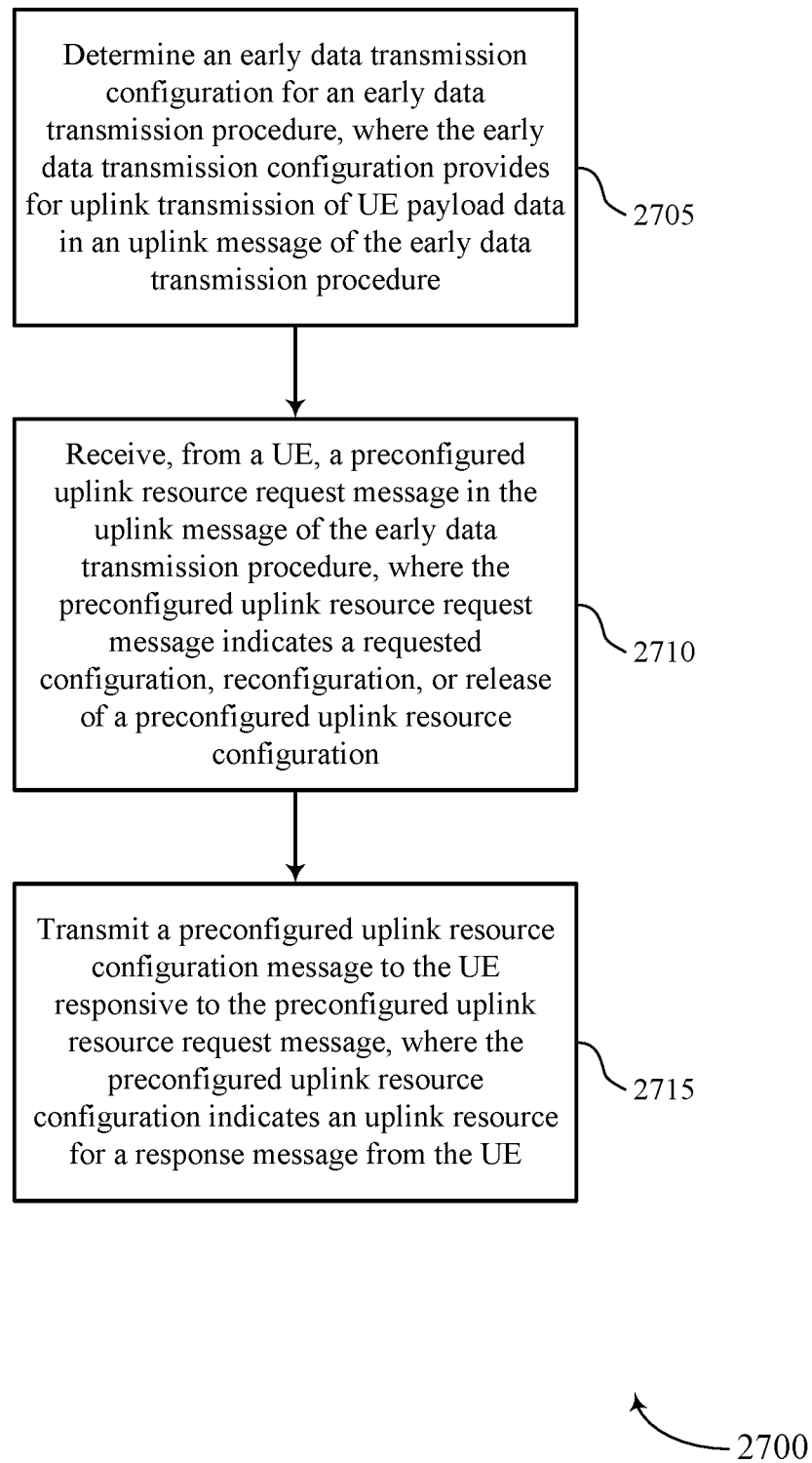

FIG. 27 shows a flowchart illustrating a method 2700 that supports PUR techniques in wireless communications in accordance with aspects of the present disclosure. The operations of method 2700 may be implemented by a base station 105 or its components as described herein. For example, the operations of method 2700 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2705, the base station may determine an EDT configuration for an EDT procedure, where the EDT configuration provides for uplink transmission of UE payload data in an uplink message of the EDT procedure. The operations of 2705 may be performed according to the methods described herein. In some examples, aspects of the operations of 2705 may be performed by an EDT random access manager as described with reference to FIGS. 14 through 17.

At 2710, the base station may receive, from a UE, a PUR request message in the uplink message of the EDT procedure, where the PUR request message indicates a requested configuration, reconfiguration, or release of a PUR configuration. The operations of 2710 may be performed according to the methods described herein. In some examples, aspects of the operations of 2710 may be performed by a PUR request manager as described with reference to FIGS. 14 through 17.

At 2715, the base station may transmit a PUR configuration message to the UE responsive to the PUR request message, where the PUR configuration indicates an uplink resource for a response message from the UE. The operations of 2715 may be performed according to the methods described herein. In some examples, aspects of the operations of 2715 may be performed by a PUR configuration manager as described with reference to FIGS. 14 through 17.

Figure 28:
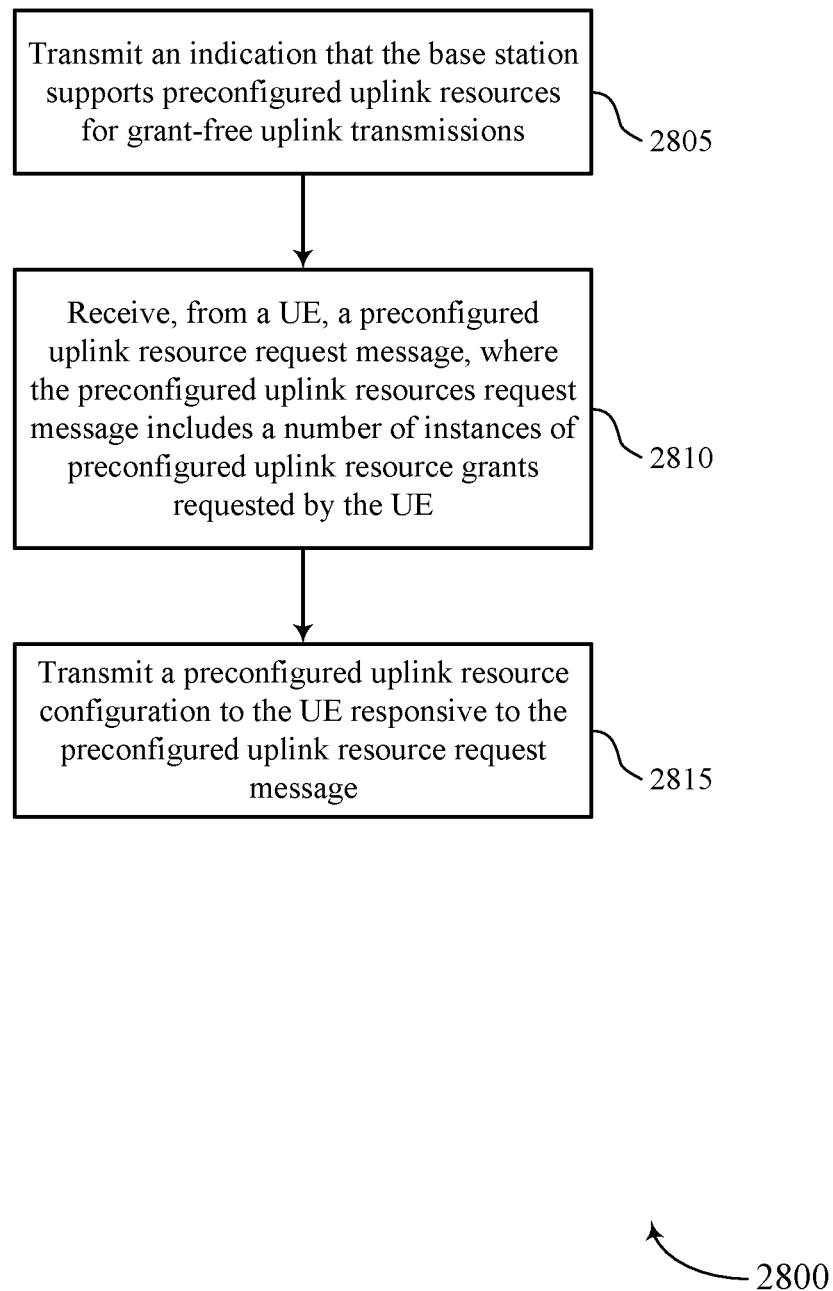

FIG. 28 shows a flowchart illustrating a method 2800 that supports PUR techniques in wireless communications in accordance with aspects of the present disclosure. The operations of method 2800 may be implemented by a base station 105 or its components as described herein. For example, the operations of method 2800 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2805, the base station may transmit an indication that the base station supports PUR for grant-free uplink transmissions. The operations of 2805 may be performed according to the methods described herein. In some examples, aspects of the operations of 2805 may be performed by a PUR configuration manager as described with reference to FIGS. 14 through 17.

At 2810, the base station may receive, from a UE, a PUR request message, where the PUR request message includes a number of instances of PUR grants requested by the UE. The operations of 2810 may be performed according to the methods described herein. In some examples, aspects of the operations of 2810 may be performed by a PUR request manager as described with reference to FIGS. 14 through 17.

At 2815, the base station may transmit a PUR configuration to the UE responsive to the PUR request message. The operations of 2815 may be performed according to the methods described herein. In some examples, aspects of the operations of 2815 may be performed by a PUR configuration manager as described with reference to FIGS. 14 through 17.

Figure 29:
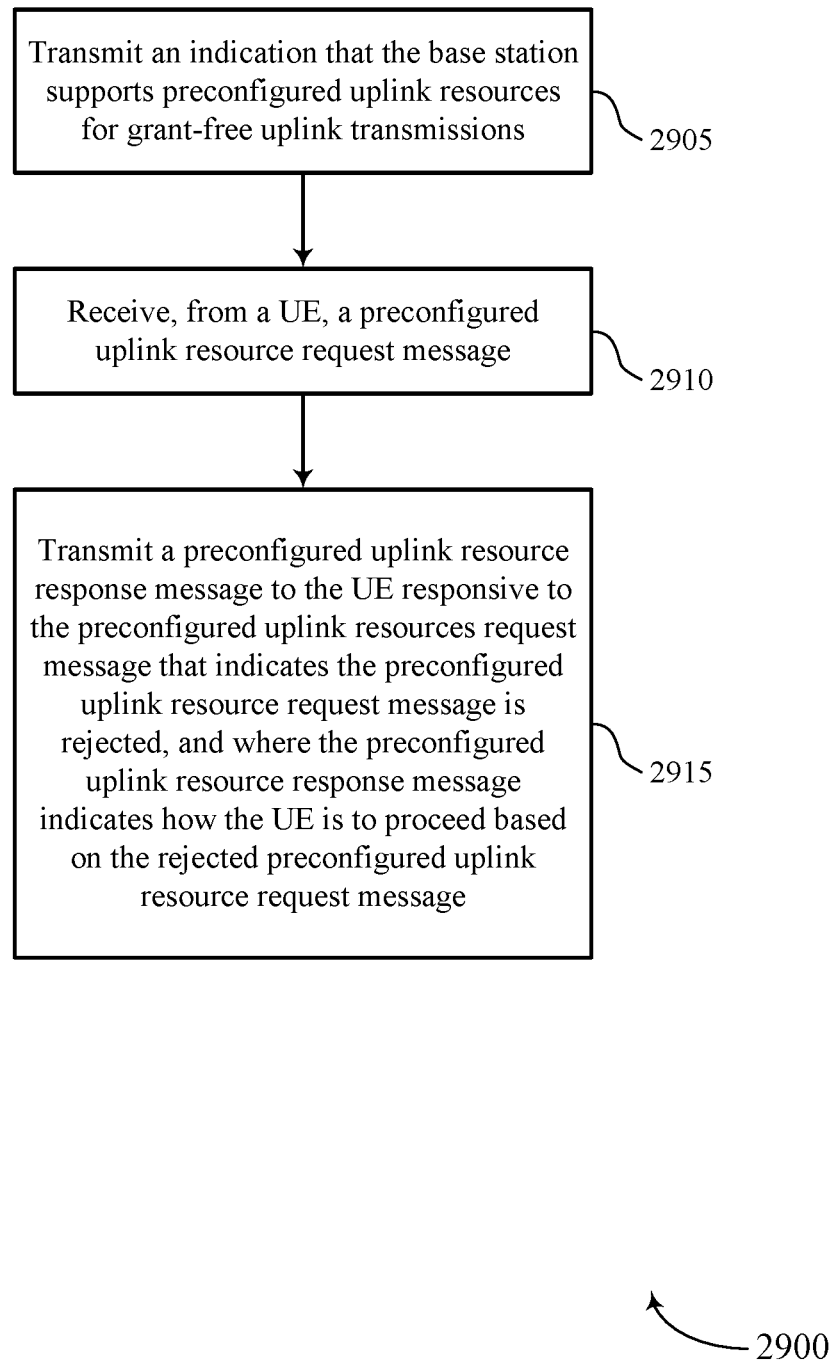

FIG. 29 shows a flowchart illustrating a method 2900 that supports PUR techniques in wireless communications in accordance with aspects of the present disclosure. The operations of method 2900 may be implemented by a base station 105 or its components as described herein. For example, the operations of method 2900 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2905, the base station may transmit an indication that the base station supports PUR for grant-free uplink transmissions. The operations of 2905 may be performed according to the methods described herein. In some examples, aspects of the operations of 2905 may be performed by a PUR configuration manager as described with reference to FIGS. 14 through 17.

At 2910, the base station may receive, from a UE, a PUR request message. The operations of 2910 may be performed according to the methods described herein. In some examples, aspects of the operations of 2910 may be performed by a PUR request manager as described with reference to FIGS. 14 through 17.

At 2915, the base station may transmit a PUR response message to the UE responsive to the PUR request message that indicates the PUR request message is rejected, and where the PUR response message indicates how the UE is to proceed based on the rejected PUR request message. The operations of 2915 may be performed according to the methods described herein. In some examples, aspects of the operations of 2915 may be performed by a PUR configuration manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
transmitting a preconfigured uplink resource (PUR) request message to an access network entity based at least in part on determining that the access network entity supports preconfigured uplink resources, wherein the PUR request message includes a number of instances of PUR grants requested by the UE; and receiving a message from the access network entity indicating a PUR configuration, wherein the PUR configuration comprises a delta configuration that indicates at least one difference over a configuration of the UE.

2. The method of claim 1, wherein the number of instances of PUR grants provides an explicit number of PUR grants or an indication of an infinite number of PUR grants.

3. The method of claim 1, wherein the number of instances of PUR grants requested by the UE indicate a one-shot PUR configuration is requested or a multi-shot PUR configuration is requested.

4. The method of claim 1, wherein the configuration is a prior PUR configuration of the UE.

5. The method of claim 1, wherein the configuration is a default PUR configuration.

6. The method of claim 1, further comprising:
transmitting, after receiving the PUR configuration, a PUR reconfiguration failure indication to the access network entity; and
releasing the PUR configuration.

7. The method of claim 1, further comprising:
determining, based at least in part on the message from the access network entity, a set of control channel resources to monitor for an uplink grant; and
monitoring the set of control channel resources for the uplink grant, wherein the uplink grant indicates an uplink resource for transmission of a PUR configuration response message to the access network entity.

8. The method of claim 1, further comprising:
determining that the PUR configuration is de-configured based at least in part on receiving a broadcast system information transmission from the access network entity that indicates PUR is unsupported; and
releasing the PUR configuration.

9. The method of claim 1, wherein the PUR request message is transmitted to the access network entity in an uplink message of an early data transmission (EDT) procedure.

10. The method of claim 9, further comprising:
formatting the PUR request message to be transmitted in the uplink message of the EDT procedure, wherein the PUR request message indicates a requested PUR configuration or release of a PUR configuration.

11. The method of claim 9, wherein the PUR request message is transmitted in a message three (MSG3) transmission of the EDT procedure.

12. The method of claim 1, wherein the message from the access network entity indicating the PUR configuration is received in an early data transmission (EDT) downlink message 4 that provides a radio resource control (RRC) connection release message or an RRC early data complete message.

13. The method of claim 1, wherein the message from the access network entity explicitly or implicitly provides one or more of an indication to de-configure and release a prior or default PUR configuration, a new resource for a new PUR configuration to use as the configuration, or any combination thereof.

14. An apparatus for wireless communication at a user equipment (UE), comprising:
one or more processors,
one or more memories coupled with the one or more processors; and
one or more instructions stored in the one or more memories and executable by the one or more processors individually or collectively to cause the apparatus to:
transmit a preconfigured uplink resource (PUR) request message to an access network entity based at least in part on determining that the access network entity supports preconfigured uplink resources, wherein the PUR request message includes a number of instances of PUR grants requested by the UE; and
receive a message from the access network entity indicating a PUR configuration, wherein the PUR configuration comprises a delta configuration that indicates at least one difference over a configuration of the UE.

15. The apparatus of claim 14, wherein the number of instances of PUR grants provides an explicit number of PUR grants or an indication of an infinite number of PUR grants.

16. The apparatus of claim 14, wherein the configuration is a prior PUR configuration of the UE or a default PUR configuration.

17. The apparatus of claim 14, wherein the one or more instructions are further executable by the one or more processors individually or collectively to cause the apparatus to:
transmit, after receiving the PUR configuration, a PUR reconfiguration failure indication to the access network entity; and
release the PUR configuration.

18. The apparatus of claim 14, wherein the one or more instructions are further executable by the one or more processors individually or collectively to cause the apparatus to:
determine, based at least in part on the message from the access network entity, a set of control channel resources to monitor for an uplink grant; and
monitor the set of control channel resources for the uplink grant, wherein the uplink grant indicates an uplink resource for transmission of a PUR response message to the access network entity.

19. The apparatus of claim 14, wherein the one or more instructions are further executable by the one or more processors individually or collectively to cause the apparatus to:
determine that the PUR configuration is de-configured based at least in part on receiving a broadcast system information transmission from the access network entity that indicates PUR is unsupported; and
release the PUR configuration.

20. The apparatus of claim 14, wherein the PUR request message is transmitted to the access network entity in an uplink message of an early data transmission (EDT) procedure.

21. The apparatus of claim 20, wherein the one or more instructions are further executable by the one or more processors individually or collectively to cause the apparatus to:
format the PUR request message to be transmitted in the uplink message of the EDT procedure, wherein the PUR request message indicates a requested configuration, reconfiguration, or release of a preconfigured uplink resource configuration.

22. The apparatus of claim 20, wherein the PUR request message is transmitted in a message three (MSG3) transmission of the EDT procedure.

23. The apparatus of claim 14, wherein the message from the access network entity indicating the PUR configuration is received in an early data transmission (EDT) downlink message 4 that provides a radio resource control (RRC) connection release message or an RRC early data complete message.

24. An apparatus for wireless communication at a user equipment (UE), comprising:
    means for transmitting a preconfigured uplink resource (PUR) request message to an access network entity based at least in part on determining that the access network entity supports preconfigured uplink resources, wherein the PUR request message includes a number of instances of PUR grants requested by the UE; and
    means for receiving a message from the access network entity indicating a PUR configuration, wherein the PUR configuration comprises a delta configuration that indicates at least one difference over a configuration of the UE.

25. The apparatus of claim 24, wherein the number of instances of PUR grants provides an explicit number of PUR grants or an indication of an infinite number of PUR grants.

26. The apparatus of claim 24, wherein the number of instances of PUR grants requested by the UE indicate a one-shot PUR configuration is requested or a multi-shot PUR configuration is requested.

27. The apparatus of claim 24, wherein the configuration is a prior PUR configuration of the UE.

28. The apparatus of claim 24, wherein the configuration is a default PUR configuration.

29. The apparatus of claim 24, further comprising:
    means for transmitting, after receiving the PUR configuration, a PUR reconfiguration failure indication to the access network entity; and
    means for releasing the PUR configuration.

30. A non-transitory computer-readable medium storing code for wireless communication at a user equipment (UE), the code comprising instructions executable by one or more processors individually or collectively to:
    transmit a preconfigured uplink resource (PUR) request message to an access network entity based at least in part on determining that the access network entity supports preconfigured uplink resources, wherein the PUR request message includes a number of instances of PUR grants requested by the UE; and
    receive a message from the access network entity indicating a PUR configuration, wherein the PUR configuration comprises a delta configuration that indicates at least one difference over a configuration of the UE.

31. A method for wireless communication at a user equipment (UE), comprising:
    transmitting a preconfigured uplink resource (PUR) request message to an access network entity based at least in part on determining that the access network entity supports preconfigured uplink resources, wherein the PUR request message includes an indication that one PUR grant instance is requested by the UE or an infinite number of PUR grant instances are requested by the UE; and
    receiving a message from the access network entity indicating a PUR configuration or PUR reconfiguration or release of preconfigured uplink resources, wherein the PUR configuration comprises a delta configuration that indicates at least one difference over a prior PUR configuration of the UE.

32. The method of claim 31, wherein the prior PUR configuration comprises a default PUR configuration.

33. An apparatus for wireless communication at a user equipment (UE), comprising:
    one or more processors,
    one or more memories coupled with the one or more processors; and
    one or more instructions stored in the one or more memories and executable by the one or more processors individually or collectively to cause the apparatus to:
        transmit a preconfigured uplink resource (PUR) request message to an access network entity based at least in part on determining that the access network entity supports preconfigured uplink resources, wherein the PUR request message includes an indication that one PUR grant instance is requested by the UE or an infinite number of PUR grant instances are requested by the UE; and
        receive a message from the access network entity indicating a PUR configuration or PUR reconfiguration or release of preconfigured uplink resources, wherein the PUR configuration comprises a delta configuration that indicates at least one difference over a prior PUR configuration of the UE.

34. The apparatus of claim 33, wherein the prior PUR configuration comprises a default PUR configuration.

* * * * *